US010613656B2

(12) United States Patent
Nilo et al.

(10) Patent No.: US 10,613,656 B2
(45) Date of Patent: Apr. 7, 2020

(54) DEVICES AND METHODS FOR PROCESSING TOUCH INPUTS

(71) Applicant: Apple Inc., Cupertino, CA (US)

(72) Inventors: Bruce D. Nilo, Cupertino, CA (US); David Michael Chan, Palo Alto, CA (US); Jacob A. Xiao, Los Gatos, CA (US); Jason Clay Beaver, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/179,813

(22) Filed: Nov. 2, 2018

(65) Prior Publication Data

US 2019/0073051 A1    Mar. 7, 2019

Related U.S. Application Data

(63) Continuation of application No. 14/871,415, filed on Sep. 30, 2015, now Pat. No. 10,241,599, which is a
(Continued)

(51) Int. Cl.
*G06F 3/041* (2006.01)
*G09G 5/12* (2006.01)
*G06F 3/0488* (2013.01)

(52) U.S. Cl.
CPC ............ *G06F 3/041* (2013.01); *G06F 3/0416* (2013.01); *G06F 3/04883* (2013.01); *G09G 5/12* (2013.01)

(58) Field of Classification Search
CPC ...... G06F 3/0416; G06F 3/0418; G06F 3/041; G06F 3/04883
(Continued)

(56) References Cited

U.S. PATENT DOCUMENTS

| 9,354,744 | B2 | 5/2016 | Johansson et al. |
| 2003/0214490 | A1* | 11/2003 | Cool ................... G06F 3/03545 345/179 |
| 2010/0289826 | A1 | 11/2010 | Park et al. |
| 2011/0080350 | A1 | 4/2011 | Almalki et al. |

(Continued)

FOREIGN PATENT DOCUMENTS

EP    2 629 182 A1    8/2013

OTHER PUBLICATIONS

Notice of Acceptance, dated Oct. 8, 2018, received in Australian Patent Application No. 2016276029, which corresponds with U.S. Appl. No. 14/870,879, 3 pages.
(Continued)

*Primary Examiner* — Calvin C Ma
(74) *Attorney, Agent, or Firm* — Morgan, Lewis & Bockius LLP

(57) ABSTRACT

An electronic device, with a touch-sensitive surface and display, displays a user interface at a first display rate. While displaying the user interface, the device detects movement of a touch input across the touch-sensitive surface at a first detection rate that is higher than the first display rate. An application-independent touch processing module sends to an application-specific portion of the first software application touch location information for the touch input that identifies: one or more predicted locations of the touch input on the touch-sensitive surface, and one or more predicted intensity values of the touch input at one or more intensity locations of the touch input on the touch-sensitive surface. The first software application processes the touch location information and updated the user interface accordingly.

33 Claims, 58 Drawing Sheets

Related U.S. Application Data continuation of application No. 14/870,879, filed on Sep. 30, 2015, now Pat. No. 10,126,847.

(60) Provisional application No. 62/172,222, filed on Jun. 7, 2015.

(58) Field of Classification Search
USPC .................................................. 345/173, 174
See application file for complete search history.

(56) References Cited

U.S. PATENT DOCUMENTS

| | | | |
|---|---|---|---|
| 2012/0007821 A1* | 1/2012 | Zaliva | G06F 3/03547 345/173 |
| 2012/0105357 A1 | 5/2012 | Li et al. | |
| 2014/0152590 A1 | 6/2014 | Brown et al. | |
| 2014/0198052 A1 | 7/2014 | Tokutake | |
| 2015/0015497 A1 | 1/2015 | Leigh | |
| 2015/0355778 A1* | 12/2015 | Kim | G06F 3/0416 345/173 |
| 2016/0357391 A1 | 12/2016 | Nilo et al. | |
| 2016/0357429 A1 | 12/2016 | Nilo et al. | |

OTHER PUBLICATIONS

Certificate of Grant, dated Feb. 14, 2019, received in Australian Patent Application No. 2016276029, which corresponds with U.S. Appl. No. 14/870,879, 3 pages.

Office Action, dated Jan. 31, 2018, received in U.S. Appl. No. 14/870,879, 13 pages.

Notice of Allowance, dated Jul. 19, 2018, received in U.S. Appl. No. 14/870,879, 8 pages.

Office Action, dated Jul. 13, 2018, received in Australian Patent Application No. 2016276029, which corresponds with U.S. Appl. No. 14/870,879, 3 pages.

Office Action, dated Mar. 22, 2018, received in U.S. Appl. No. 14/871,415, 15 pages.

International Search Report and Written Opinion, dated Jul. 26, 2016, received in International Patent Application No. PCT/2016/033536, which corresponds with U.S. Appl. No. 14/870,879, 13 pages.

Office Action, dated Nov. 21, 2019, recieved in Australian Patent Application No. 2018271226, which corresponds with U.S. Appl. No. 14/871,415, 2 pages.

* cited by examiner

806 At each of a sequence of update times, ...

816 Select a respective touch location in the selected subset of the sequence of locations of the touch input as a representative touch location

818 The respective touch location is selected as the representative touch location in accordance with touch-processing criteria for the first application that indicate an amount of time needed by the first application to update the user interface

820 Updating the user interface by the first application includes transmitting the selected subset of the sequence of locations of the touch input to the first application along with an indication of which location is the representative touch location

822 The selected subset of the sequence of locations includes one or more interstitial locations that correspond to touch locations between a prior representative touch location and the representative touch location

824 For each update time in the sequence of update times, select a plurality of locations of the touch input to use for updating the user interface. The selected locations are locations of the touch input detected after a last selection of locations to use for updating the user interface.

826 The selected subset of the sequence of locations of the touch input includes one or more predicted interstitial locations

828 For each update time in the sequence of update times, select a plurality of locations of the touch input to use for updating the user interface. The selected locations are locations of the touch input detected after detecting locations of the touch input last selected for updating the user interface.

830 The selected locations include all of the locations of the touch input detected after detecting locations of the touch input last selected for updating the user interface

832 The selected locations include only one of the locations of the touch input detected after detecting locations of the touch input last selected for updating the user interface

Figure 8B

906 Select a respective touch location of the touch input that was detected during the respective movement to identify as a representative touch location for the respective movement based on touch-processing criteria for the first software application 916 Selecting the respective touch location as the representative touch location includes detecting a first touch location of the touch input during the touch-detection frame, and in response to detecting the first location: in accordance with a determination that the first touch location meets the touch-processing criteria for the first application, selecting the first touch location as the representative touch location for the respective movement of the touch input; and, in accordance with a determination that the first touch location does not meet the touch-processing criteria for the first application, forgoing selecting the first touch location as the representative touch location for the respective movement of the touch input 918 Selecting the respective touch location as the representative touch location includes: detecting a second touch location of the touch input during the touch-detection frame, and in response to detecting the second location: in accordance with a determination that the second touch location meets the touch-processing criteria for the first application, selecting the second touch location as the representative touch location for the respective movement of the touch input 920 In accordance with a determination that the second touch location does not meet touch-processing criteria for the first application, forgo selecting the second touch location as the representative touch location for the respective movement of the touch input

Figure 9B

908 Send to an application-specific portion of the first software application...

922 Determine a processing margin time. At each of a sequence of communication times, each of which precedes a display update time in a sequence of display update times by at least the determined processing margin time, send, from the touch processing module to the first software application, a set of locations that includes one or more selected locations of the touch input during a preceding time period; and, at the first software application, update the first user interface in time for display at the sequence of display update times in accordance with the set of locations sent by the touch processing module at the sequence of communication times.

924 Determining the processing margin time includes setting the processing margin time to an initial value and then determining an updated processing margin time in accordance with one or more measurements of performance of the first software application

926 The processing margin time is determined in accordance with a longest processing time by the first software application while processing each of a plurality of sets of touch input locations

928 The locations of the touch input included in the set of locations sent at each communication time correspond to a plurality of detected locations of the touch input between successive communication times in the sequence of communication times.

930 Send to the first software application predicted touch location information for the touch input that identifies one or more predicted touch locations for the respective movement

932 Send the touch location information for the touch input to a plurality of software applications, including the first software application

934 Send to the first software application the touch location information for the touch input in accordance with a determination that the first software application is configured to receive the touch location information; and send to a second software application that is distinct from the first software application subsequent touch location information for the touch input in accordance with a determination that the second software application is configured to receive the subsequent touch location information

Figure 9C

914 At the first software application, update the user interface in accordance with the touch location information 936 Send the touch location information with a first portion of the first software application, comprising an application-independent sub-module, and update the user interface with a second portion of the software application that comprises an application-specific sub-module 938 The movement of the touch input is detected during a respective touch-detection frame. An updated user interface of the first application, based on the movement of the touch input, is generated during a respective touch-processing frame. The updated user interface is displayed on the display for the duration of a respective display frame that occurs after the respective touch-processing frame.

940 During the respective touch-processing frame, display a user interface for the first application that was generated during a prior touch-processing frame 942 During the respective display frame, detect subsequent movement of the touch input across the touch-sensitive surface and send to the first software application touch location information for the subsequent movement of the touch input

Figure 9D

1008 Predict for the touch input a first set of one or more predicted locations ...

1014 The one or more predicted locations of the touch input on the touch-sensitive surface are predicted based at least in part on multiple representative touch locations of the touch input on the touch-sensitive surface

1016 The one or more predicted locations of the touch input on the touch-sensitive surface are predicted based on multiple representative touch locations of the touch input on the touch-sensitive surface and one or more interstitial locations of the touch input on the touch-sensitive surface

1018 A number of predicted locations in the first set of one or more predicted locations of the touch input is determined in accordance with one or more confidence values associated with the one or more predicted locations

1020 A number of predicted locations in the first set of one or more predicted locations of the touch input is determined in accordance with one or more confidence values associated with the multiple locations in the first set of sequential locations

1022 The one or more confidence values associated with the multiple locations in the first set of sequential locations are based at least in part on errors in fitting the multiple locations in the first set of sequential locations to a predefined constraint

1024 The one or more confidence values associated with the multiple locations in the first set of sequential locations are based at least in part on speed of the movement of the touch input

1026 The electronic device includes one or more sensors to detect intensity of touch inputs on the touch-sensitive surface. Predict intensity of the touch input at a plurality of locations on the touch-sensitive surface; and update the user interface in accordance with the predicted intensity of the touch input.

1028 Predict tilt and/or orientation of the touch input at a plurality of locations on the touch-sensitive surface; and update the user interface in accordance with the predicted tilt and/or orientation of the touch input.

Figure 10B

```
┌─────────────────────────────────────────────────────────────────────────┐
│ 1030 Update the user interface in accordance with the first set of one  │
│ or more predicted locations of the touch input on the touch-sensitive   │
│ surface                                                                 │
│  ┌───────────────────────────────────────────────────────────────────┐  │
│  │ 1032 The movement of the touch input is detected during a         │  │
│  │ respective touch-detection frame. An updated user interface,      │  │
│  │ based on the movement of the touch input, is generated during a   │  │
│  │ respective touch-processing frame. The updated user interface is  │  │
│  │ displayed on the display for the duration of a respective display │  │
│  │ frame that occurs after the respective touch-processing frame.    │  │
│  └───────────────────────────────────────────────────────────────────┘  │
└─────────────────────────────────────────────────────────────────────────┘
```

┌─────────────────────────────────────────────────────────────────────────┐
│ 1034 At an application-independent touch processing module: predict for the touch input the first set of one or more predicted locations on the touch-sensitive surface; and send to an application-specific portion of the first software application the first set of one or more predicted locations of the touch input on the touch-sensitive surface. At the first software application, update the user interface in accordance with the first set of one or more predicted locations of the touch input on the touch-sensitive surface. │
└─────────────────────────────────────────────────────────────────────────┘

┌─────────────────────────────────────────────────────────────────────────┐
│ 1036 Subsequent to detecting the touch input at the first set of sequential locations on the touch-sensitive surface: detect the touch input at a second set of sequential locations on the touch-sensitive surface; compare the second set of sequential locations of the touch input on the touch-sensitive surface with the first set of one or more predicted locations of the touch input on the touch-sensitive surface; and, in accordance with a determination that a difference between the first set of one or more predicted locations of the touch input on the touch-sensitive surface and the second set of sequential locations of the touch input on the touch-sensitive surface satisfies predefined criteria, update the user interface in accordance with the second set of sequential locations of the touch input on the touch-sensitive surface. │
│                                                                         │
│  ┌───────────────────────────────────────────────────────────────────┐  │
│  │ 1038 Predict for the touch input a second set of one or more      │  │
│  │ locations on the touch-sensitive surface; and update the user     │  │
│  │ interface in accordance with the second set of sequential         │  │
│  │ locations on the touch-sensitive surface and the second set of    │  │
│  │ one or more predicted locations of the touch input on the touch-  │  │
│  │ sensitive surface.                                                │  │
│  └───────────────────────────────────────────────────────────────────┘  │
│                                                                         │
│  ┌───────────────────────────────────────────────────────────────────┐  │
│  │ 1040 A portion of the user interface that is updated in accordance│  │
│  │ with one or more predicted locations is visually distinguished    │  │
│  │ from a portion of the user interface that is updated in accordance│  │
│  │ with one or more detected locations                               │  │
│  └───────────────────────────────────────────────────────────────────┘  │
└─────────────────────────────────────────────────────────────────────────┘

Figure 10C

DEVICES AND METHODS FOR PROCESSING TOUCH INPUTS

RELATED APPLICATIONS

This application is a continuation application of U.S. patent application Ser. No. 14/871,415, filed Sep. 30, 2015, which is a continuation application of U.S. patent application Ser. No. 14/870,879, filed Sep. 30, 2015, entitled "Devices and Methods for Processing Touch Inputs," which claims priority to U.S. Provisional Patent Application Ser. No. 62/172,222, filed Jun. 7, 2015, entitled "Devices and Methods for Processing Touch Inputs." Both of these applications are incorporated by reference herein in their entireties.

TECHNICAL FIELD

This relates generally to electronic devices with touch-sensitive surfaces, including but not limited to electronic devices with touch-sensitive surfaces that receive touch inputs.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But rapid movements of touch inputs lead to discrepancies between actual locations of touch inputs and how the touch inputs are reflected in user interfaces. For example, the user interfaces may be updated with a delay so that they may not timely reflect locations of the touch inputs when touch inputs are moving fast. This creates a cognitive burden on a user. In addition, this may lead to errors in manipulating user interface objects and require repeated corrections, thereby wasting energy. This latter consideration is particularly important in battery-operated devices.

SUMMARY

Accordingly, the present disclosure provides for electronic devices with faster, more efficient and accurate methods and interfaces for manipulating user interface objects. Such methods and interfaces optionally complement or replace conventional methods for manipulating user interface objects. Such methods and interfaces reduce the number, extent, and/or nature of the inputs from a user and produce a more efficient human-machine interface. Further, such methods reduce the processing power consumed to process touch inputs, conserve power, improve accuracy of user inputs, reduce unnecessary/extraneous/repetitive inputs, and potentially reduce memory usage. For battery-operated devices, such methods and interfaces conserve battery power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors.

In accordance with some embodiments, a method is performed at an electronic device with a display and a touch-sensitive surface. In some embodiments, the electronic device includes one or more sensors to detect intensity of contacts with the touch-sensitive surface. In some embodiments, the electronic device includes one or more sensor units to detect signals from a stylus associated with the electronic device. The method includes: displaying a user interface at a first display rate; while displaying the user interface, detecting, at a first detection rate that is greater than the first display rate, movement of a touch input at a sequence of locations on the touch-sensitive surface; and, at each of a sequence of update times, updating the user interface from a respective current state to a respective next state in accordance with a selected subset of the sequence of locations of the touch input, each selected subset of the sequence of locations comprising a plurality of locations of the touch input.

In accordance with some embodiments, a method is performed at an electronic device with a display and a touch-sensitive surface. In some embodiments, the electronic device includes one or more sensors to detect intensity of contacts with the touch-sensitive surface. In some embodiments, the electronic device includes one or more sensor units to detect signals from a stylus associated with the electronic device. The method includes: displaying a user interface of a first software application that is updated at a first display rate; and while displaying a first frame of the user interface in accordance with the first display rate: detecting respective movement of a touch input across the touch-sensitive surface; and, at an application-independent touch processing module: selecting a respective touch location of the touch input that was detected during the respective movement to identify as a representative touch location for the respective movement based on touch-processing criteria for the first software application; and sending to an application-specific portion of the first software application, which is distinct from the touch processing module, touch location information for the touch input that identifies the respective touch location as the representative touch location for the respective movement. The method also includes, at the first software application, updating the user interface in accordance with the touch location information.

In accordance with some embodiments, a method is performed at an electronic device with a display and a touch-sensitive surface. In some embodiments, the electronic device includes one or more sensors to detect intensity of contacts with the touch-sensitive surface. In some embodiments, the electronic device includes one or more sensor units to detect signals from a stylus associated with the electronic device. The method includes: displaying a user interface at a first display rate; and, while displaying the user interface in accordance with the first display rate, detecting movement of a touch input, including detecting the touch input at a first set of sequential locations on the touch-sensitive surface. The first set of sequential locations includes a plurality of locations on the touch-sensitive surface. The method also includes predicting for the touch input a first set of one or more predicted locations on the touch-sensitive surface based on multiple locations in the first set of sequential locations. The method further includes updating the user interface in accordance with the first set of one or more predicted locations of the touch input on the touch-sensitive surface.

In accordance with some embodiments, a method is performed at an electronic device with a display and a touch-sensitive surface. In some embodiments, the electronic device includes one or more sensors to detect intensity of contacts with the touch-sensitive surface. In some embodiments, the electronic device includes one or more sensor units to detect signals from a stylus associated with the electronic device. The method includes: displaying a user interface of a first software application that is updated at a first display rate; and detecting respective movement of a touch input across the touch-sensitive surface at a first detection rate that is higher than the first display rate. The method also includes, at an application-independent touch processing module, sending to an application-specific portion of the first software application touch location information for the touch input that identifies: one or more predicted locations of the touch input on the touch-sensitive surface; and one or more predicted intensity values of the touch input at one or more intensity locations of the touch input on the touch-sensitive surface, the one or more intensity locations comprising at least a subset of the one or more predicted locations. The method further includes, at the first software application, processing the touch location information.

In accordance with some embodiments, an electronic device includes a display unit configured to display a user interface, a touch-sensitive surface unit to receive contacts, and a processing unit coupled with the display unit and the touch-sensitive surface unit. The processing unit is configured to: enable display of a user interface at a first display rate; while the user interface is displayed, detect, at a first detection rate that is greater than the first display rate, movement of a touch input at a sequence of locations on the touch-sensitive surface unit; and, at each of a sequence of update times, update the user interface from a respective current state to a respective next state in accordance with a selected subset of the sequence of locations of the touch input, each selected subset of the sequence of locations comprising a plurality of locations of the touch input. In some embodiments, the electronic device includes one or more sensor units to detect intensity of contacts with the touch-sensitive surface and the processing unit is coupled with the one or more sensor units. In some embodiments, the electronic device includes one or more sensor units to detect signals from a stylus associated with the electronic device and the processing unit is coupled with the one or more sensor units.

In accordance with some embodiments, an electronic device includes a display unit configured to display a user interface, a touch-sensitive surface unit to receive contacts, and a processing unit coupled with the display unit and the touch-sensitive surface unit. The processing unit is configured to: enable display of a user interface of a first software application that is updated at a first display rate; while a first frame of the user interface in accordance with the first display rate is displayed: detect respective movement of a touch input across the touch-sensitive surface unit; and, at an application-independent touch processing module: select a respective touch location of the touch input that was detected during the respective movement to identify as a representative touch location for the respective movement based on touch-processing criteria for the first software application; and send to an application-specific portion of the first software application, which is distinct from the touch processing module, touch location information for the touch input that identifies the respective touch location as the representative touch location for the respective movement; and, at the first software application, update the user interface in accordance with the touch location information. In some embodiments, the electronic device includes one or more sensor units to detect intensity of contacts with the touch-sensitive surface and the processing unit is coupled with the one or more sensor units. In some embodiments, the electronic device includes one or more sensor units to detect signals from a stylus associated with the electronic device and the processing unit is coupled with the one or more sensor units.

In accordance with some embodiments, an electronic device includes a display unit configured to display a user interface, a touch-sensitive surface unit to receive contacts, and a processing unit coupled with the display unit and the touch-sensitive surface unit. The processing unit is configured to: enable display of a user interface at a first display rate; while displaying the user interface in accordance with the first display rate: detect movement of a touch input, including detecting the touch input at a first set of sequential locations on the touch-sensitive surface unit, wherein the first set of sequential locations includes a plurality of locations on the touch-sensitive surface unit; and predict for the touch input a first set of one or more predicted locations on the touch-sensitive surface unit based on multiple locations in the first set of sequential locations; and update the user interface in accordance with the first set of one or more predicted locations of the touch input on the touch-sensitive surface unit. In some embodiments, the electronic device includes one or more sensor units to detect intensity of contacts with the touch-sensitive surface and the processing unit is coupled with the one or more sensor units. In some embodiments, the electronic device includes one or more sensor units to detect signals from a stylus associated with the electronic device and the processing unit is coupled with the one or more sensor units.

In accordance with some embodiments, an electronic device includes a display unit configured to display a user interface, a touch-sensitive surface unit to receive contacts, and a processing unit coupled with the display unit and the touch-sensitive surface unit. The processing unit is configured to: enable display of a user interface of a first software application that is updated at a first display rate; detect respective movement of a touch input across the touch-sensitive surface unit at a first detection rate that is higher than the first display rate; at an application-independent touch processing module, send to an application-specific portion of the first software application touch location information for the touch input that identifies: one or more predicted locations of the touch input on the touch-sensitive surface unit; and one or more predicted intensity values of the touch input at one or more intensity locations of the touch input on the touch-sensitive surface unit, the one or more intensity locations comprising at least a subset of the one or more predicted locations; and, at the first software application, process the touch location information. In some embodiments, the electronic device includes one or more sensor units to detect intensity of contacts with the touch-sensitive surface and the processing unit is coupled with the one or more sensor units. In some embodiments, the electronic device includes one or more sensor units to detect signals from a stylus associated with the electronic device and the processing unit is coupled with the one or more sensor units.

In accordance with some embodiments, an electronic device includes a display, a touch-sensitive surface, one or more processors, memory, one or more programs, optionally one or more sensors to detect intensity of contacts with the touch-sensitive surface, and optionally one or more sensors to detect signals from a stylus associated with the electronic device; the one or more programs are stored in the memory and configured to be executed by the one or more processors and the one or more programs include instructions for performing or causing performance of the operations of any of the methods described herein. In accordance with some embodiments, a computer readable storage medium (e.g., a non-transitory computer readable storage medium, or alternatively, a transitory computer readable storage medium) has stored therein instructions, which, when executed by an electronic device with a display, a touch-sensitive surface, optionally one or more sensors to detect intensity of contacts with the touch-sensitive surface, and optionally one or more sensors to detect signals from a stylus associated with the electronic device, cause the electronic device to perform or cause performance of the operations of any of the methods described herein. In accordance with some embodiments, a graphical user interface on an electronic device with a display, a touch-sensitive surface, a memory, one or more processors to execute one or more programs stored in the memory, optionally one or more sensors to detect intensity of contacts with the touch-sensitive surface, and optionally one or more sensors to detect signals from a stylus associated with the electronic device, includes one or more of the elements displayed in any of the methods described herein, which are updated in response to inputs, as described in any of the methods described herein. In accordance with some embodiments, an electronic device includes: a display, a touch-sensitive surface, and means for performing or causing performance of the operations of any of the methods described herein. The electronic device optionally includes one or more sensors to detect signals from a stylus associated with the electronic device and/or one or more sensors to detect intensity of contacts with the touch-sensitive surface. In accordance with some embodiments, an information processing apparatus, for use in an electronic device with a display and a touch-sensitive surface, includes means for performing or causing performance of the operations of any of the methods described herein. The electronic device optionally includes one or more sensors to detect signals from a stylus associated with the electronic device and/or one or more sensors to detect intensity of contacts with the touch-sensitive surface.

Thus, electronic devices with displays, touch-sensitive surfaces and optionally one or more sensors to detect intensity of contacts with the touch-sensitive surface, and optionally one or more sensors to detect signals from a stylus associated with the electronic device are provided with faster, more efficient methods and interfaces for manipulating user interface objects, thereby increasing the effectiveness, efficiency, and user satisfaction with such devices. Such methods and interfaces may complement or replace conventional methods for manipulating user interface objects.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8B are flow diagrams illustrating a method of updating a user interface based on coalesced touch locations in accordance with some embodiments.

FIGS. 9A-9D are flow diagrams illustrating a method of processing a touch input with a touch processing module in accordance with some embodiments.

FIGS. 10A-10C are flow diagrams illustrating a method of updating a user interface based on predicted touch locations in accordance with some embodiments.

Drawings are not drawn to scale unless stated otherwise.

DESCRIPTION OF EMBODIMENTS

Many electronic devices have graphical user interfaces receive user inputs to manipulate user interface objects (e.g., moving a user interface object or creating a user interface object, such as drawing a line). Due to delays associated with hardware and/or software components in processing touch inputs, rapid movements of touch inputs lead to discrepancies between actual locations of touch inputs and how the touch inputs are reflected in user interfaces. For example, the user interfaces may be updated with a delay so that they may not timely reflect locations of the touch inputs when touch inputs are moving fast. This creates a cognitive burden on a user, and may lead to errors in manipulating user interface objects. In the embodiments described below, an improved method for manipulating user interface objects is achieved by using coalesced touch locations, predicted touch locations, or the combination of both coalesced touch locations and predicted touch locations. By detecting a touch input at a higher rate (e.g., higher than a display rate), locations of the touch input can be detected between frames. This location information is used to reduce the discrepancy. In addition, or alternatively, locations of the touch input are predicted, which is also used to reduce the discrepancy. This method streamlines the object manipulation processes by using coalesced and/or predicted touch locations, thereby reducing discrepancies between touch inputs and displayed user interfaces and allowing more accurate manipulation of user interface objects.

Figure 2:
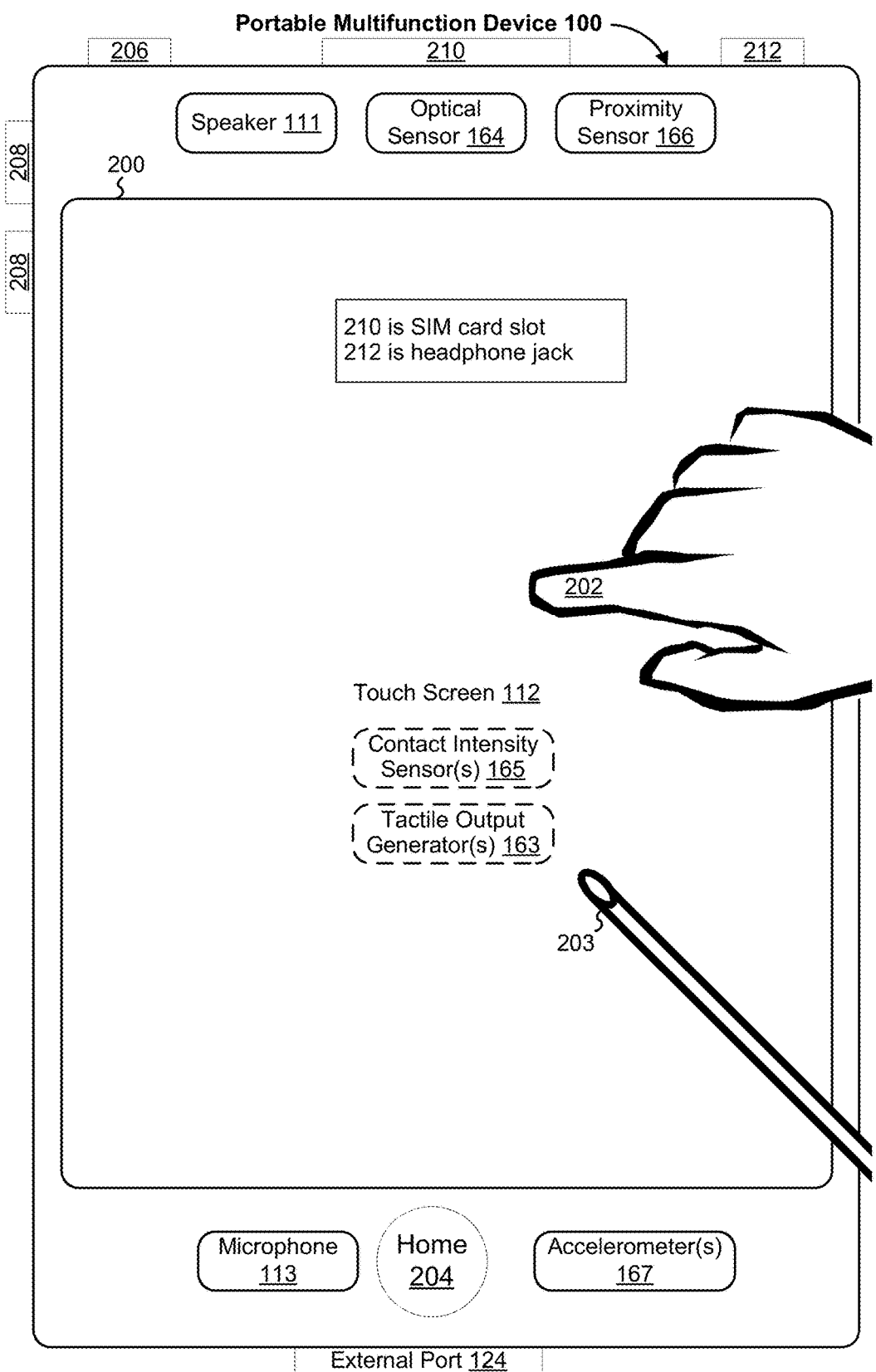
FIG. 2 illustrates a portable multifunction device having a touch screen in accordance with some embodiments.
Figure 3:
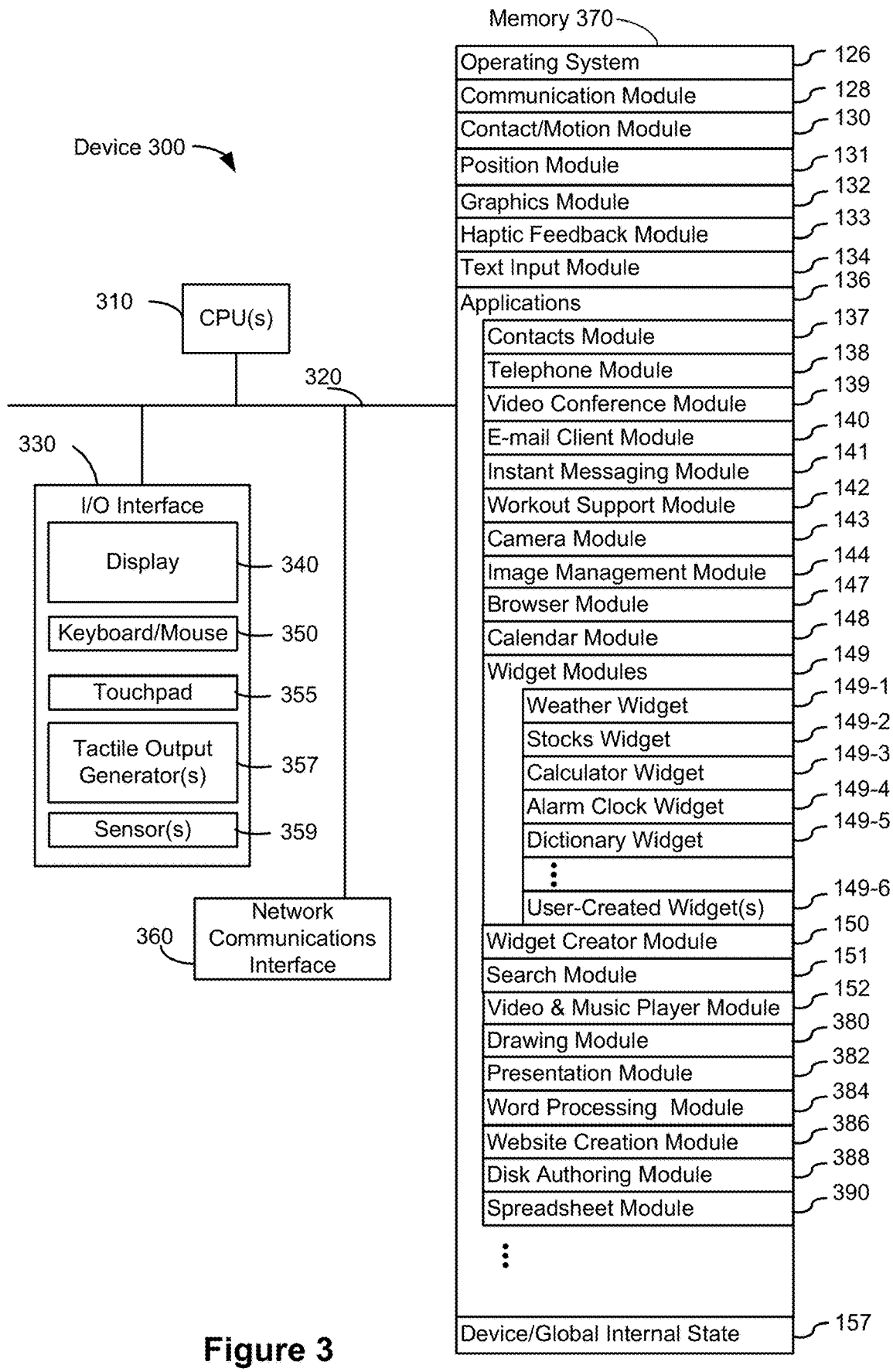
FIG. 3 is a block diagram of an exemplary multifunction device with a display and a touch-sensitive surface in accordance with some embodiments.
Figure 4:
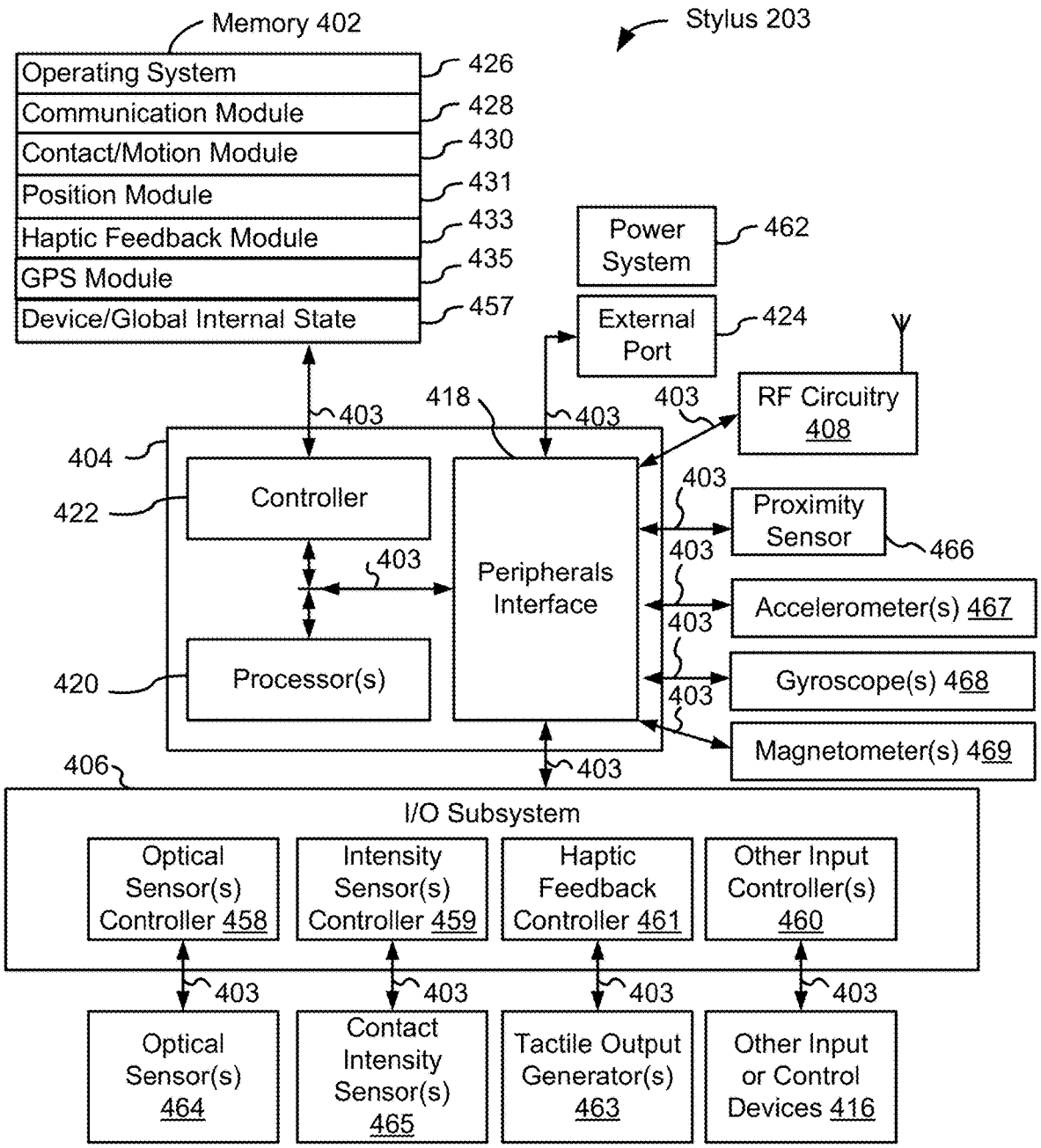
FIG. 4 is a block diagram of an exemplary electronic stylus in accordance with some embodiments.
Figure 5A:
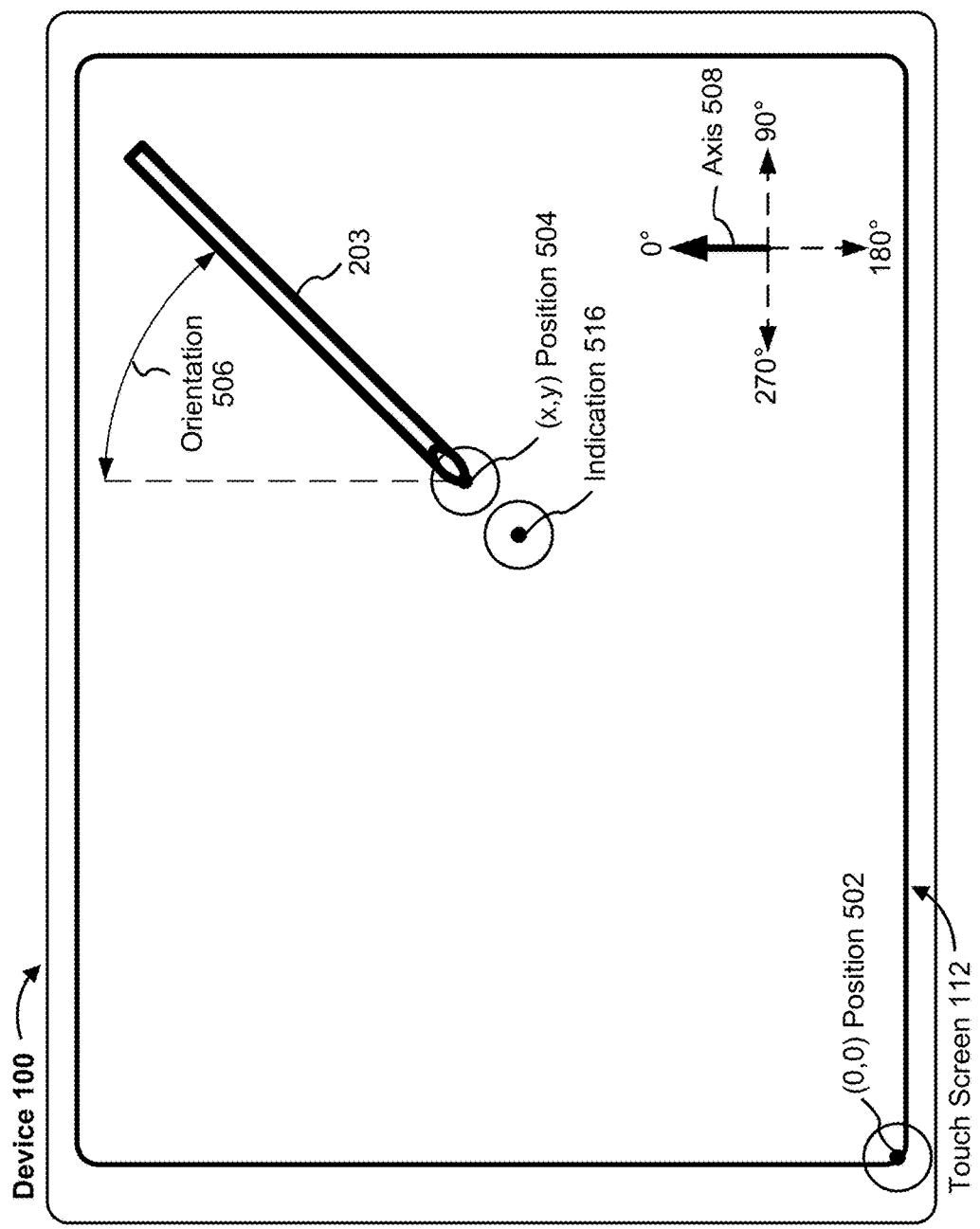
FIGS. 5A-5B illustrate a positional state of a stylus relative to a touch-sensitive surface in accordance with some embodiments.
Figure 5A:
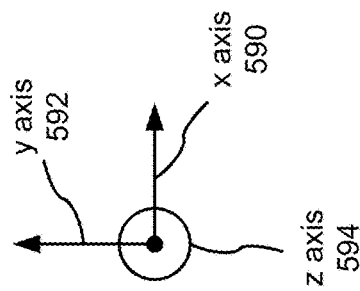
Figure 5B:
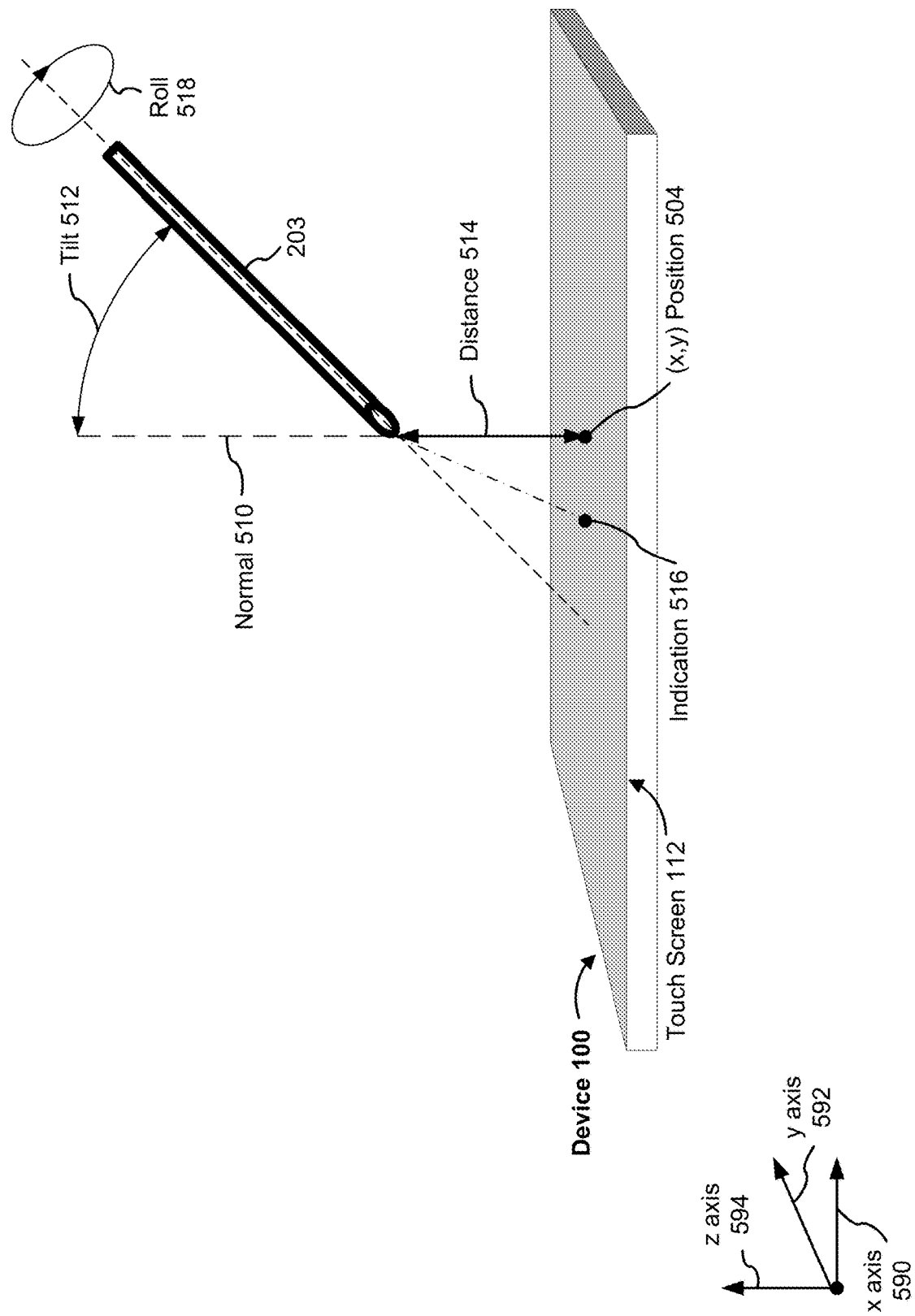
Figure 10A:
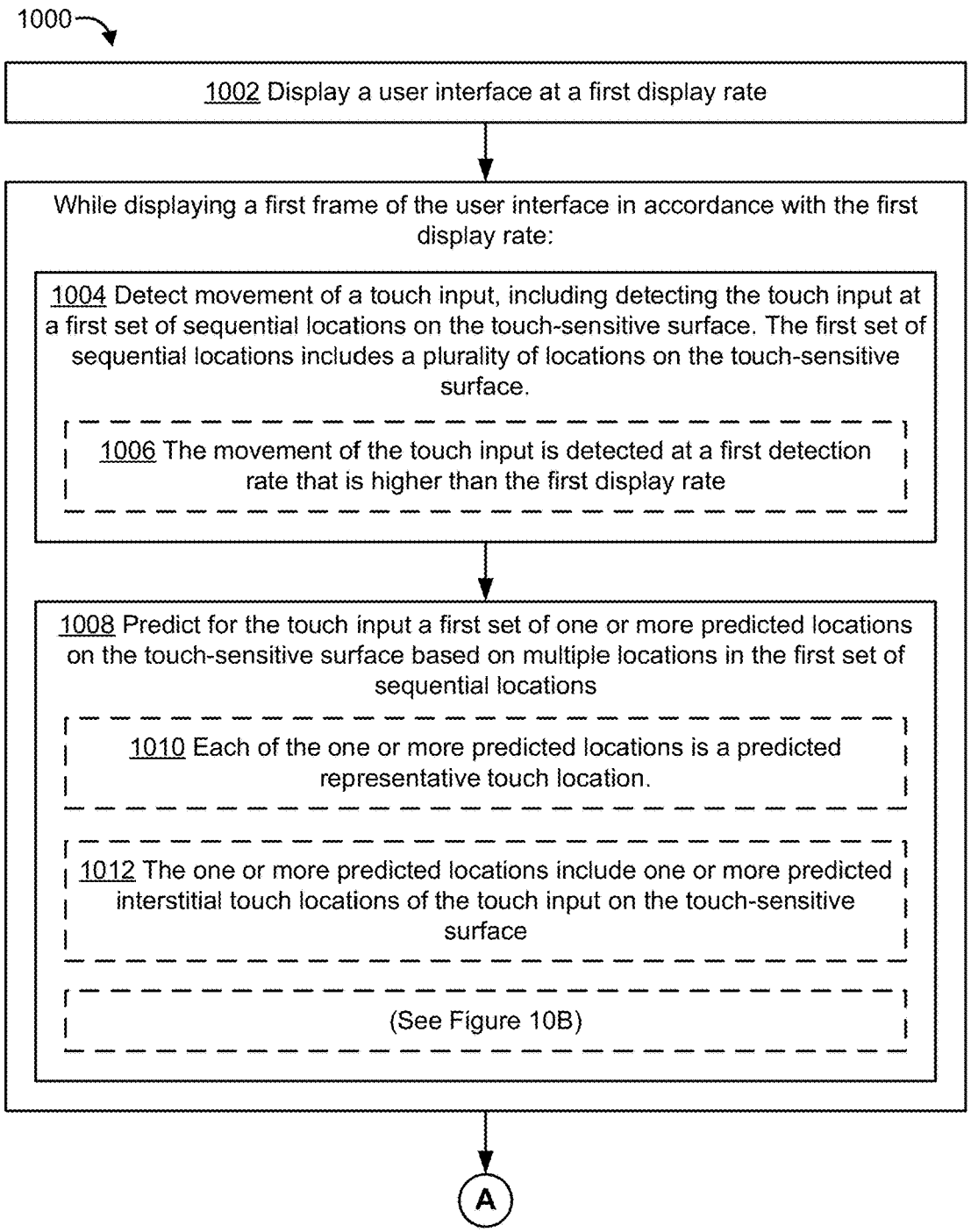
Figure 11:
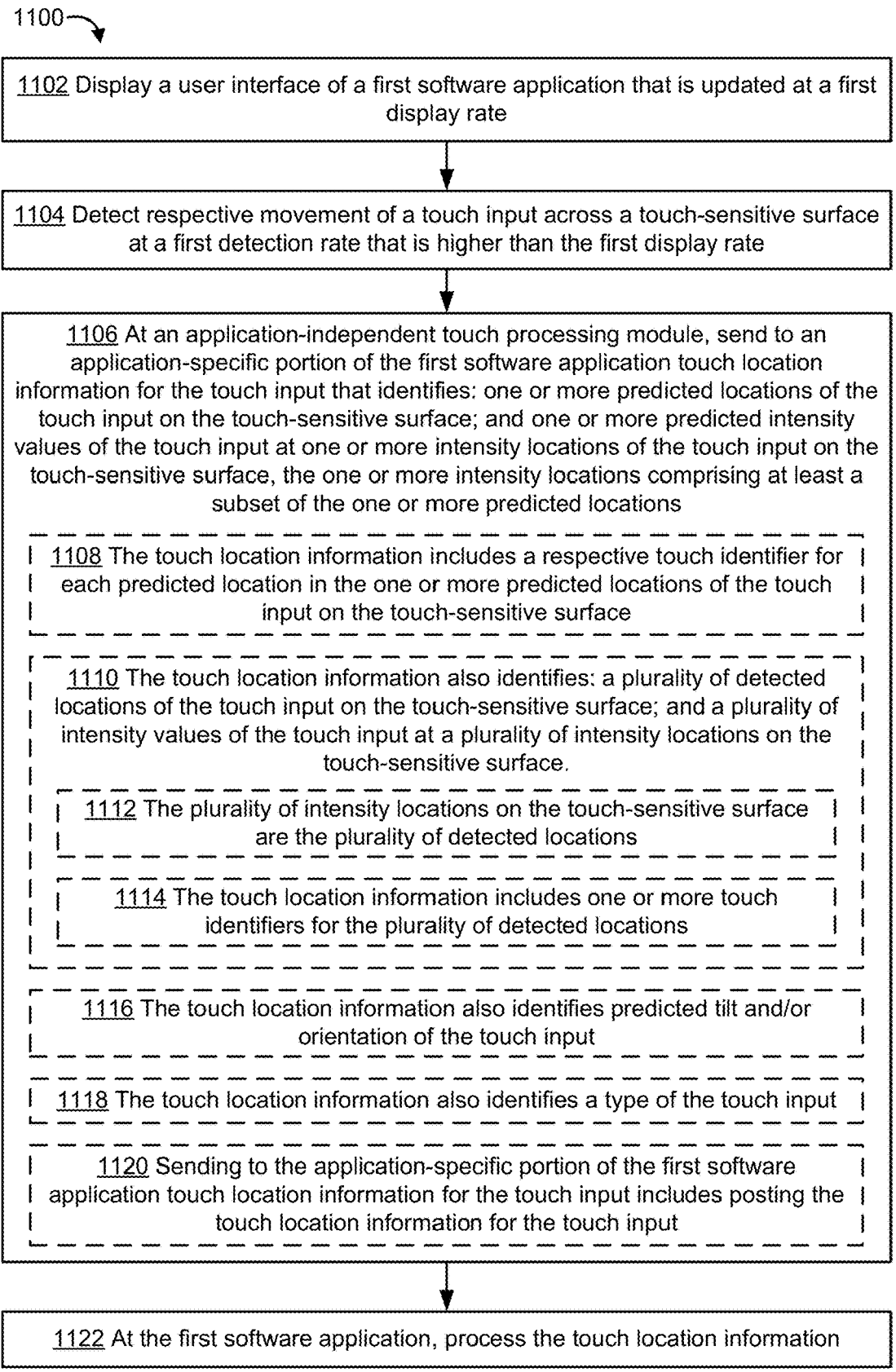
FIG. 11 is a flow diagram illustrating a method of transferring predicted touch information in accordance with some embodiments.

Below, FIGS. 1A-1B, 2, and 3 provide a description of exemplary devices. FIG. 4 provides a description of an exemplary electronic stylus. FIGS. 5A-5B illustrate a positional state of a stylus relative to a touch-sensitive surface. FIGS. 6A-6B and 7A-7OO illustrate exemplary user interfaces for updating a user interface based on coalesced and/or predicted touch locations and related operations. FIGS. 8A-8B illustrate a flow diagram of a method of updating a user interface based on coalesced touch locations. FIGS. 9A-9D illustrate a flow diagram of a method of processing a touch input with a touch processing module. FIGS. 10A-10C illustrate a flow diagram of a method of updating a user interface based on predicted touch locations. FIG. 11 illustrates a flow diagram of a method of transferring predicted touch information. The user interfaces in FIGS. 7A-7OO are used to illustrate the processes in FIGS. 8A-8B, 9A-9D, 10A-10C, and 11.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described.

It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
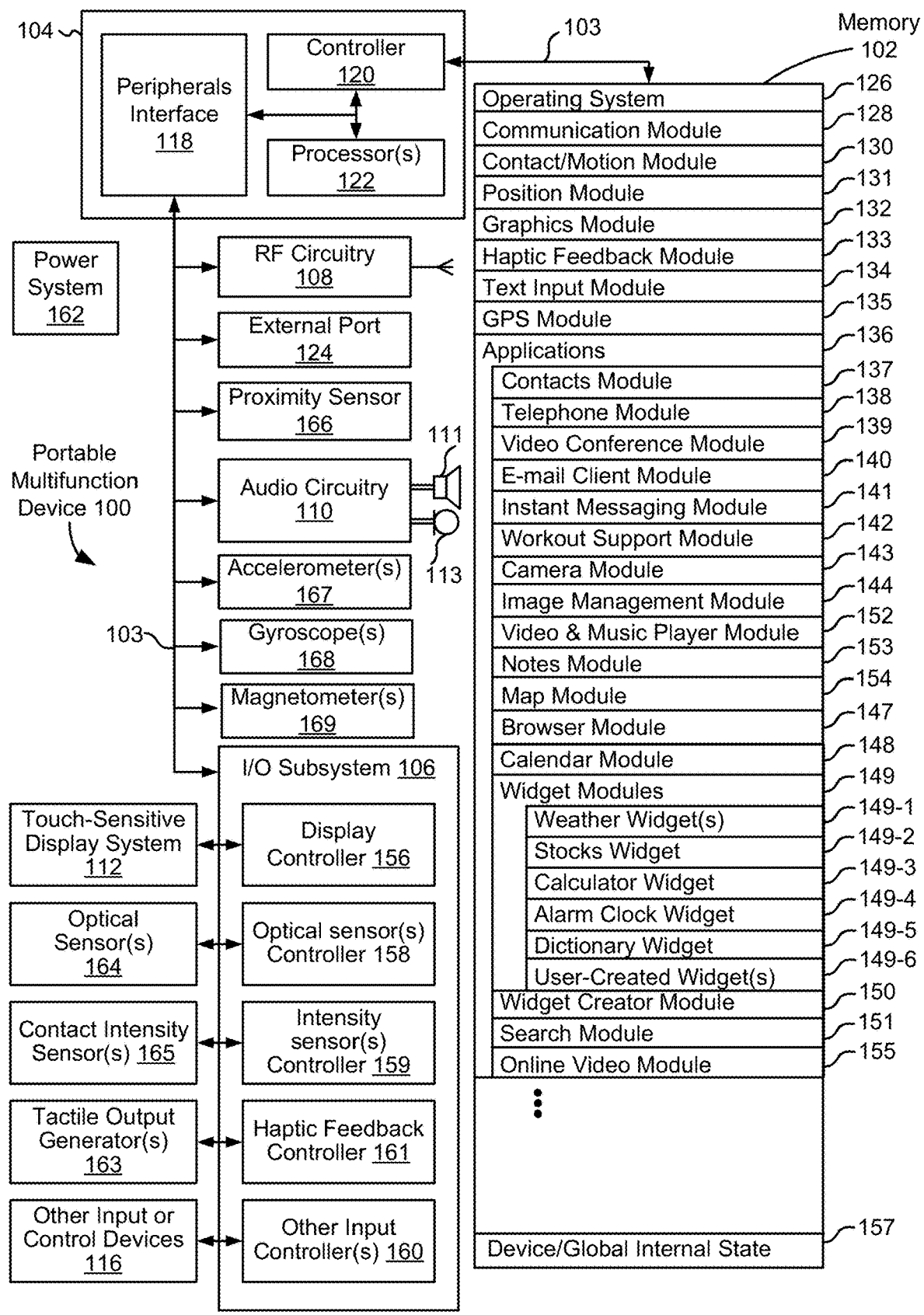
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some exemplary embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some exemplary embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., used by haptic feedback controller 161) to produce tactile output using tactile output generator(s) 163 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
 contacts module 137 (sometimes called an address book or contact list);
 telephone module 138;
 video conferencing module 139;
 e-mail client module 140;
 instant messaging (IM) module 141;
 workout support module 142;
 camera module 143 for still and/or video images;
 image management module 144;
 browser module 147;
 calendar module 148;
 widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which is, optionally, made up of a video player module and a music player module;
 notes module 153;
 map module 154; and/or
 online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
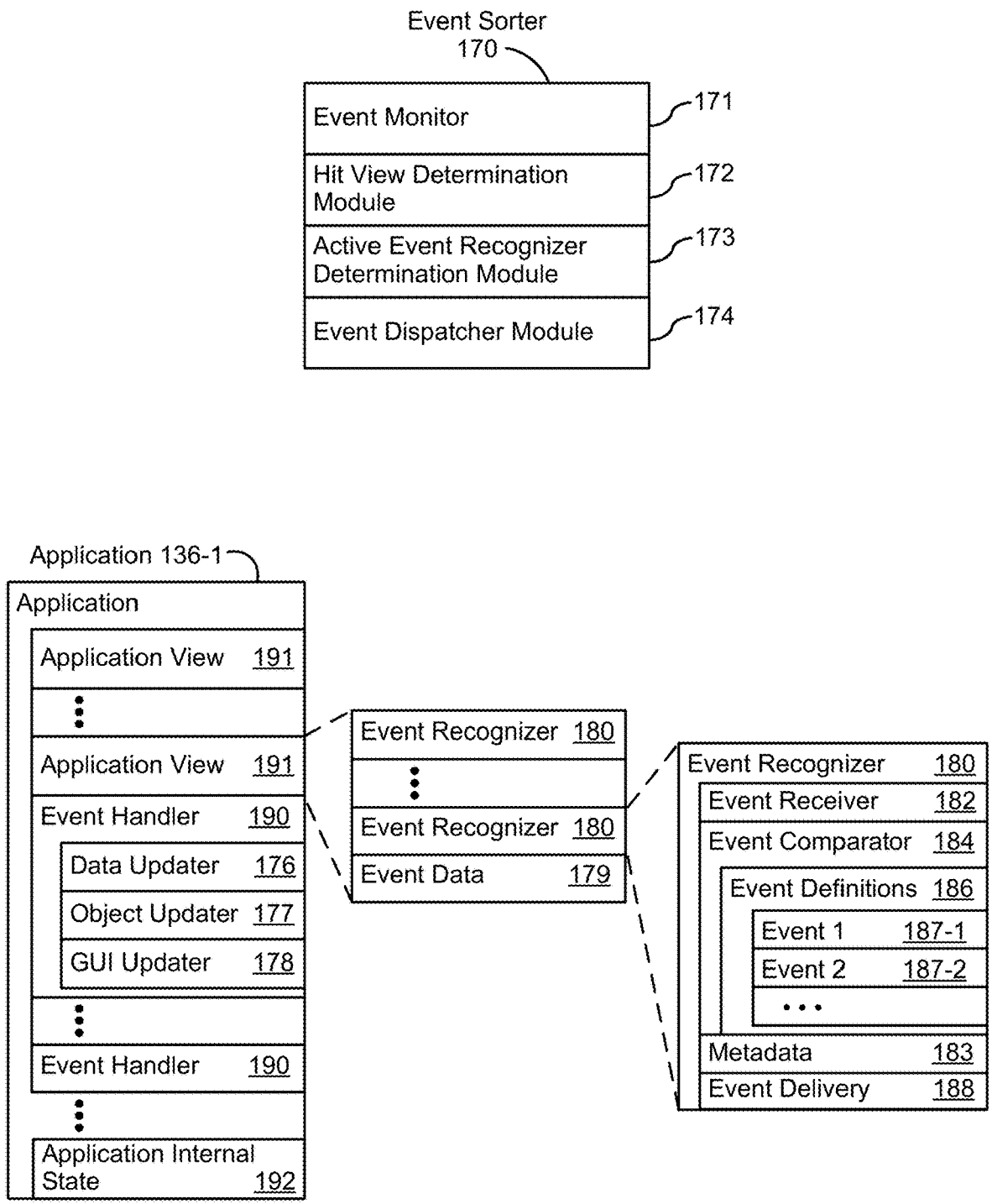
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIGS. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, a respective event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
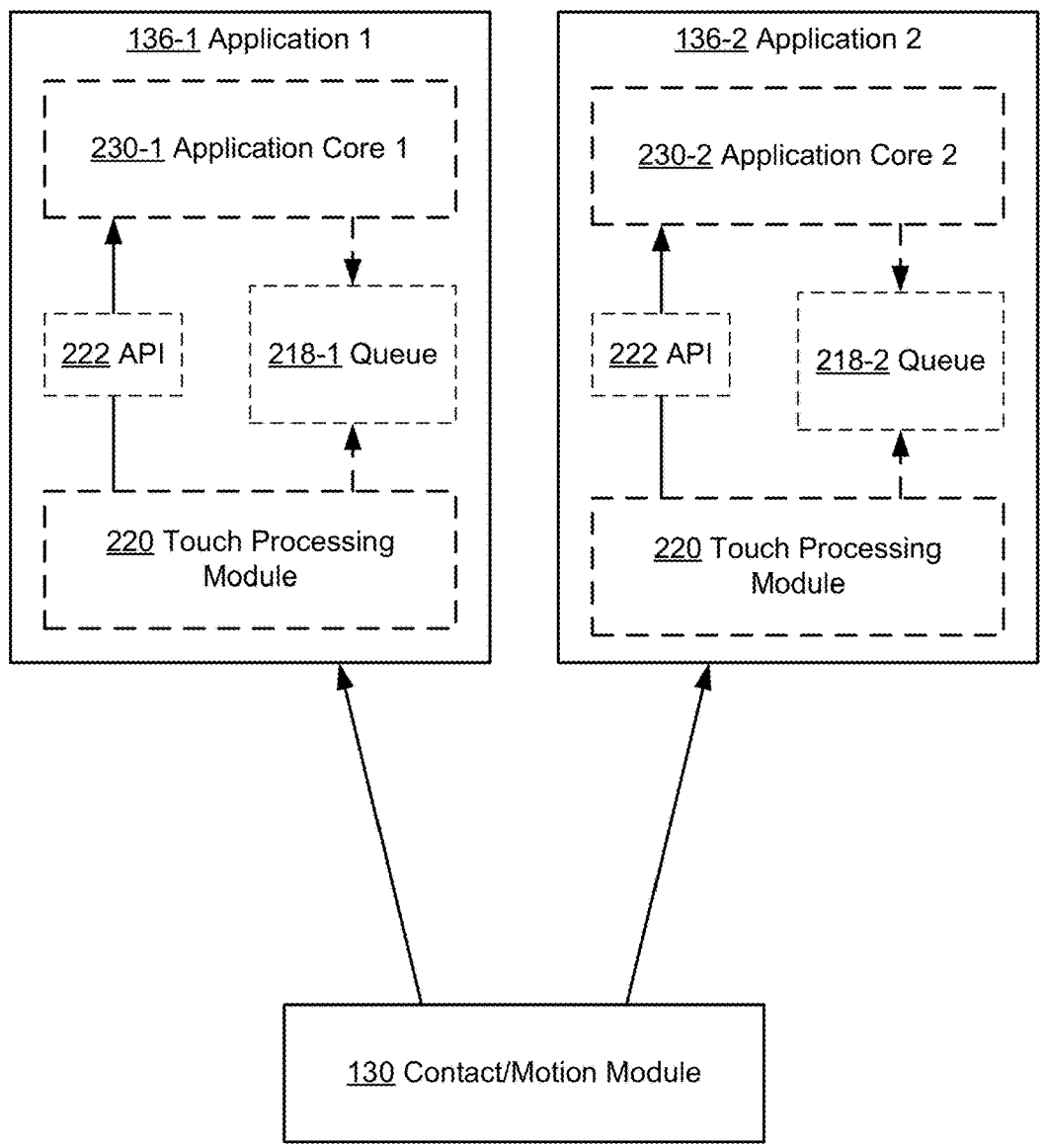
FIG. 1C is a block diagram illustrating transfer of an event object in accordance with some embodiments.

FIG. 1C is a block diagram illustrating transfer of an event object (e.g., event object 194 in FIG. 1D) in accordance with some embodiments.

As described above with respect to FIG. 1A, contact/motion module 130 determines status and/or a change in the status of a touch input. In some embodiments, the device generates signal or data (e.g., in the form of a data object) to transfer the determined status and/or the determined change in the status of a touch input to one or more software components. In some embodiments, the data object is called an event object (e.g., event object 194). An event object includes data that represents the status of a corresponding touch input. In some embodiments, event object 194 is a mouse event object (e.g., an event object that includes information for one or more mouse events, such as movement of a mouse, button clicks, etc.). In some other embodiments, event object 194 is a touch event object that is distinct from a mouse event object. In some embodiments, the touch event object includes data that represents touch-specific properties of a corresponding touch input (e.g., a number of concurrent touches, an orientation of a finger contact or a stylus, etc.). In some embodiments, event object 194 includes data that represents force event specific properties of a corresponding touch input (e.g., an intensity applied by the touch input, a force stage/phase of the touch input, etc.). For example, a mouse event object that includes information for one or more force events (e.g., an intensity applied by the touch input, a force stage/phase of the touch input, etc.) may be used.

In some embodiments, contact/motion module 130 generates (or updates) an event object and sends an event object to one or more applications (e.g., application 136-1, such as drawing module 380 in FIG. 3, and/or application 136-2, such as browser module 147). Alternatively, contact/information module 130 sends information regarding contacts (e.g., raw coordinates of contacts) to one or more applications (e.g., application 1 (136-1) and/or application 2 (136-2)), and an application that receives the information generates (or updates) one or more event objects. In some embodiments, an application includes touch-processing module 220 that generates (or updates) one or more event objects and sends the one or more event objects to a portion of the application other than touch-processing module 220. In some embodiments, touch-processing module 220 is application-independent (e.g., the same touch-processing module is included in each of multiple distinct applications, such as drawing application, browser application, etc.). As used herein, that touch-processing module 220 is application-independent means that touch-processing module 220 is not designed specifically for a particular software application. That touch-processing module 220 is application-independent does not mean that touch-processing module 220 is located separate from its associated application. Although touch-processing module 220, in some embodiments, is distinct and separate from its associated application, as shown in FIG. 1C, touch-processing module 220 is included in its associated application in some embodiments. In some embodiments, the application also includes an application core that is specific to the application.

In FIG. 1C, each of application 1 (136-1, such as a drawing application) and application 2 (136-2, such as a browser application) includes touch processing module 220. In addition, application 1 (136-1) includes application core 1 (230-1) that is specific to application 1 (136-1) and/or application 2 (136-2) includes application core 2 (230-2) that is specific to application 2 (136-2). For example, application core 1 (230-1) includes instructions for performing operations specific to application 1 (136-1) (e.g., drawing pen strokes) and application core 2 (230-2) includes instructions for performing operations specific to application 2 (136-2) (e.g., bookmarking a web page).

In some embodiments, event object 194 is sent directly to the destination (e.g., a software component, such as application core 1 (230-1)). Optionally, event object 194 is sent through application programming interface 222. In some embodiments, event object 194 is sent by posting event object 194 (e.g., in queue 218-1) for retrieval by application core 1 (230-1).

In some embodiments, event object 194 includes force information. In some embodiments, a mouse event object includes force information (e.g., raw or normalized force applied by the touch input). In some embodiments, a touch event object includes force information. In some embodiments, a force event object includes force information.

Figure 1D:
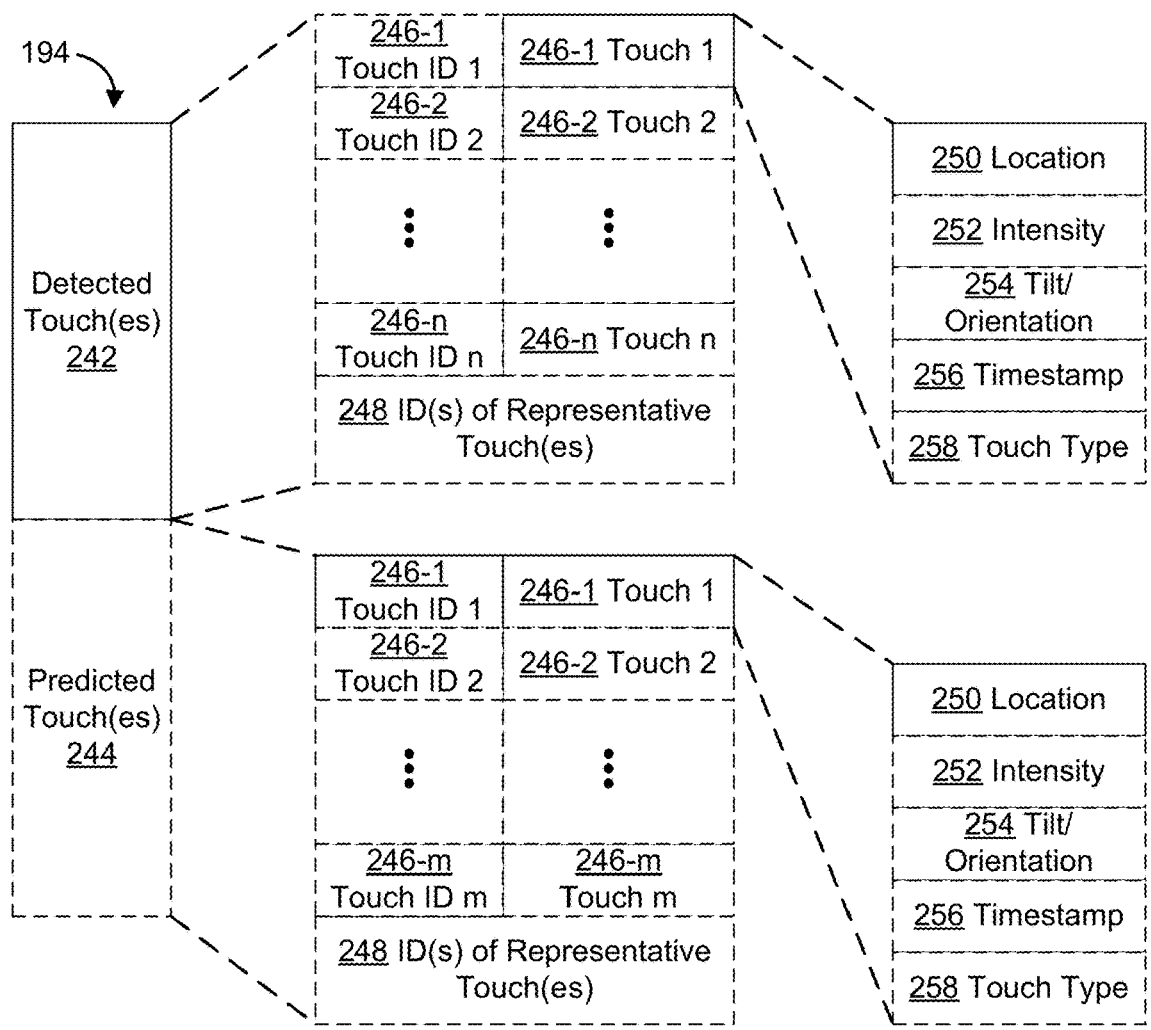
FIG. 1D is a block diagram illustrating a structure of an event object in accordance with some embodiments.

FIG. 1D is a block diagram illustrating a structure of event object 194 in accordance with some embodiments.

Event object 194 includes detected touch information 242 that corresponds to one or more detected touches. In some embodiments, detected touch information 242 includes information for separate detected touches (e.g., information 246-1 for touch 1, information 246-2 for touch 2, etc.). Detected touch information 242 optionally includes a touch identifier (e.g., touch identifier 1 (246-1) for touch 1, touch identifier 2 (246-2) for touch 2, etc.). In some embodiments, detected touch information 242 includes information that identifies representative touches (e.g., touch identifiers of representative touches).

Information for a separate touch includes location information 250 of a corresponding touch, and optionally, information 252 that identifies an intensity applied by the corresponding touch, information 254 that identifies tilt and/or orientation of a stylus associated with the device, timestamp 256 of the corresponding touch (e.g., timestamp 26 indicates time when the corresponding touch was detected), and/or type 258 of the corresponding touch (e.g., whether the corresponding touch is made with a finger or a stylus). In some embodiments, the values for some of these fields are predicted, even for detected touches (e.g., the force and/or tilt values for a detected touch are predicted due to latency in acquiring force and/or tilt information about the touch).

In some embodiments, event object 194 also includes predicted touch information 244 that corresponds to one or more predicted touches. The structure of predicted touch information 244 is similar to the structure of detected touch information 242 described above. For brevity, such details are not repeated herein.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 470 (e.g., as part of an inertial measurement unit (IMU)) for obtaining information concerning the location and positional state of stylus 203. FIG. 4 shows sensors 467, 469, and 470 coupled with peripherals interface 418. Alternately, sensors 467, 469, and 470 are, optionally, coupled with an input controller 460 in I/O subsystem 406. Stylus 203 optionally includes a GPS (or GLONASS or other global navigation system) receiver (not shown) for obtaining information concerning the location of stylus 203.

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. In some embodiments, the positional state is detected in accordance with raw output, from one or more electrodes in the stylus, that is sensed by a touch-sensitive surface (e.g., touch screen 112 of device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z axis 594 points in a direction normal to the plane of touch screen 112, x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis," are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on portable multifunction device 100.

Figure 6A:
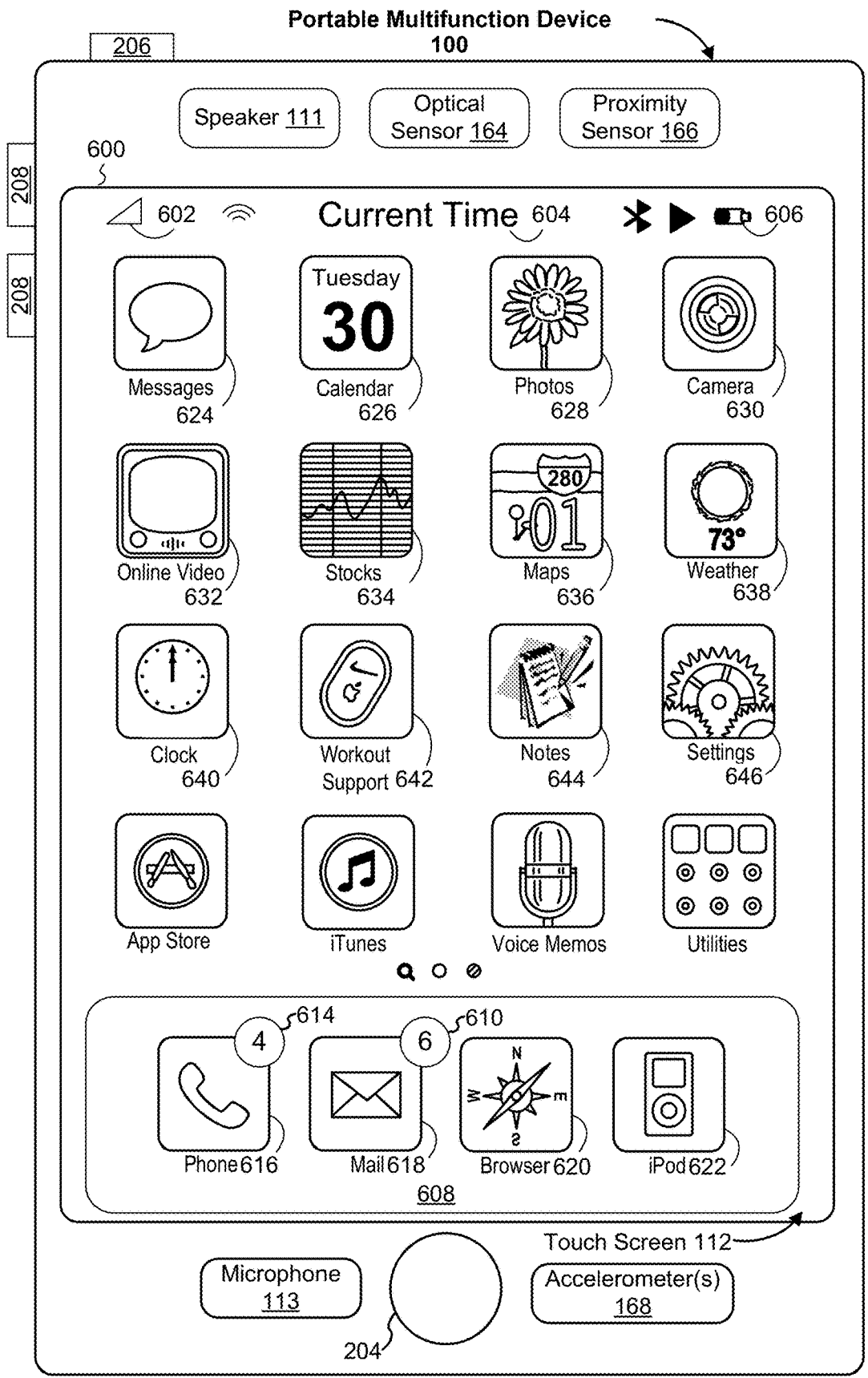
FIG. 6A illustrates an exemplary user interface for a menu of applications on a portable multifunction device in accordance with some embodiments.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

Signal strength indicator(s) 602 for wireless communication(s), such as cellular and Wi-Fi signals;
Time 604;
Bluetooth indicator 605;
Battery status indicator 606;
Tray 608 with icons for frequently used applications, such as:
  Icon 616 for telephone module 138, labeled "Phone," which optionally includes an indicator 614 of the number of missed calls or voicemail messages;
  Icon 618 for e-mail client module 140, labeled "Mail," which optionally includes an indicator 610 of the number of unread e-mails;
  Icon 620 for browser module 147, labeled "Browser;" and
  Icon 622 for video and music player module 152, also referred to as iPod (trademark of Apple Inc.) module 152, labeled "iPod;" and
Icons for other applications, such as:
  Icon 624 for IM module 141, labeled "Messages;"
  Icon 626 for calendar module 148, labeled "Calendar;"
  Icon 628 for image management module 144, labeled "Photos;"
  Icon 630 for camera module 143, labeled "Camera;"
  Icon 632 for online video module 155, labeled "Online Video;"
  Icon 634 for stocks widget 149-2, labeled "Stocks;"
  Icon 636 for map module 154, labeled "Maps;"
  Icon 638 for weather widget 149-1, labeled "Weather;"
  Icon 640 for alarm clock widget 169-6, labeled "Clock;"
  Icon 642 for workout support module 142, labeled "Workout Support;"
  Icon 644 for notes module 153, labeled "Notes;" and
  Icon 646 for a settings application or module, which provides access to settings for device 100 and its various applications 136.

It should be noted that the icon labels illustrated in FIG. 6A are merely exemplary. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
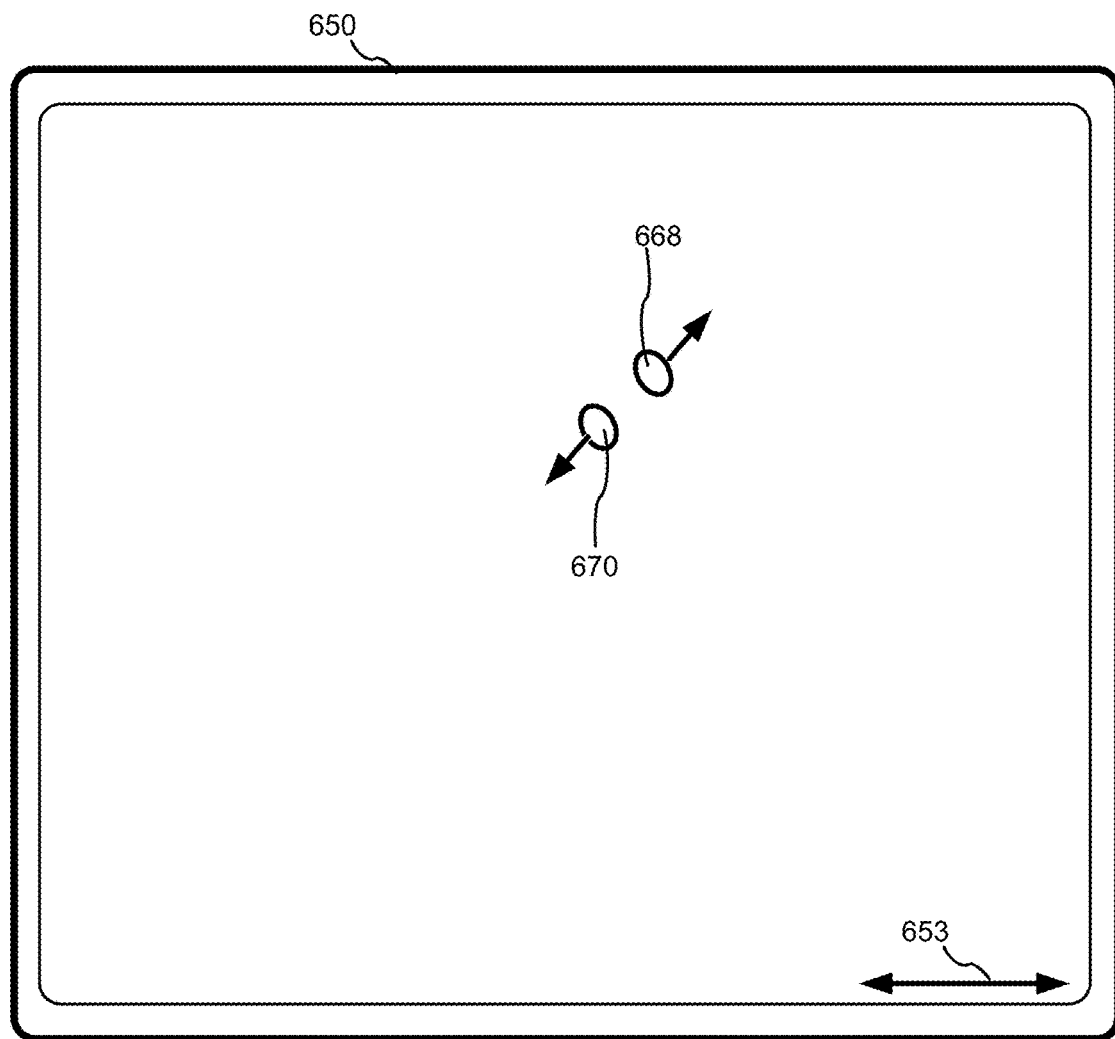
FIG. 6B illustrates an exemplary user interface for a multifunction device with a touch-sensitive surface that is separate from the display in accordance with some embodiments.
Figure 6B:
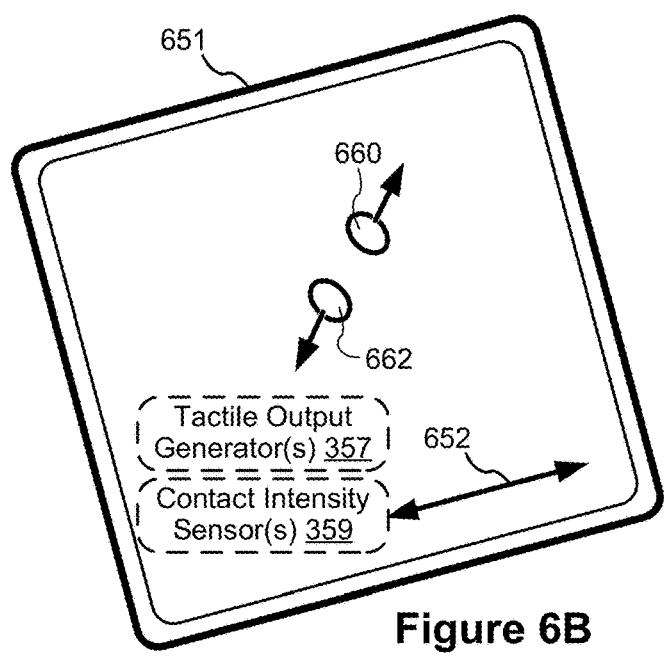

FIG. 6B illustrates an exemplary user interface on a device (e.g., device 300, FIG. 3) with a touch-sensitive surface 651 (e.g., a tablet or touchpad 355, FIG. 3) that is separate from the display 650. Device 300 also, optionally, includes one or more contact intensity sensors (e.g., one or more of sensors 359) for detecting intensity of contacts on touch-sensitive surface 651 and/or one or more tactile output generators 359 for generating tactile outputs for a user of device 300.

FIG. 6B illustrates an exemplary user interface on a device (e.g., device 300, FIG. 3) with a touch-sensitive surface 651 (e.g., a tablet or touchpad 355, FIG. 3) that is separate from the display 650. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the device detects contacts (e.g., 660 and 662 in FIG. 6B) with the touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact) or a stylus contact followed by movement of the stylus along the path of the swipe. As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple styluses are, optionally, used simultaneously, or finger and stylus contacts or a mouse and finger contacts are, optionally, used simultaneously.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 7A-7OO) described below optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector (e.g., a cursor) in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

Figure 7A:
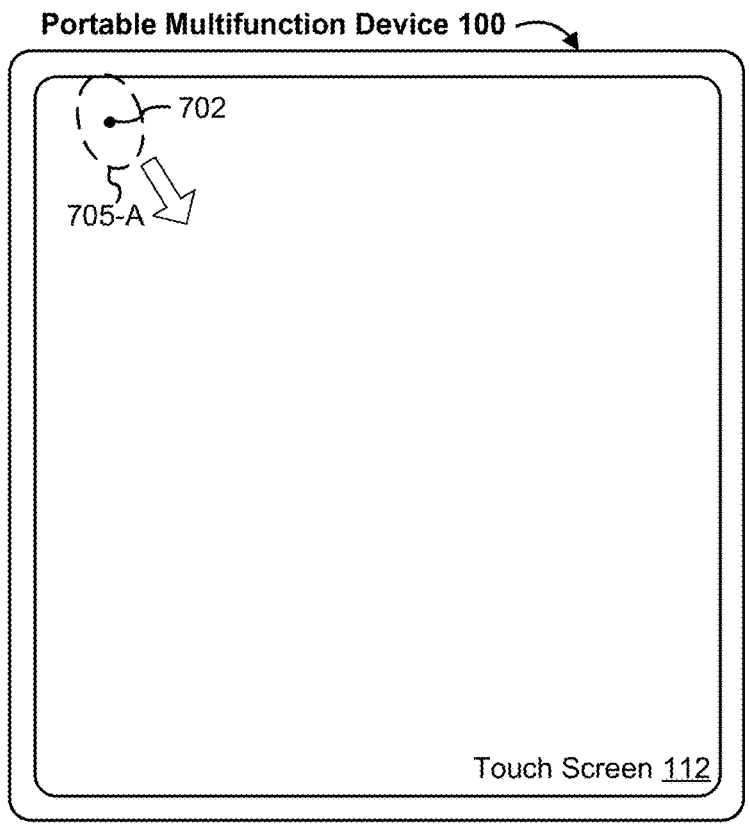
FIGS. 7A-7OO illustrate exemplary user interfaces for updating a user interface based on coalesced and/or predicted touch locations and related operations in accordance with some embodiments.
Figure 7A:
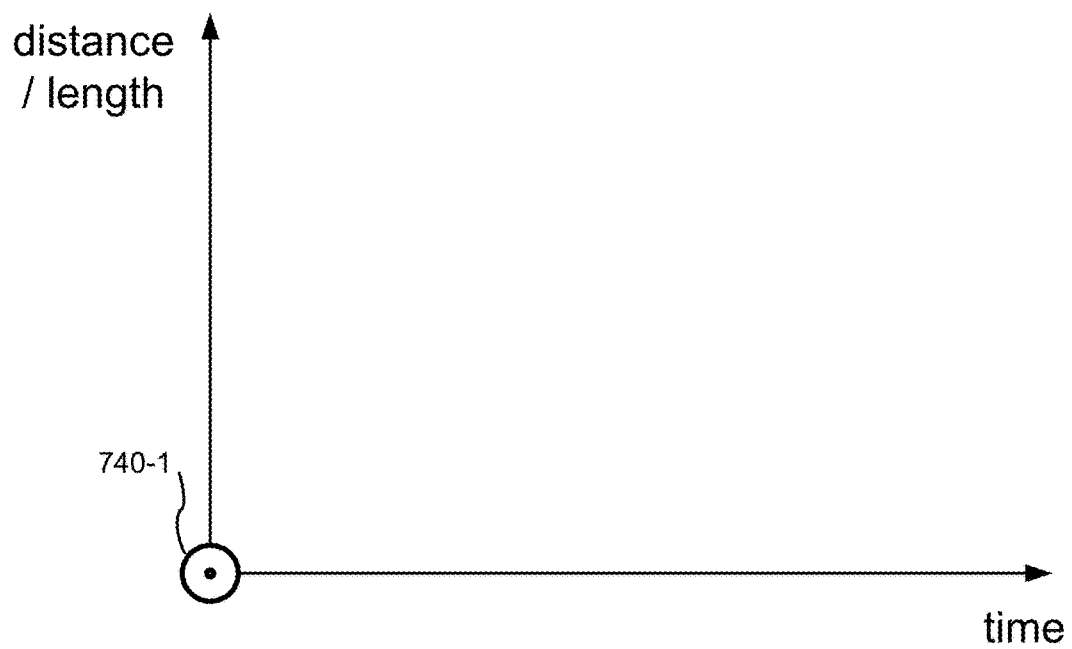
Figure 7B:
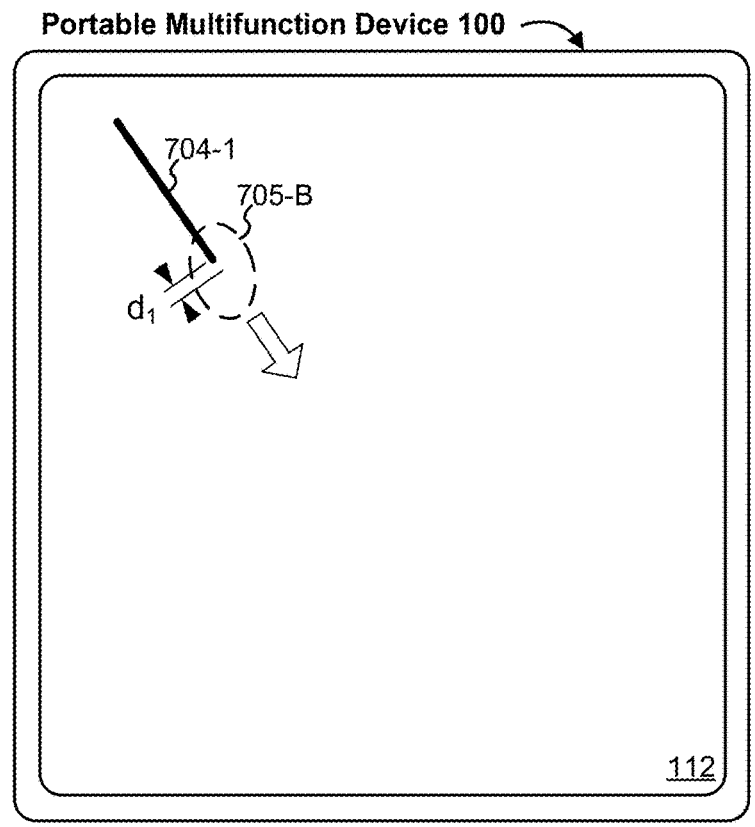
Figure 7B:
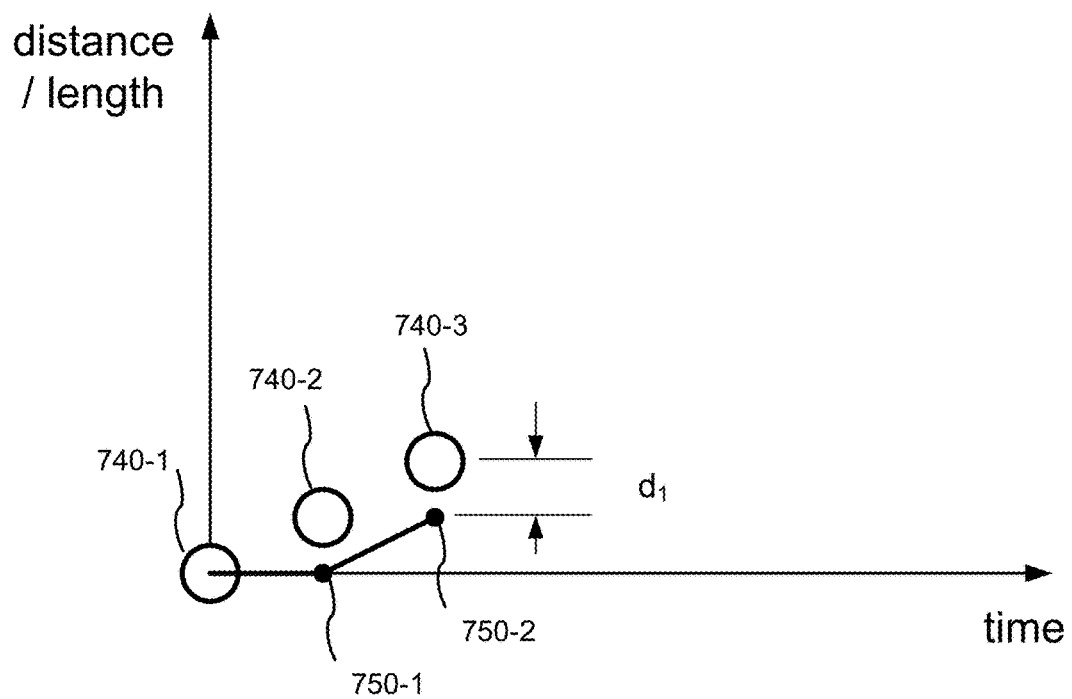
Figure 7C:
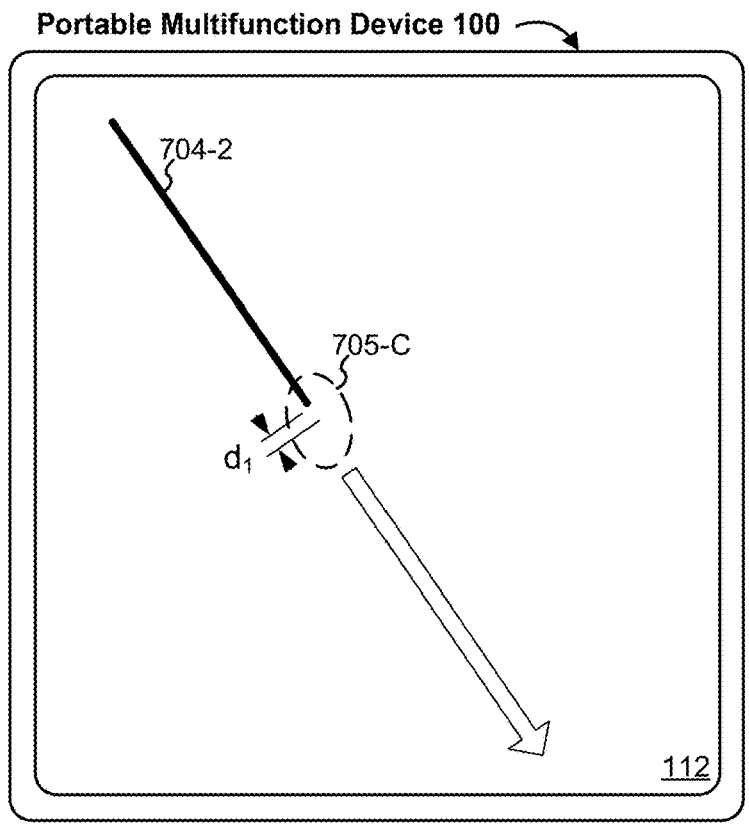
Figure 7C:
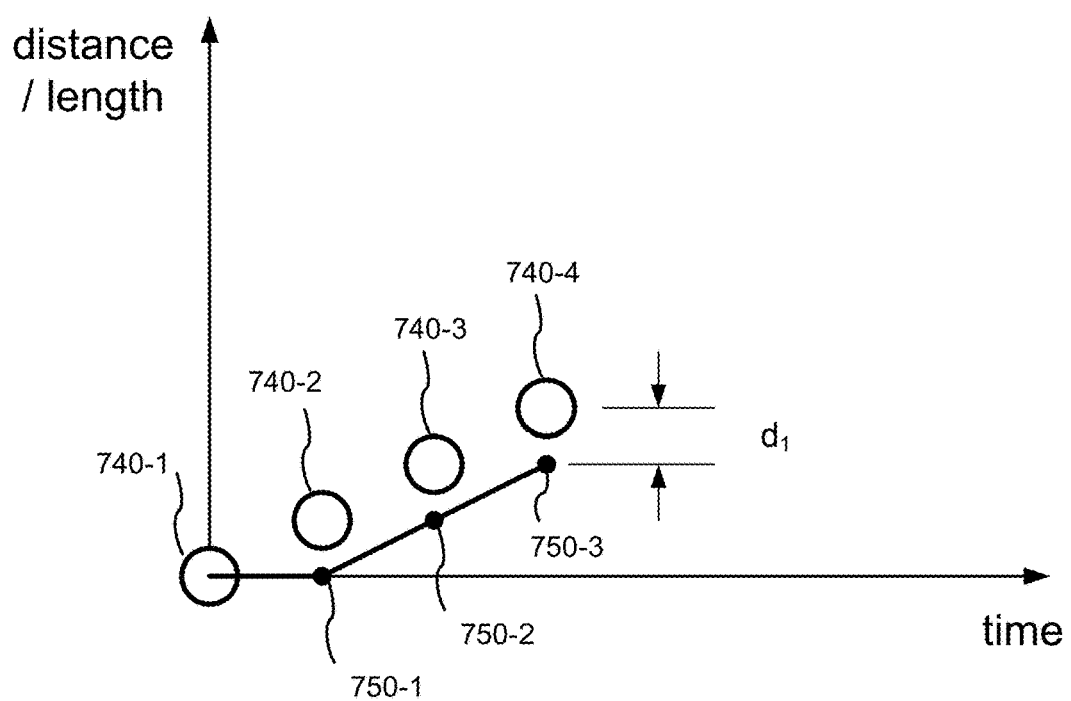
Figure 7D:
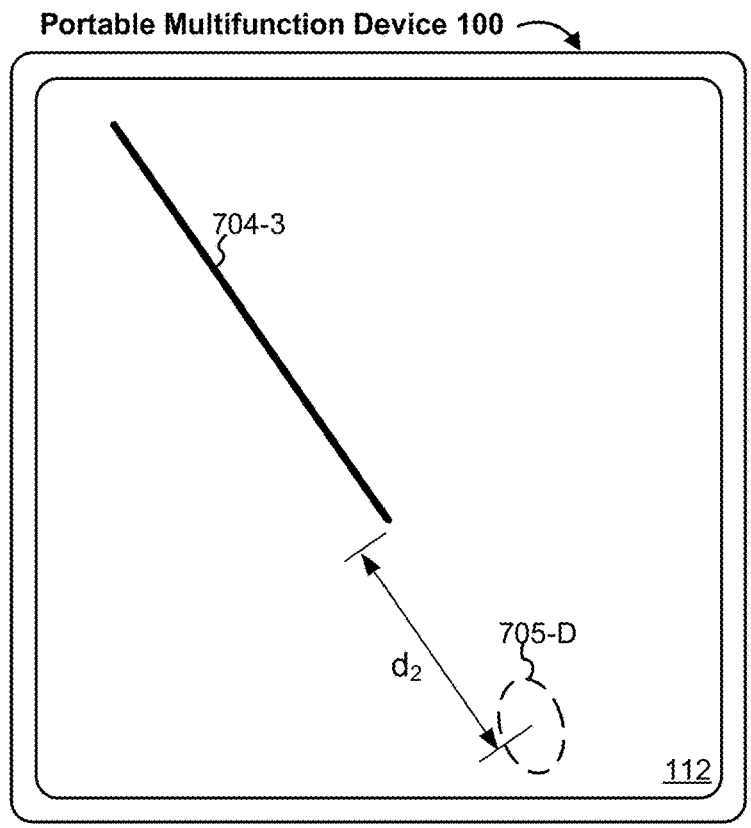
Figure 7D:
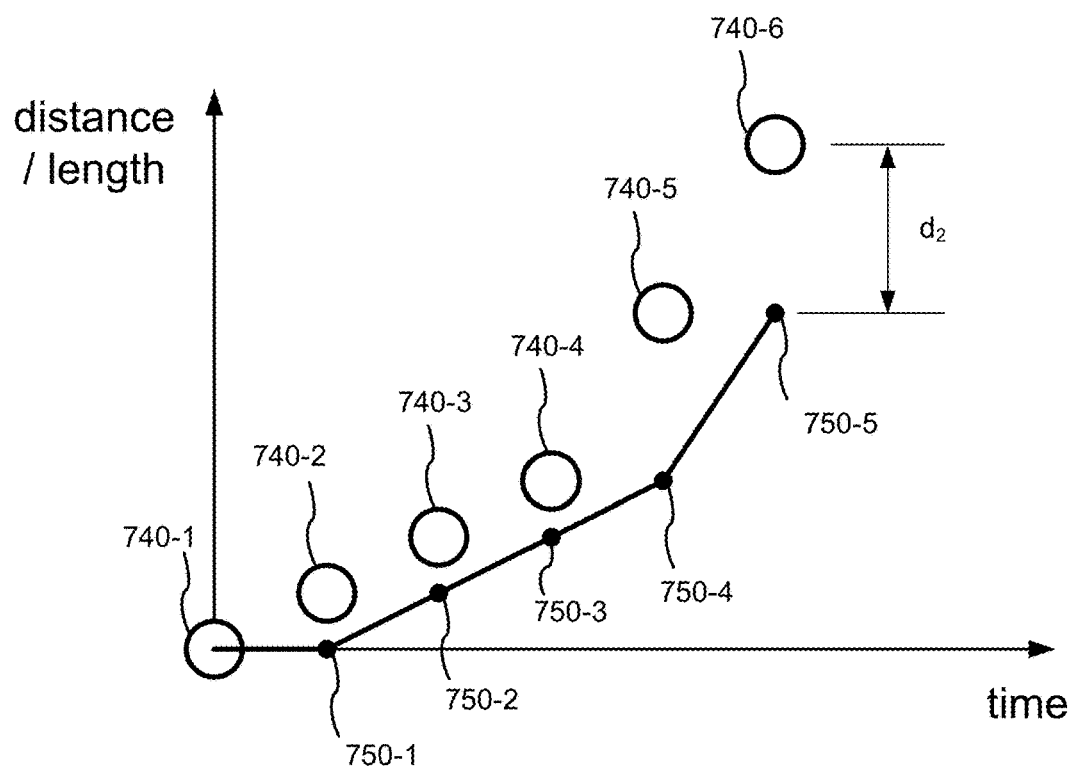
Figure 7E:
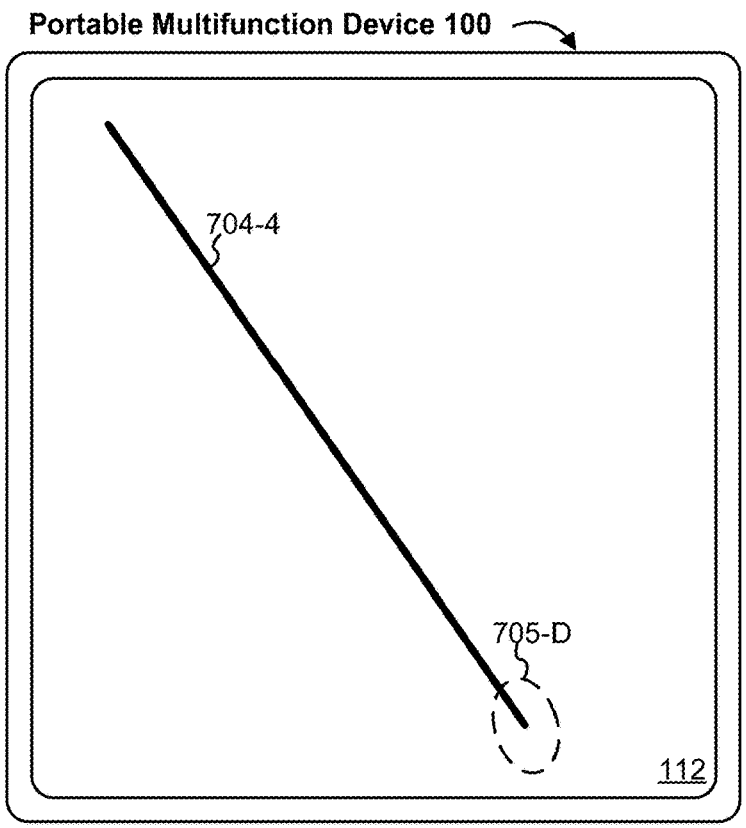
Figure 7E:
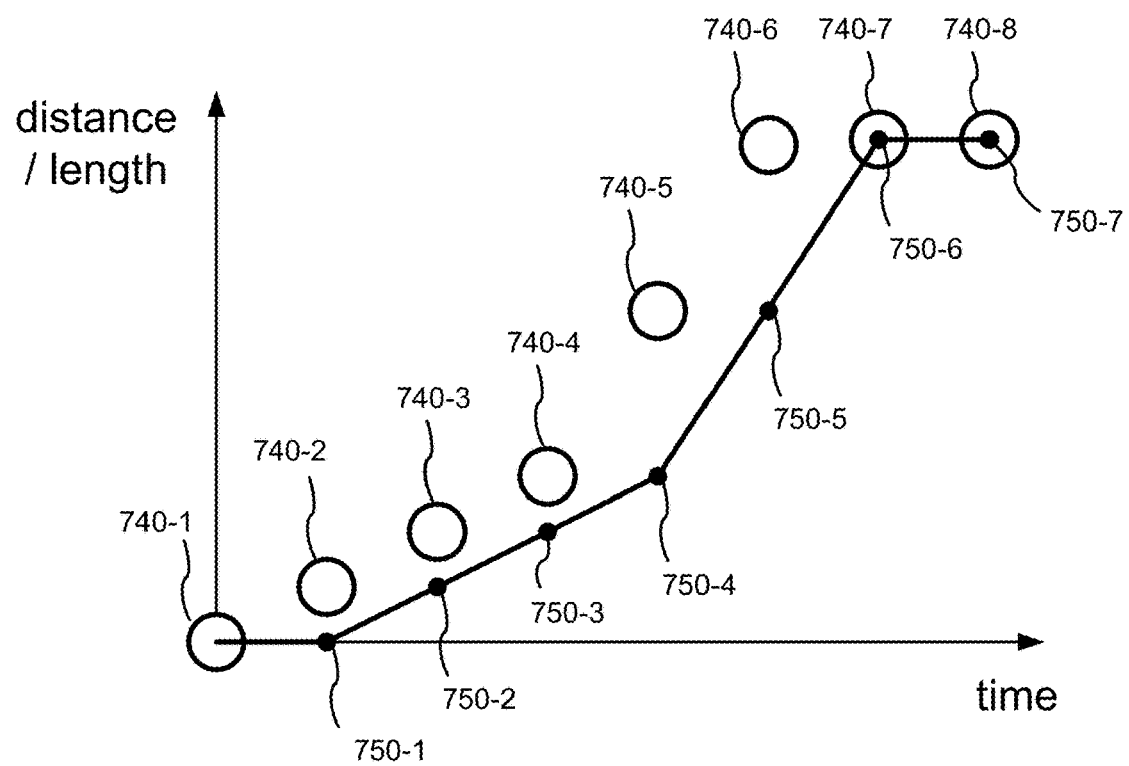
Figure 7F:
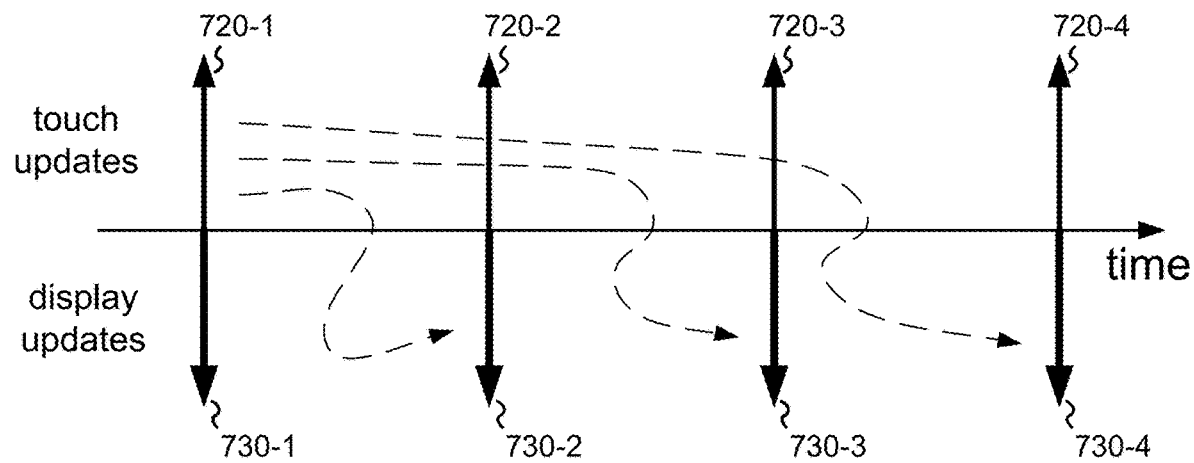
Figure 7G:
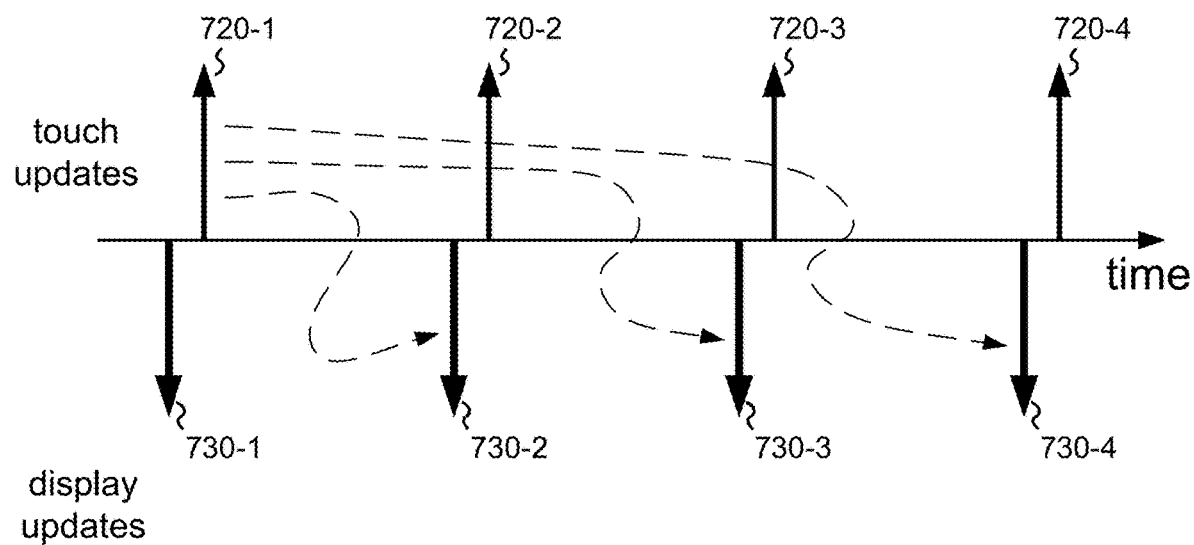
Figure 7H:
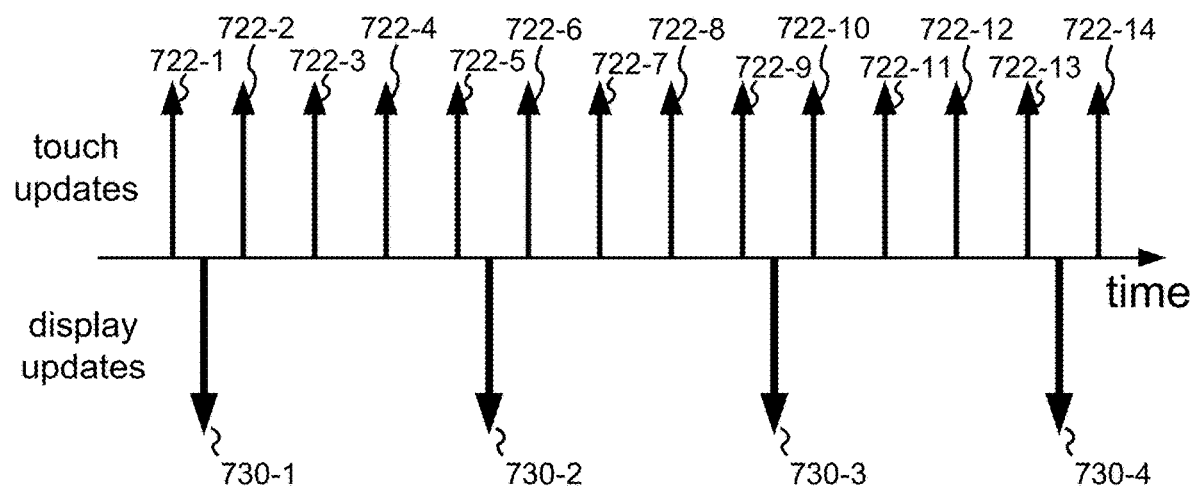
Figure 7I:
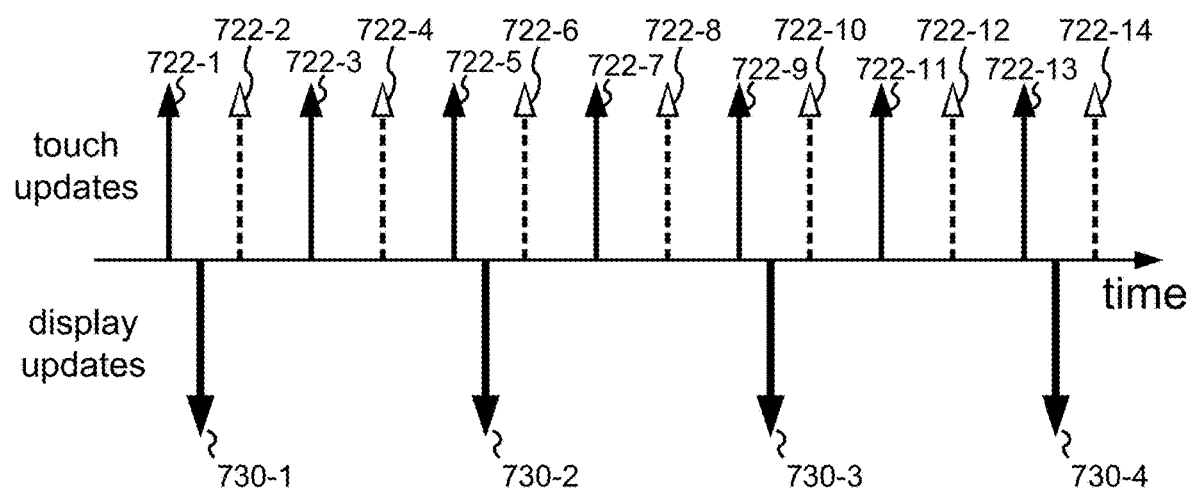
Figure 7J:
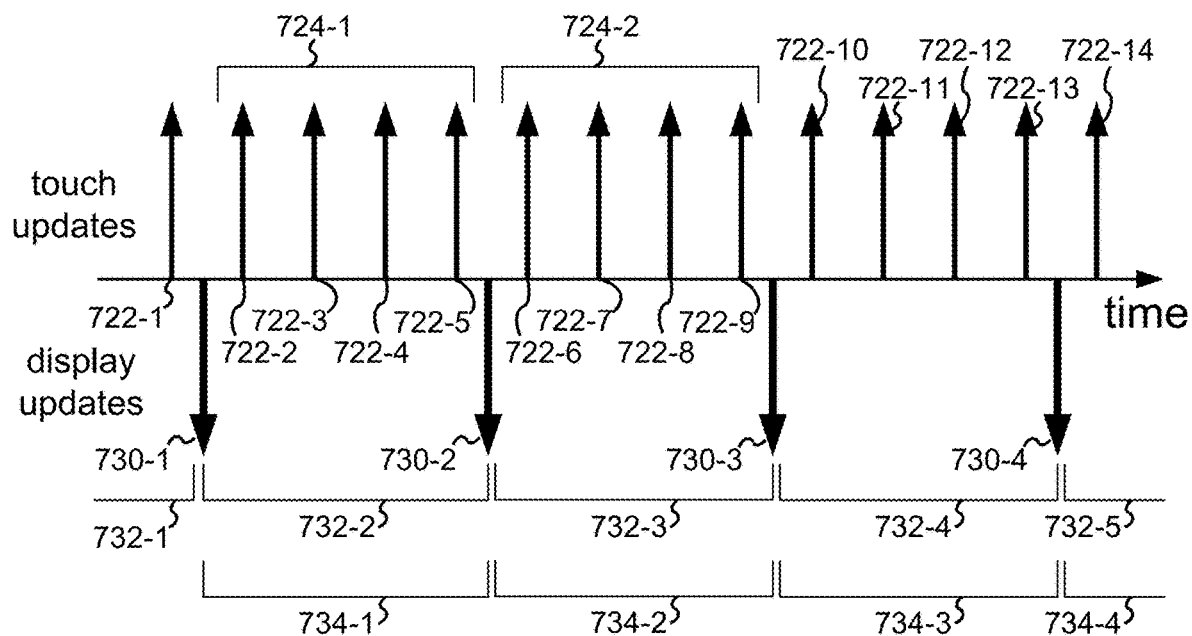
Figure 7K:
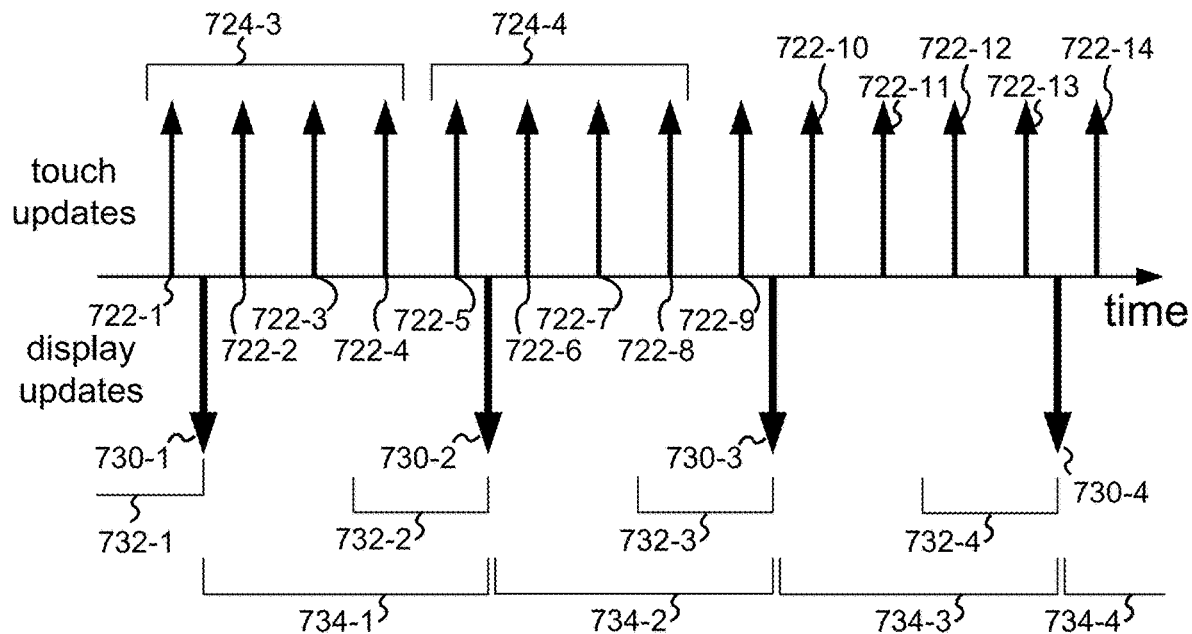
Figure 7L:
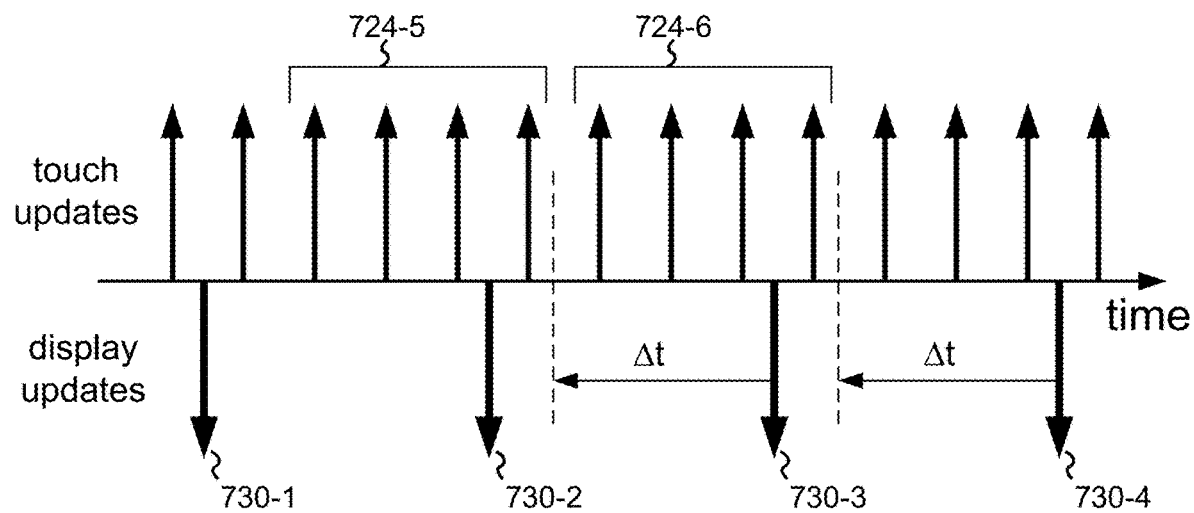
Figure 7M:
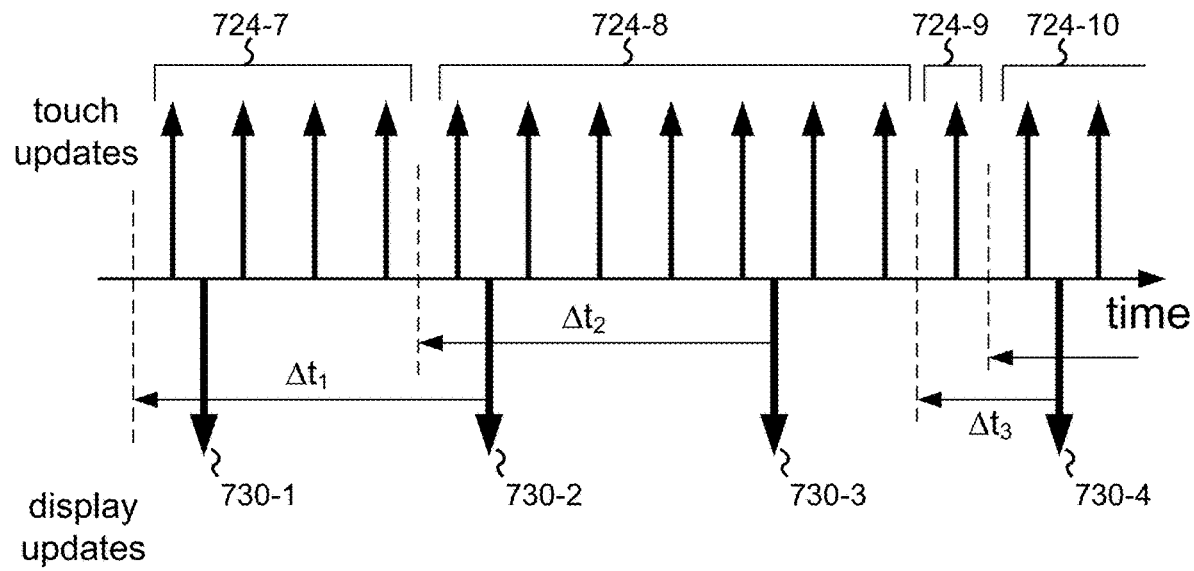
Figure 7N:
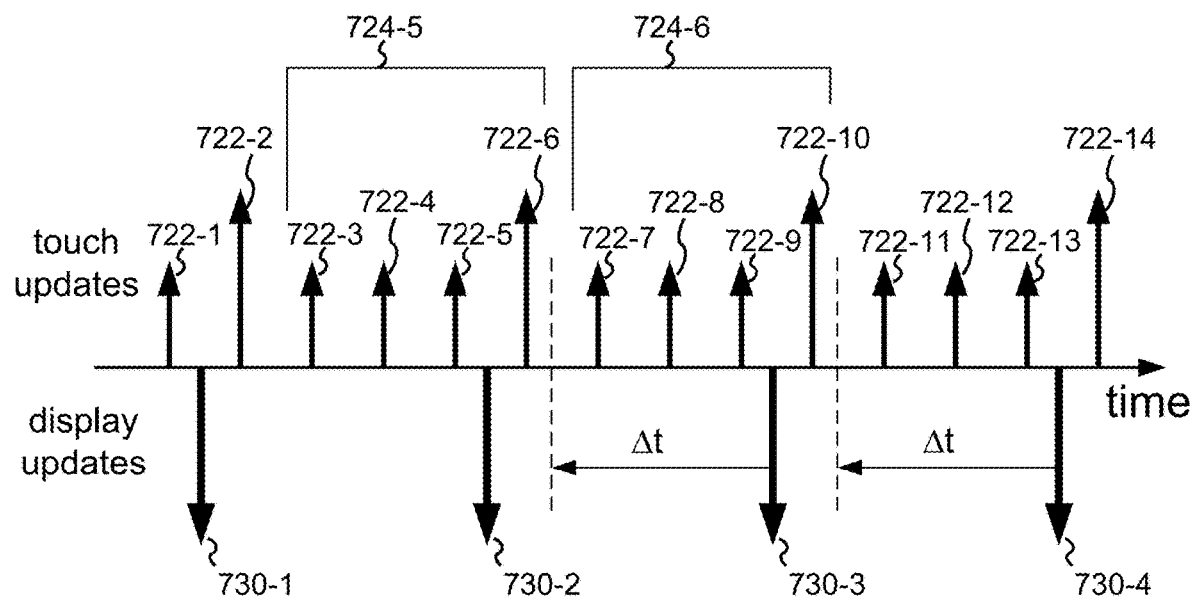
Figure 7O:
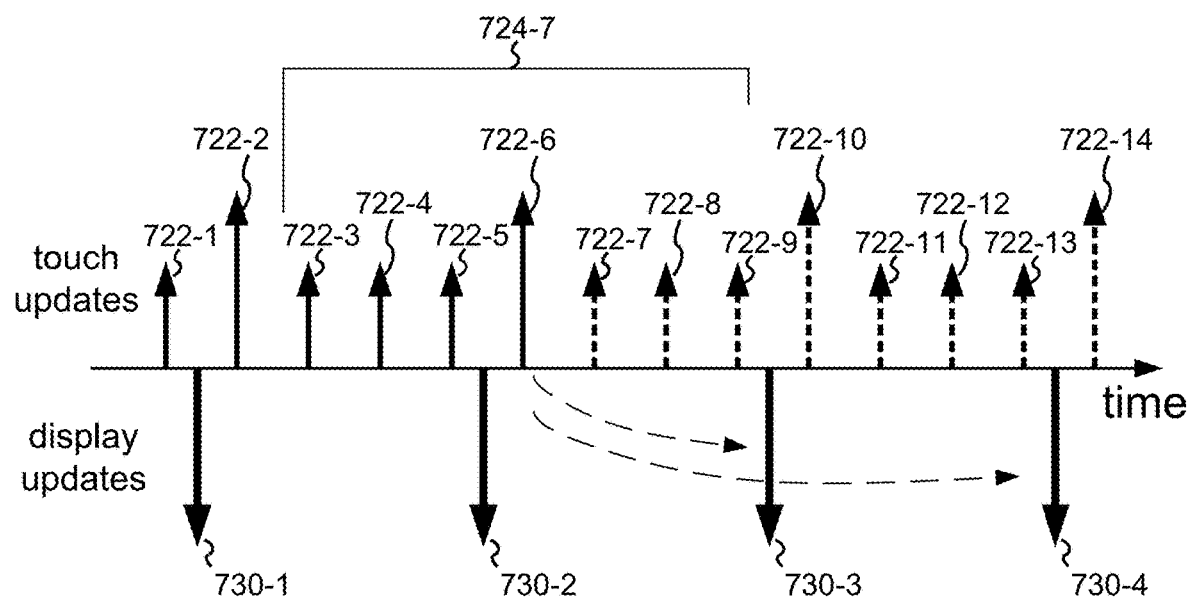
Figure 8A:
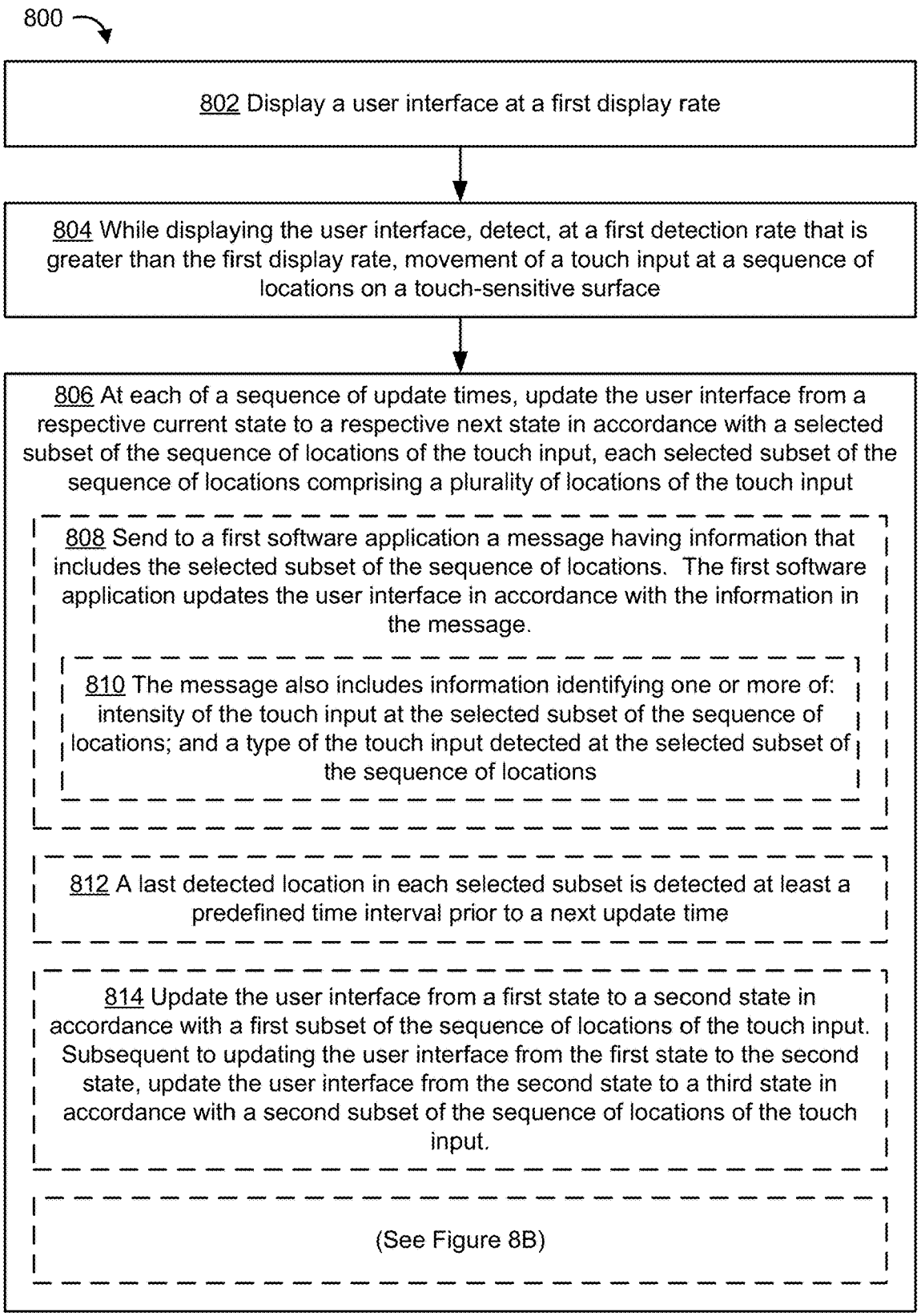
Figure 9A:
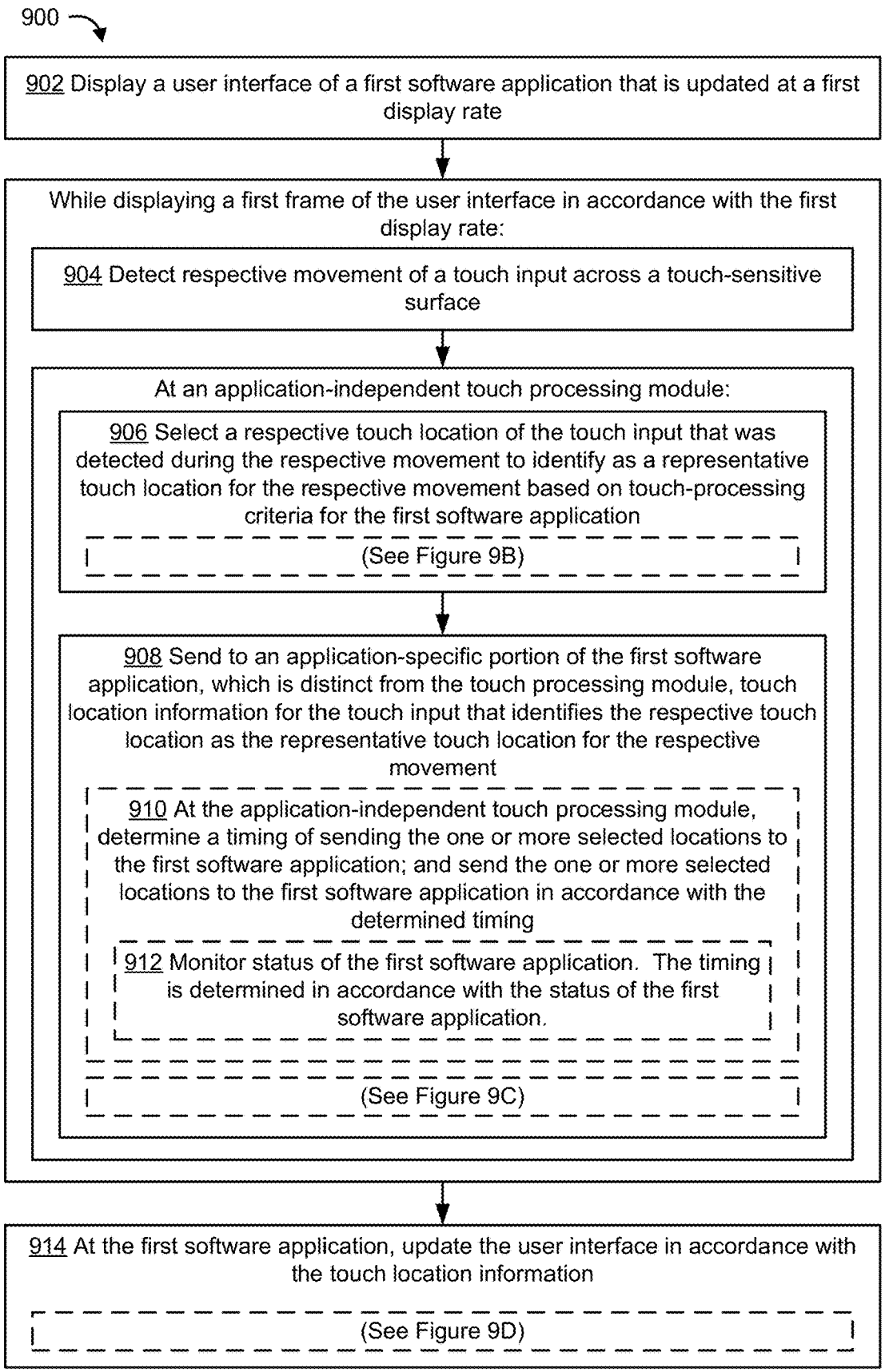

FIGS. 7A-7OO illustrate exemplary user interfaces for updating a user interface based on coalesced and/or predicted touch locations in accordance with some embodiments. The user interfaces in these figures are used to illustrate the processes described below, including the processes in FIGS. 8A-8B, 9A-9D, 10A-10C, and 11. Although some of the examples which follow will be given with reference to inputs on a touch-screen display (where the touch-sensitive surface and the display are combined), in some embodiments, the device detects inputs on touch-sensitive surface 651 that is separate from display 650, as shown in FIG. 6B.

In some embodiments, display 650 is configured to display a user interface at a particular display rate (also called a display refresh rate). For example, a particular monitor displays a user interface at 60 Hz (e.g., at a rate of 60 updates every second). In some embodiments, the display rate is a fixed display rate. As used herein, a display frame refers to a user interface that is displayed during a single display cycle (e.g., a user interface that is displayed for ~0.1667 second when the display rate is 60 Hz, and subsequently replaced with a subsequent user interface).

In some embodiments, touch-sensitive surface 651 is configured to detect a touch input at a particular detection rate. In some embodiments, the detection rate is a fixed detection rate (e.g., 60 Hz).

In some cases, there are delays between detecting a touch input and updating a user interface in response to the touch input, such as delays in processing the touch input and/or delays in preparing a user interface (prior to rendering the user interface). Such delays can lead to a discrepancy between a physical location of a touch input on touch screen 112 and updates to a user interface displayed on touch screen 112. An example of which is illustrated in FIGS. 7A-7E.

FIG. 7A illustrates a user interface of a drawing application on touch screen 112. In FIG. 7A, touch input 705 is detected at location 705-A on touch screen 112. FIG. 7A also illustrates that, in response to detecting touch input 705, 702 dot is displayed on touch screen 112.

FIG. 7B illustrates that touch input 705 has moved across touch screen 112 to location 705-B on touch screen 112. In FIG. 7B, line 704-1 is displayed in accordance with movement of touch input 705 from location 705-A to location 705-B. However, due to delays in processing a touch input, an end point of line 704-1 does not precisely match the location of touch input 705 (e.g., location 705-B) while touch input 705 is moving across touch screen 112.

FIG. 7B also includes a graph to describe this effect. In the graph of FIG. 7B, movement of touch input 705 is represented by increasing travel distances 740-1, 740-2, and 740-3 over time. In some embodiments, due to delays, when the travel distance is at 740-2, a user interface prepared based on travel distance at 740-1 is displayed (750-1). Similarly, when the travel distance is at 740-3, travel distance 740-2 is used as length 750-2 of line 704-1, and there is discrepancy $d_1$ between the actual travel distance (e.g., 740-3) and the displayed length (e.g., 750-2) of line 704-1 drawn in accordance with the touch input. In some embodiments, these travel distances correspond to travel distance during a constant time interval (e.g., a single display-update frame, or the amount of time between when a touch is detected on the touch-sensitive surface to when a display update that takes into account changes to the user interface is generated in response to the touch), so that the different distances correspond to different speeds (e.g., a larger change in distance over a respective time interval corresponds to a faster movement of the contact across the touch-sensitive surface, while a shorter change in distance over the respective time interval corresponds to a slower movement of the contact across the touch-sensitive surface).

FIG. 7C illustrates continued movement of touch input 705 across touch screen 112 to location 705-C. In the graph, when the travel distance is at 740-4, travel distance 740-3 is used as length 750-3 of line 704-2.

FIG. 7D illustrates faster movement of touch input 705 across touch screen 112 to location 705-D. When the travel distance is at 740-6, travel distance 740-5 is used as length 750-5 of line 704-3, and there is discrepancy $d_2$ between the actual travel distance (e.g., 740-6) and the displayed length (e.g., 750-5) of line 704-3.

As shown in FIGS. 7B-7D, the discrepancy is relatively small when the touch input moves across touch screen 112 at a slow speed, and the discrepancy is less noticeable. However, the discrepancy increases with faster movement of the touch input across touch screen 112, and the discrepancy becomes more noticeable.

FIG. 7E illustrates that touch input 705 remains at location 705-D on touch screen 112 for a period of time (e.g., one or more frames at the display rate), that corresponds to the delay between receiving a touch input and displaying a user interface that is updated based on the touch input. While touch input 705 remains at location 705-D on touch screen 112, a user interface prepared based on travel distance 740-6 is displayed, in which length 750-7 of line 704-4 matches travel distance 740-8 of touch input 705.

As explained above, the delay between receiving a touch input and displaying a user interface that is updated based on the touch input leads to a discrepancy between the physical location of the touch input and a position of the touch input reflected in the displayed user interface.

Although FIGS. 7B-7E, the delay between receiving a touch input and displaying a user interface that reflects a status (e.g., a location) of the touch input corresponds to a single display frame, in some embodiments, the delay corresponds to more than one display frame.

FIGS. 7F-7O are timing diagrams that show timing of receiving touch inputs (or changes to touch inputs) and timing of displaying (or updating) user interfaces in accordance with some embodiments. In FIGS. 7F-7O, upward arrows (e.g., 720 and 722) represent timing of touch inputs (or changes to touch inputs) and downward arrows 730 represent timing of displaying (or updating) user interfaces.

FIG. 7F illustrates that touch inputs are received at different times 720-1, 720-2, 720-3, and 720-4 and a user interface is updated at times 730-1, 730-2, 730-3, and 730-4. In FIG. 7F, the detection rate and the display rate are the same (e.g., both the detection rate and the display rate are 60 Hz). In FIG. 7F, the detection rate and the display rate are synchronized (e.g., there is no phase difference). For example, the touch input received at 720-1 is concurrent with an update to the user interface at 730-1. Similarly, the touch input received at 720-2 is concurrent with an update to the user interface at 730-2.

FIG. 7F also illustrates that the touch input received at 720-1 is reflected after one display frame (e.g., 730-2), after two display frames (e.g., 730-3), or after three display frames (e.g., 730-4). In some embodiments, the touch input received is reflected after more than three display frames. In some embodiments, the number of display frames between receiving a touch input and displaying a user interface that reflects the received touch input is determined based on delay in processing the received touch input and preparing the user interface for display. In some embodiments, the delay between receiving a touch input and displaying a user interface that is updated based on the touch input includes time spent by one or more of: the touch-sensor hardware scanning to detect the touch, the contact-motion module identifying the touch and determining the application to which to deliver the touch (or touch events associated with the touch); the application processing the touch to determine how to update the display in response to the touch, and generating display update information; an operating system graphics component (e.g., a display driver) rendering a display frame based on the display update information from the application; a graphics processing unit (GPU) converting the display frame generated by the operating system graphics component into display update instructions (e.g., a map of pixels to be displayed on the display); and a display refresh operation (e.g., the time spent actually updating the pixels of the display to reflect the display update instructions and show the updates to the user interface generated by the application in response to receiving the touch).

FIG. 7G is similar to FIG. 7F except that the detection rate and the display rate are not synchronized. In FIG. 7G, the detection rate and the display rate are the same (e.g., both the detection rate and the display rate are 60 Hz). However, there is phase difference between detection timing and display timing. For example, timing of receiving touch inputs is offset from timing of updating the user interface.

FIG. 7G also illustrates that the touch input received at 720-1 is reflected in a next display frame (e.g., 730-2), in a display frame subsequent to the next display frame (e.g., 730-3), or in two display frames subsequent to the next display frame (e.g., 730-4). In some embodiments, the touch input received is reflected in a display frame subsequent to 730-4.

FIGS. 7F-7G illustrate timing of touch inputs and display updates in conventional devices in accordance with some embodiments. Such conventional devices suffer from the delays described above with respect to FIGS. 7A-7E.

FIGS. 7H-7O are timing diagrams that show detection rates (e.g., a touch detection rate that corresponds to a rate at which a touch-sensitive surface is scanned for changes in touch data that is interpreted as touches and touch events) higher than a display rate (e.g., a display refresh rate that corresponds to the frequency with which the pixels on the display are redrawn) in accordance with some embodiments.

FIG. 7H illustrates that touch inputs 722 are received at a detection rate that is four times a display rate. In FIG. 7H, touch inputs are received four times while a display is updated once (e.g., the detection rate is 240 Hz and the display rate is 60 Hz).

In some embodiments, touch inputs are received at a rate that is less than a touch-sensitive surface (or one or more touch sensors) is capable of receiving touch inputs. For example, FIG. 7I illustrates that, while the touch-sensitive surface is capable of receiving touch inputs at a detection rate that is four times a display rate (e.g., the touch-sensitive surface is capable of receiving (or detecting) touch inputs four times within each display frame), only touch inputs are received only twice within each display frame (e.g., touch inputs are received at 722-3 and 722-5, and the device forgoes receiving touch inputs at 722-2 and 722-4). In some embodiments, whether to receive more or fewer touch inputs within each display frame is determined by the device based on predefined criteria, such as accuracy requirements, available computing resources, etc. In some embodiments, a number of touch inputs received within each display frame is adjusted dynamically by the device based on the predefined criteria (e.g., receiving more touches when the discrepancy between the current detected location of the touch and the actual location of the touch is likely to be greater than a predefined amount, such as when the touch is moving quickly or larger discrepancies have been detected in recent display frames, and receiving fewer touches when the discrepancy between the current detected location of the touch and the actual location of the touch is smaller than the predefined amount, such as when the touch is moving slowly or smaller discrepancies have been detected in recent display frames).

FIGS. 7J-7K illustrate touch detection frames, touch processing frames, and touch display frames in accordance with some embodiments.

FIG. 7J illustrates that touch detection frame 724-1 includes touch inputs at 722-2, 722-3, 722-4, and 722-5 and touch detection frame 724-2 includes touch inputs at 722-6, 722-7, 722-8, and 722-9.

FIG. 7J also illustrates touch processing frames 732-1, 732-2, 732-3, 732-4, and 732-5. In some embodiments, a touch processing frame completely overlaps with a touch detection frame (e.g., touch processing frame 732-2 completely overlaps with touch detection frame 724-1). In some embodiments, touch inputs (or corresponding locations) in touch detection frame 724-1 are processed during touch processing frame 732-2 (which overlaps with touch detection frame 724-1), and displayed during display frame 734-2. In some embodiments, touch inputs (or corresponding locations) in touch detection frame 724-1 are processed during touch processing frame 732-3 (which does not overlap with touch detection frame 724-1), and displayed during display frame 734-3.

FIG. 7K is illustrates that touch detection frame 724-3 includes touch inputs at 722-1, 722-2, 722-3, and 722-4 and touch detection frame 724-4 includes touch inputs at 722-5, 722-6, 722-7, and 722-8. In FIG. 7K, a touch detection frame is not aligned with a display frame (e.g., touch detection frame 724-4 includes touch 722-5 that is received during display frame 734-1 and touch 722-6 that is received during display frame 734-2). In some embodiments, touch inputs in touch detection frame 724-3 are processed during touch processing frame 732-2, which partially overlaps with touch detection frame 724-3, and displayed during display frame 734-2.

FIGS. 7L and 7M illustrate selection of touch inputs based on timing criteria in accordance with some embodiments.

FIG. 7L illustrates that a group of touch inputs is selected based on first predefined timing criteria. For example, group 724-5 of touch inputs is selected so that touch inputs in group 724-5 precedes a subsequent timing of updating a user interface by at least a particular timing margin (e.g., $\Delta t$). In FIG. 7L, a last touch input in group 724-5 precedes timing 730-3 for updating a user interface by the particular timing margin (e.g., $\Delta t$). FIG. 7L also illustrates that the same timing margin is used for each selection. For example, group 724-6 of touch input is selected touch inputs in group 724-6 also precedes subsequent timing 730-4 of updating a user interface by at least the same particular timing margin (e.g., $\Delta t$).

FIG. 7M illustrates use of different timing margins. In FIG. 7M, group 724-7 of touch inputs is selected between a first point in time that precedes timing 730-2 for updating a user interface by timing margin $\Delta t_1$ and a second point in time that precedes timing 730-3 for updating the user interface by timing margin $\Delta t_2$. Touch inputs in group 724-8 are subsequent to touch inputs in a preceding group, namely group 7247-7, and precede timing 730-4 for updating the user interface by timing margin Ata. In some embodiments, different timing margins are used for defining respective touch processing frames, as shown in FIG. 7M.

FIG. 7N illustrates selection of representative touches in accordance with some embodiments. In FIG. 7N, set 724-5 of touch inputs includes touch inputs 722-3, 722-4, 722-5, and 722-6, and touch input 722-6 is selected as a representative touch (and a corresponding touch location is selected as a representative touch location) for set 724-5 of touch inputs. Similarly, set 724-6 of touch inputs includes touch inputs 722-7, 722-8, 722-9, and 722-10, and touch input 722-10 is selected as a representative touch (and a corresponding touch location is selected as a representative touch location) for set 724-6 of touch inputs. In FIG. 7N, a last touch input in the set 724-5 of touch inputs (e.g., touch input 722-6) is selected as a representative touch for set 724-5 of touch inputs. Alternatively, a first touch input in set 724-5 of touch inputs (e.g., touch input 722-3) or any other touch input in set 724-5 of touch inputs is selected as a representative touch for set 724-5 of touch inputs. Touch inputs that are located between representative touches (e.g., touch inputs 722-7, 722-8, and 722-9 between representative touches 722-6 and 722-10) are called herein interstitial touches (and their corresponding locations are called herein interstitial touch locations).

The selection of representative touches has the effect of shifting the touch processing frame. For example, selecting touch 722-6 as a representative touch for update time 730-3 has the effect of shifting the touch processing time by a quarter of a display update frame (e.g., ~16.667 ms) from selecting touch 722-5 as a representative touch. By shifting the touch processing time (through selection of touch 722-6 as a representative touch), the discrepancy between the detected touch and the displayed user interface is reduced (e.g., because more recent touch information from the shifted touch processing time is used for updating the user interface than touch information without shifting the touch processing time). Selecting touch 722-7 as a representative touch for update time 730-3 would have the effect of shifting the touch processing time by half of the display update frame (e.g., ~33.333 ms) and further reduce the discrepancy between the detected touch and the displayed user interface if there is sufficient processing margin time between touch 722-7 and update time 730-3. However, touch 722-7 does not precede update time 730-3 by processing margin time $\Delta t$, and thus, touch 722-7 is not selected as a representative touch for update time 730-3.

FIG. 7O illustrates that set 724-7 of touch inputs includes detected touches, such as representative touch 722-6 and interstitial touches 722-3, 722-4, and 722-5. In addition, set 724-7 includes one or more predicted touches. In FIG. 7O, set 724-7 includes predicted interstitial touches 722-7, 722-8, and 722-9. In some embodiments, set 724-7 includes one or more predicted representative touches (e.g., touch 722-10).

Figure 7P:
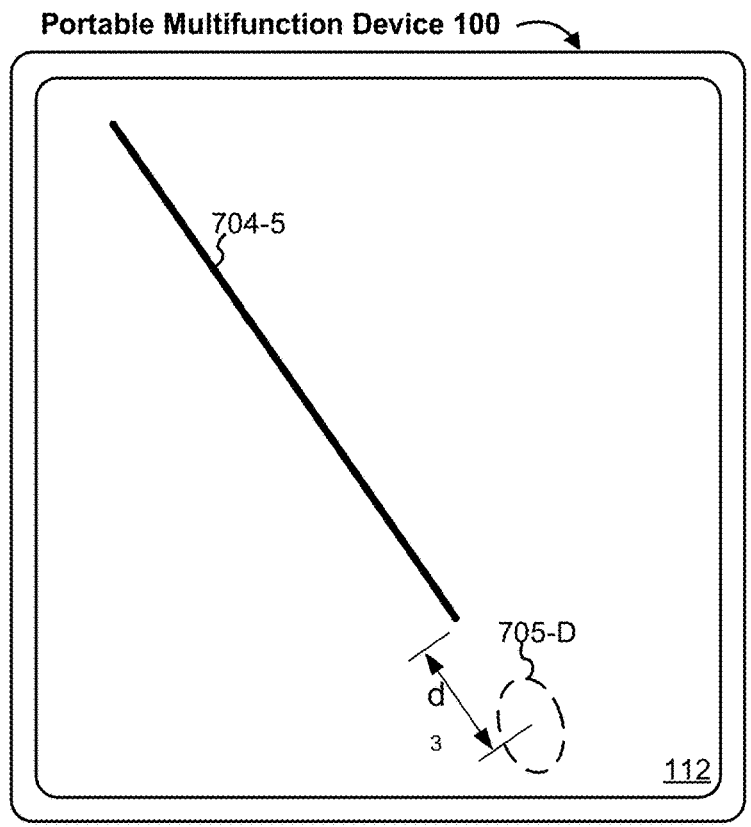
Figure 7P:
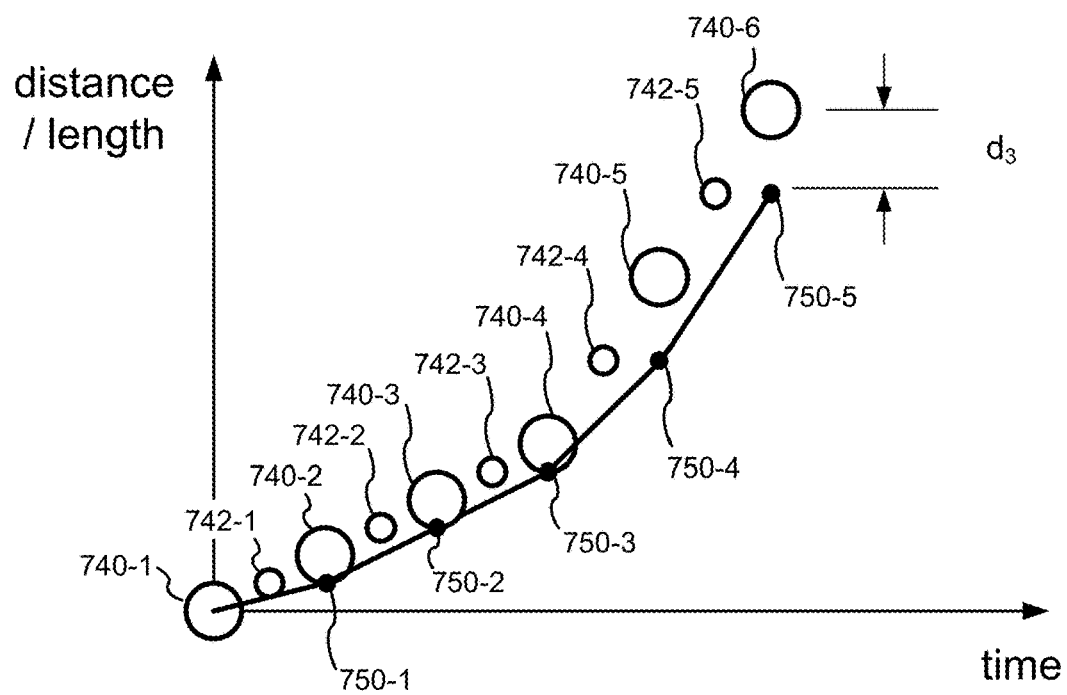

FIG. 7P illustrates use of interstitial touch locations in updating a user interface in accordance with some embodiments. FIG. 7P is similar to FIG. 7D except that interstitial locations 742-1, 742-2, 742-3, 742-4, and 742-5 are used to update the user interface. When the travel distance is at 740-6, travel distance 742-5 is used (instead of travel distance 740-5 as shown in FIG. 7D) as length 750-5 of line 704-5, and discrepancy $d_3$ between the actual travel distance (e.g., 740-6) and the displayed length (e.g., 750-5) of line 704-5 is reduced (e.g., less than discrepancy $d_2$ shown in FIG. 7D).

Figure 7Q:
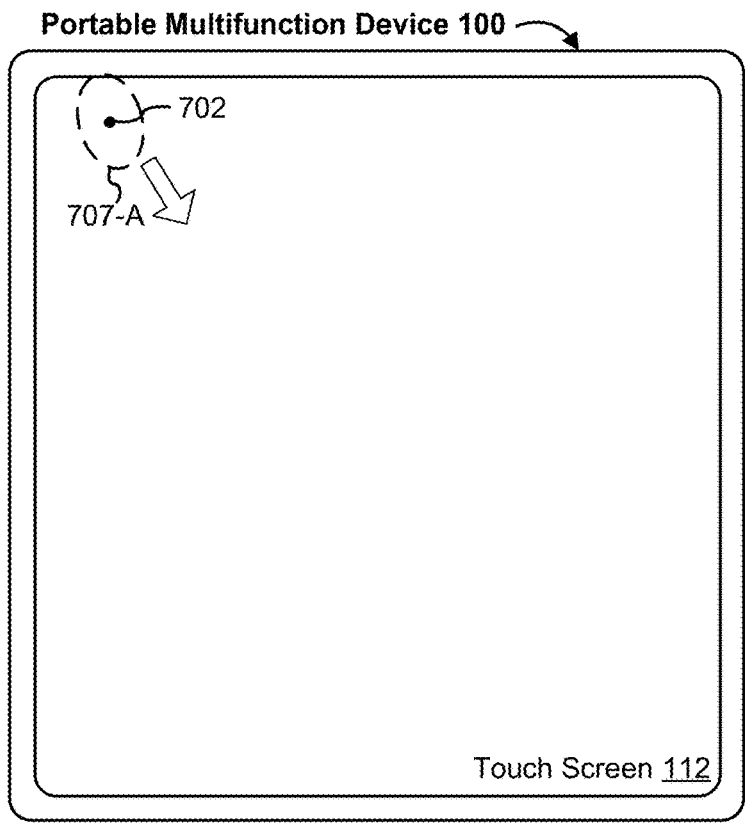
Figure 7Q:
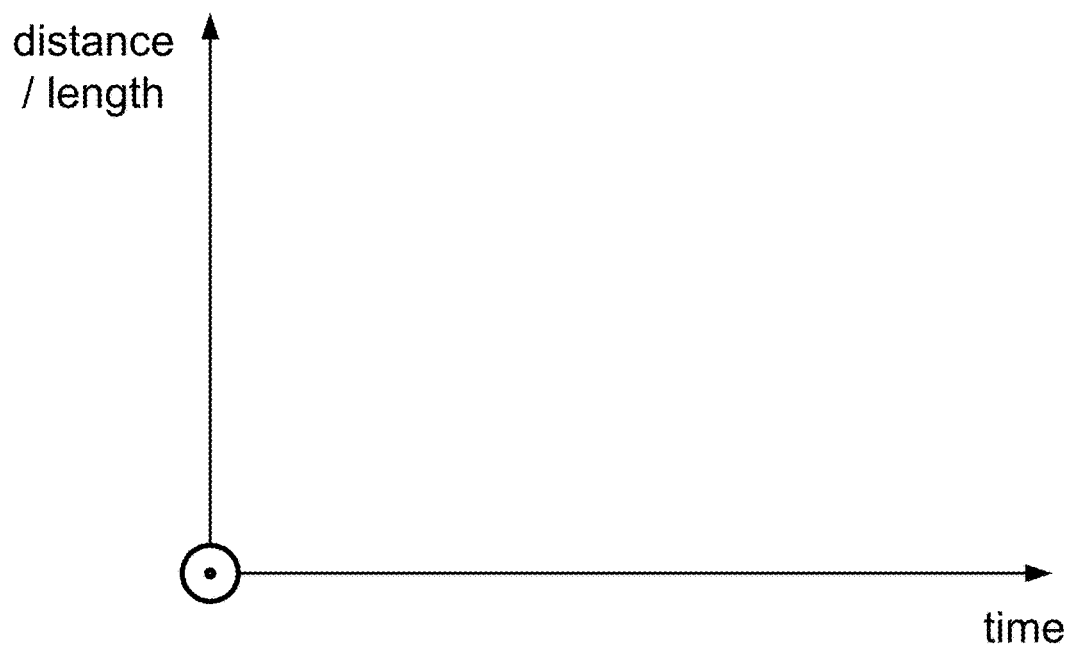

FIGS. 7Q-7OO illustrate use of predicted touch locations and associated operations in accordance with some embodiments.

FIGS. 7Q-7V illustrate that use of predicted touch locations significantly reduces, or eliminates, discrepancy between a detected touch location and a displayed touch location.

Figure 7R:
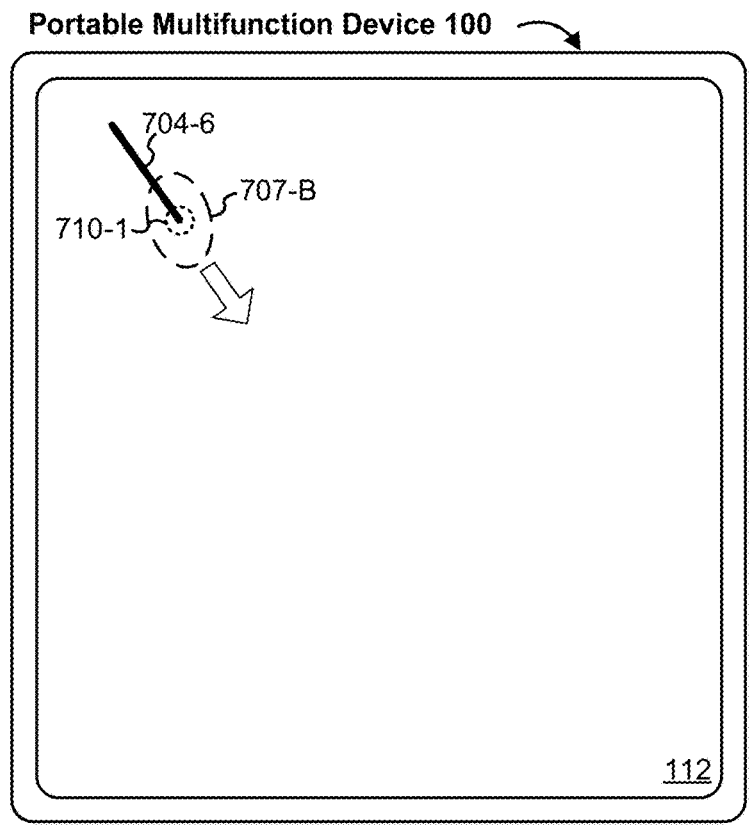
Figure 7R:
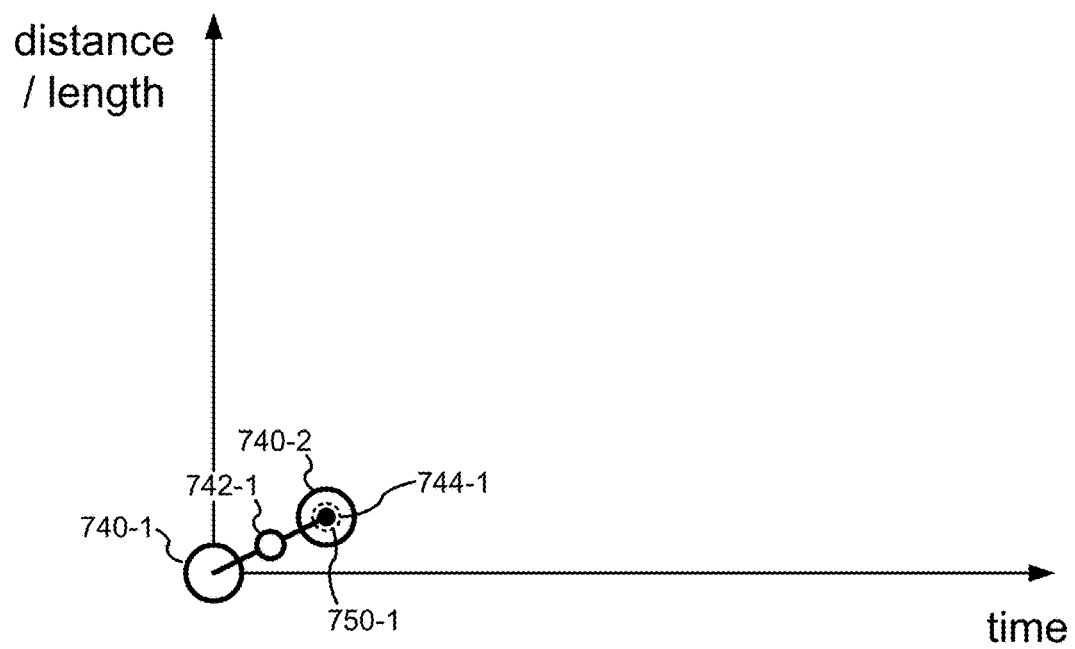
Figure 7S:
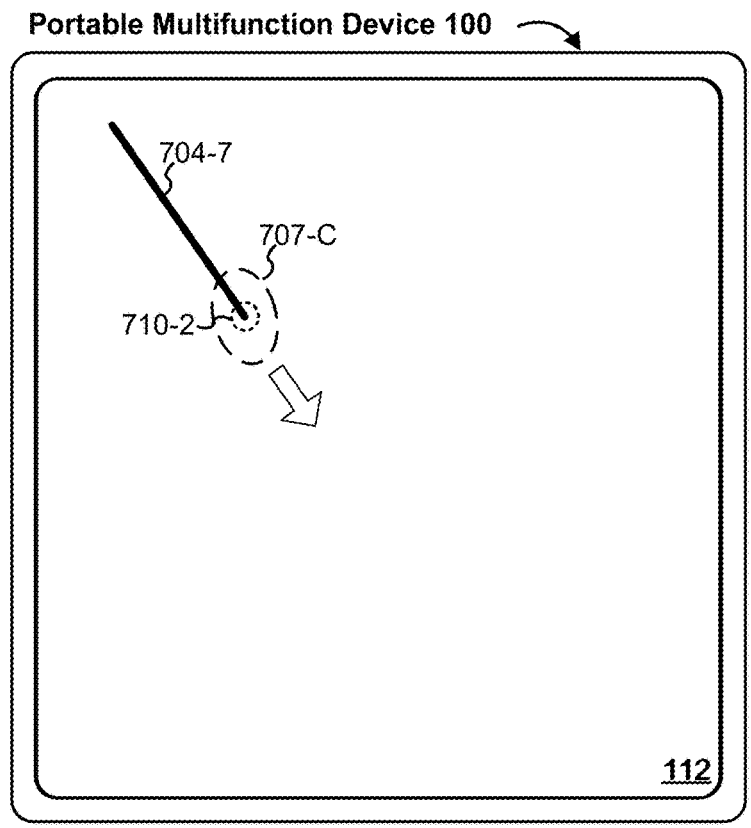
Figure 7S:
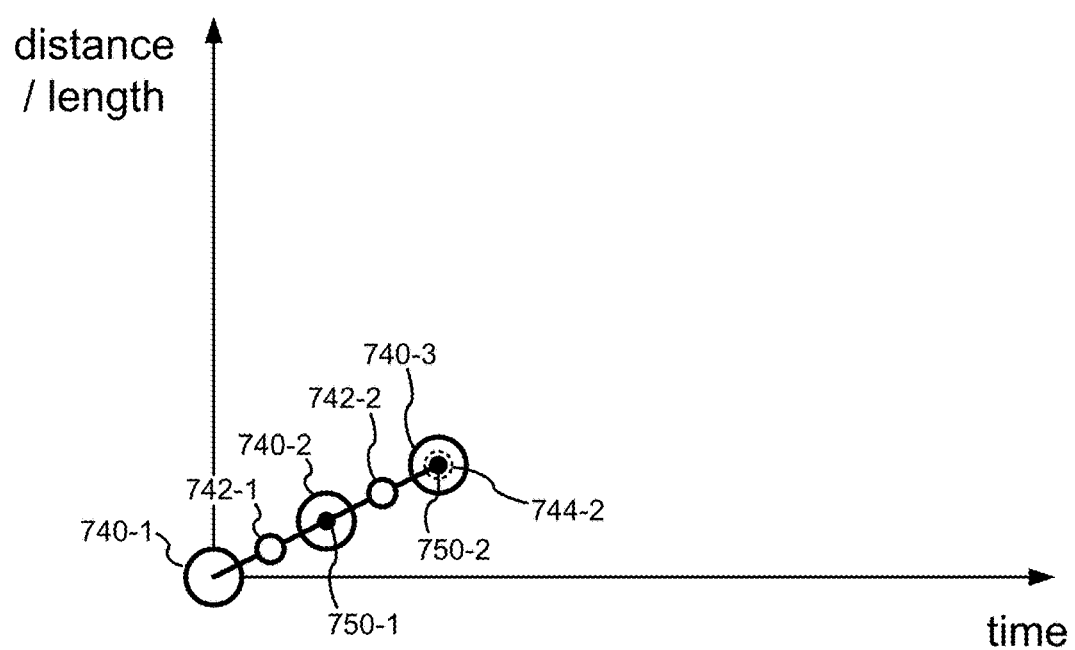
Figure 7T:
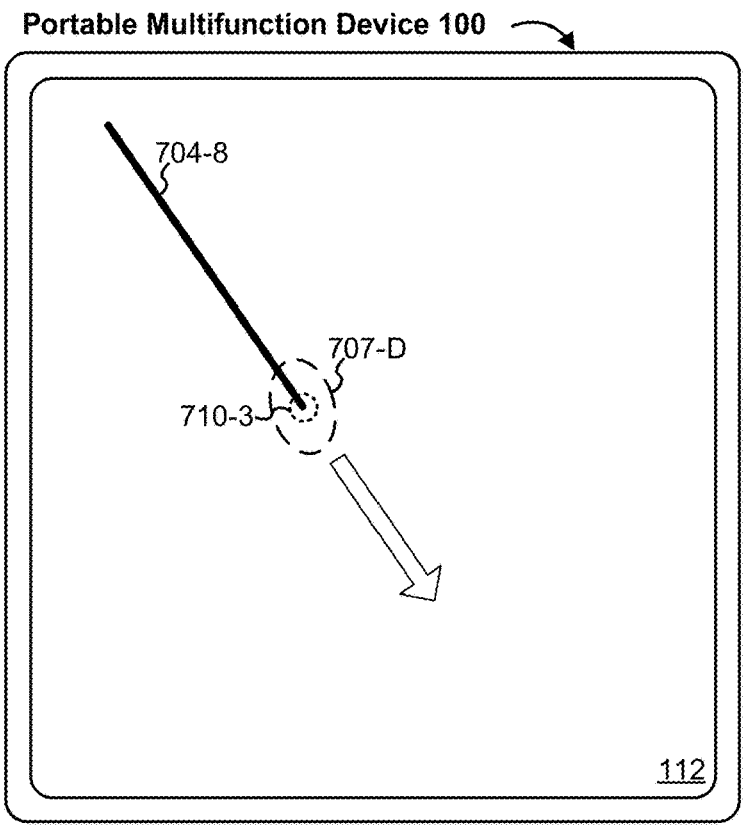
Figure 7T:
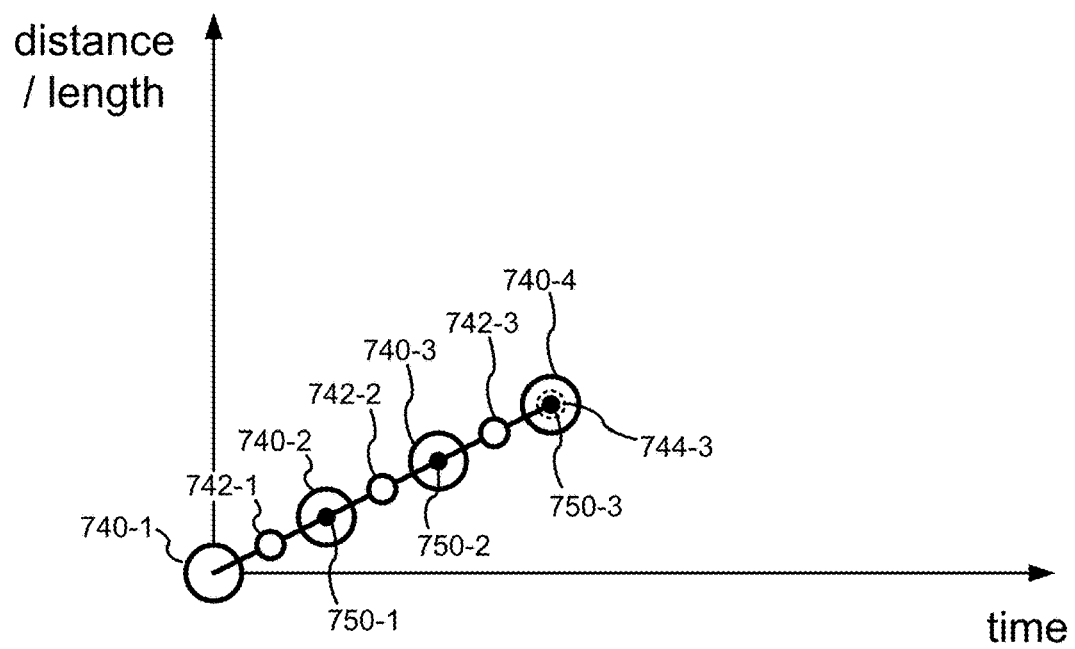
Figure 7U:
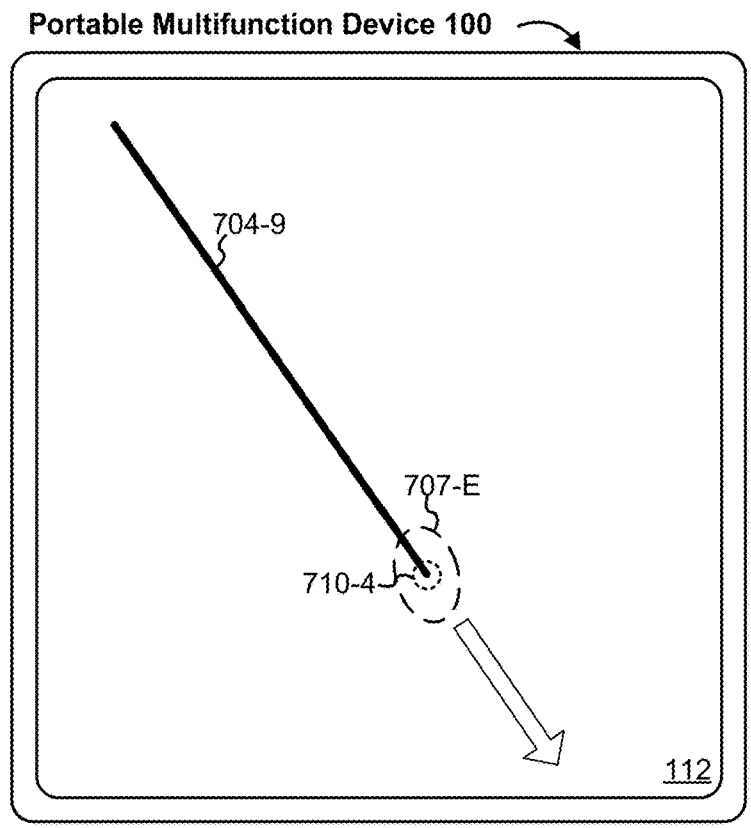
Figure 7U:
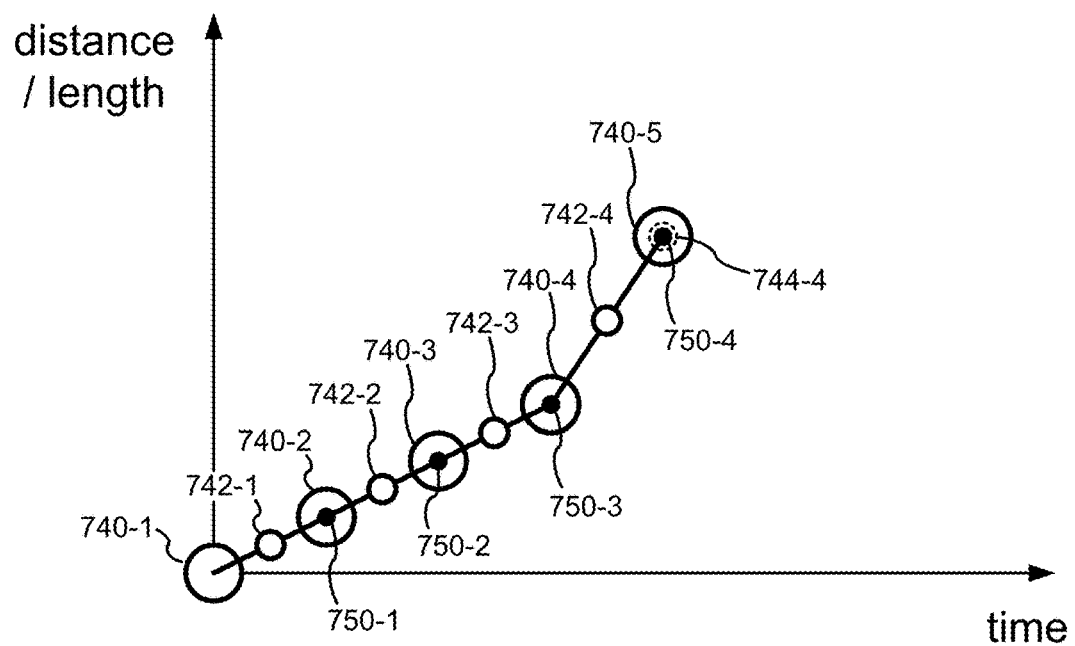
Figure 7V:
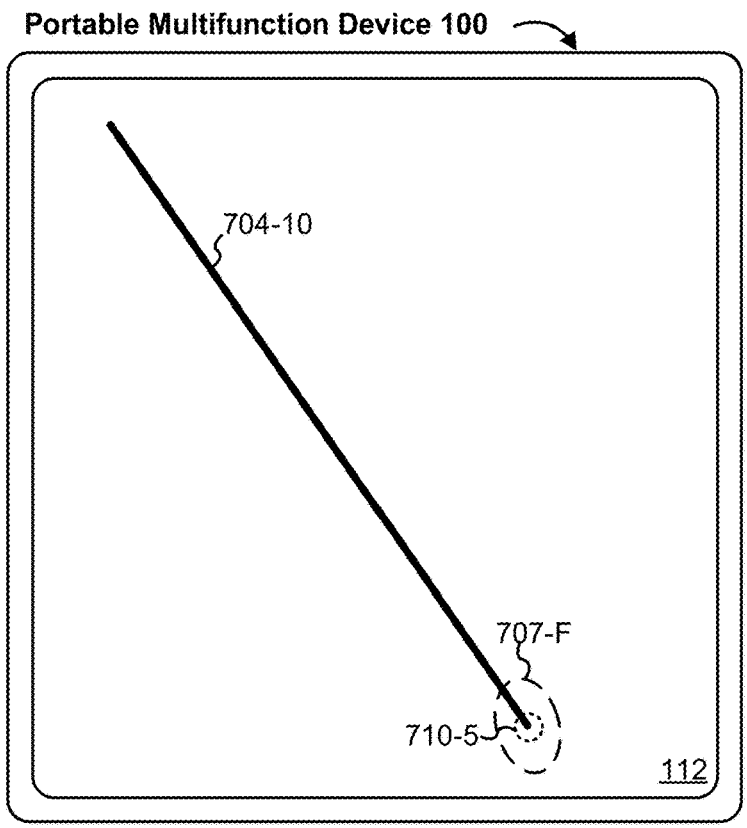
Figure 7V:
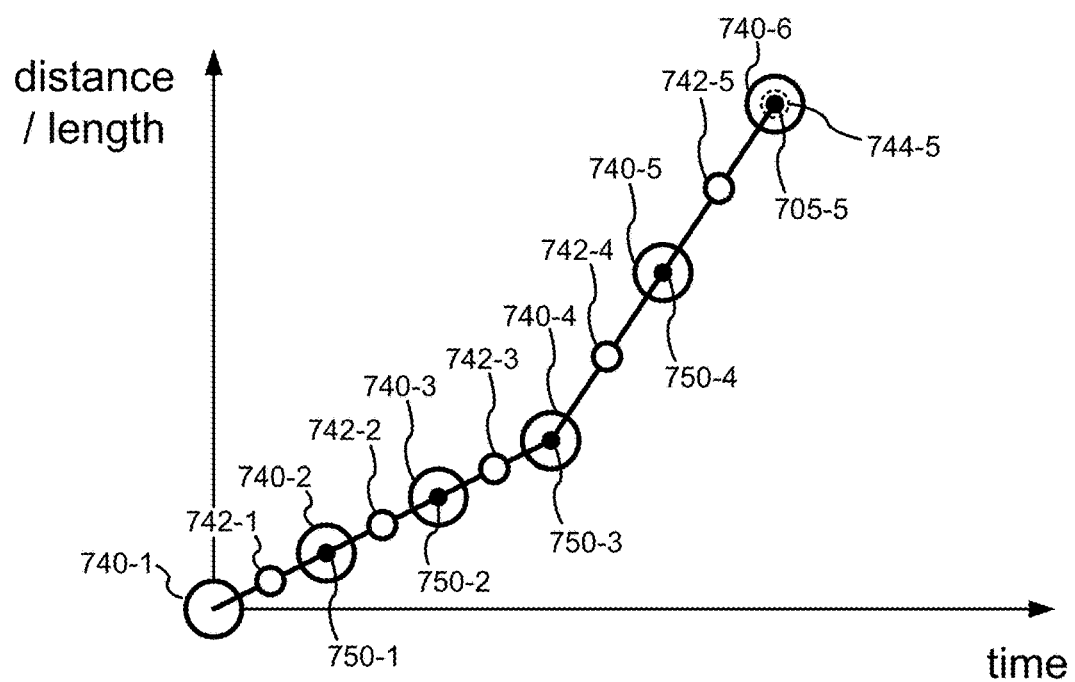

When touch input 707 moves from location 707-A (shown in FIG. 7Q) to location 707-B (shown in FIG. 7R), the user interface may not be updated immediately to reflect the actual location of touch input 707 (e.g., 707-B) due to various delays. Instead of waiting for the actual location of touch input 707 to be made available, the device predicts a location of touch input 707. In FIG. 7R, predicted location 710-1 matches actual location 707-B of touch input 707, and any discrepancy between the actual location of touch input 707 and a displayed location of touch input 707 (e.g., an end point of line 704-6) is reduced or eliminated.

Similarly, FIGS. 7S-7V illustrate that use of the predicted locations reduces, or eliminates, discrepancy between a detected touch location and a displayed touch location.

Figure 7W:
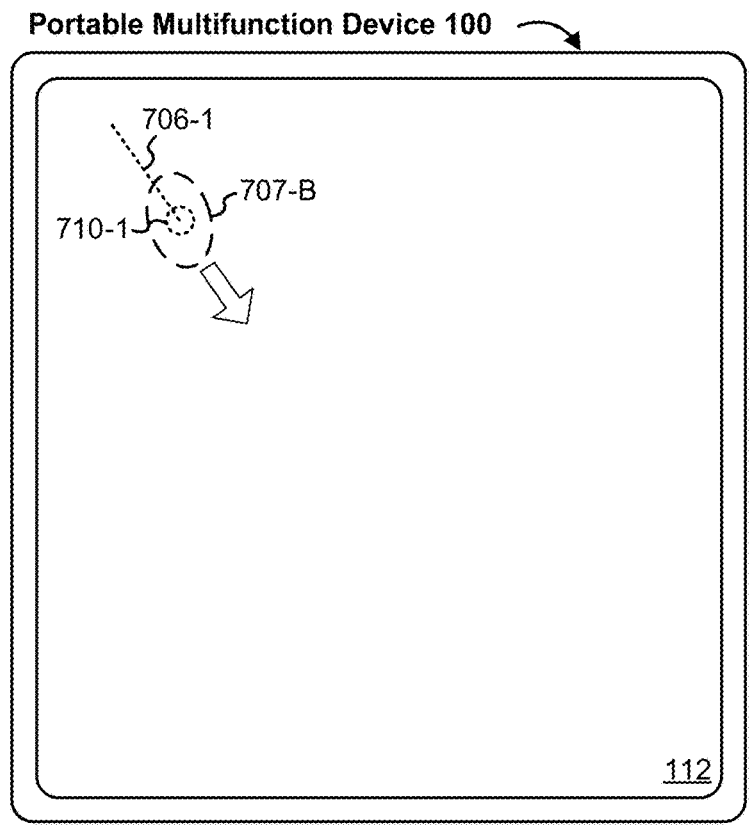
Figure 7W:
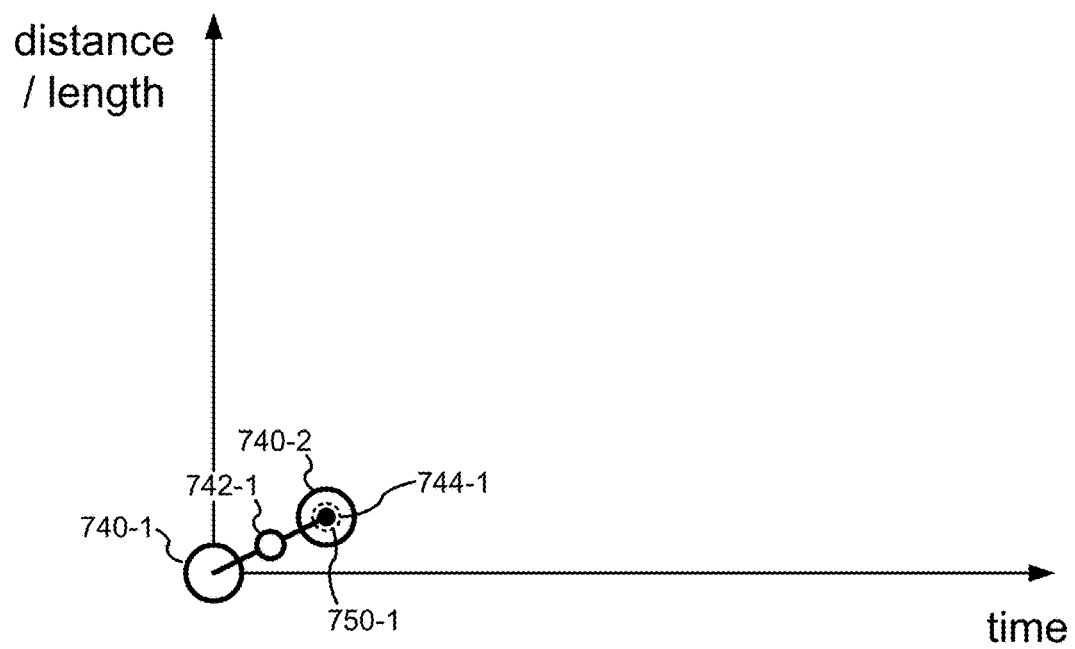

FIGS. 7W-7BB are similar to FIGS. 7Q-7V except that one or more user interface objects that correspond to one or more predicted touch locations are visually distinguished (displayed with different color, line width, shape, shading, highlighting, line styles, etc.) from one or more user interface objects that are independent of one or more predicted touch locations.

Figure 7X:
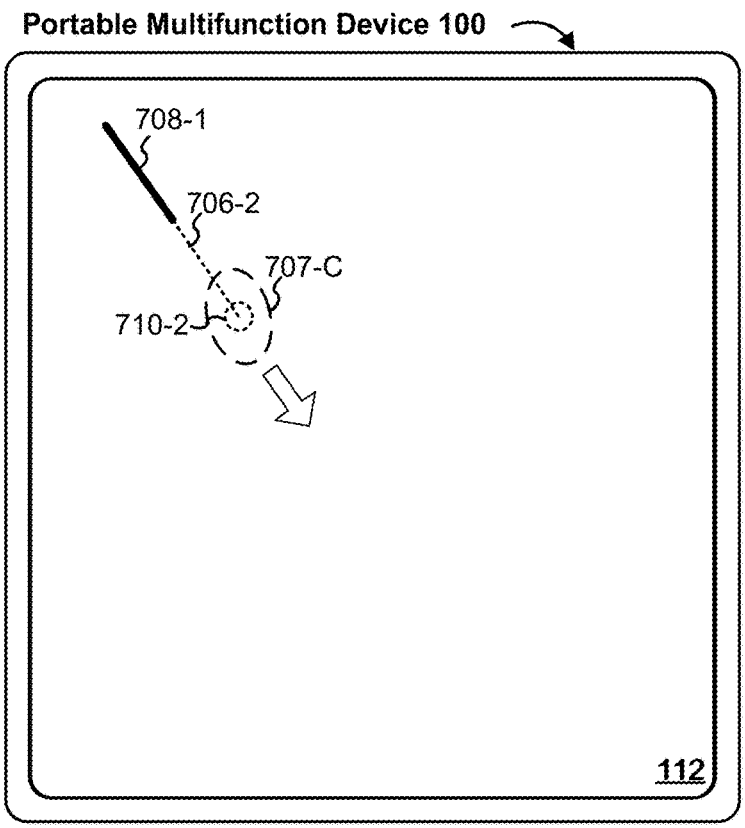
Figure 7X:
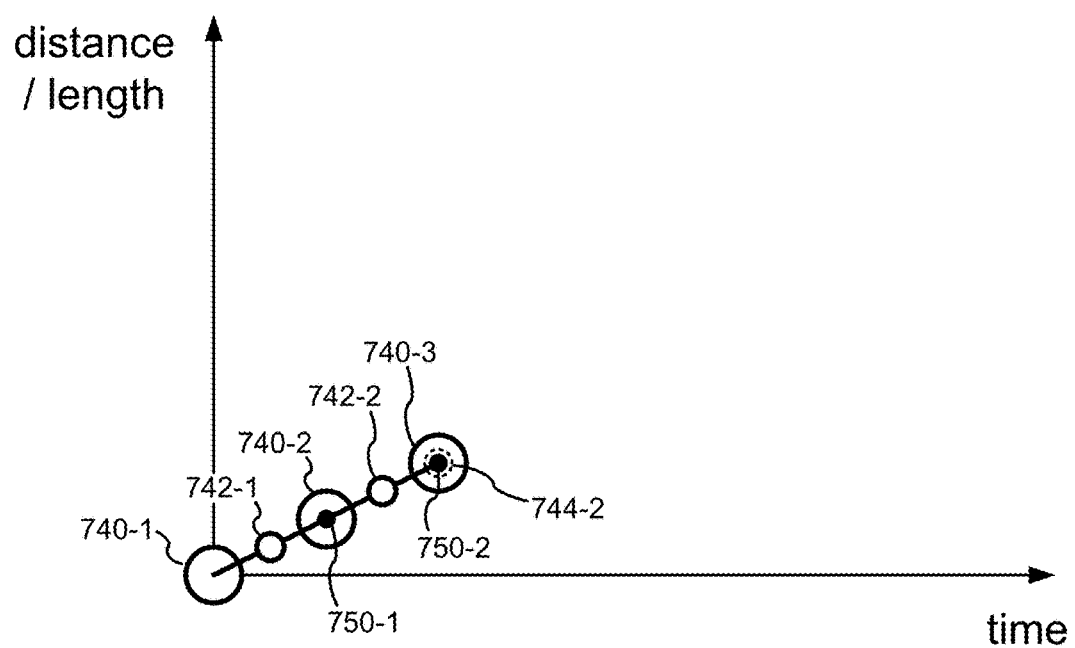

In FIG. 7W, line 706-1 that extends from an initial location of touch input 707 (e.g., location 707-A in FIG. 7Q) to predicted location 710-1 of touch input 707 is depicted as a thin dashed line. In FIG. 7X, after the actual location of touch input 707 at location 707-B is received, line 706-1 that represents predicted movement of touch input 707 is replaced with line 708-1 (e.g., a thick solid line) that is visually distinguished from line 706-1. Replacing line 706-1 (in FIG. 7W) with line 708-1 indicates that predicted location 710-1 (in FIG. 7W) matches actual location 707-B of touch input 707.

FIG. 7X also illustrates that line 706-2 that extends from location 707-B to predicted location 710-2 of touch input 707 is displayed with a visual distinction to indicate that line 706-2 is based on a predicted location of touch input 707 (e.g., location 710-2).

Figure 7Y:
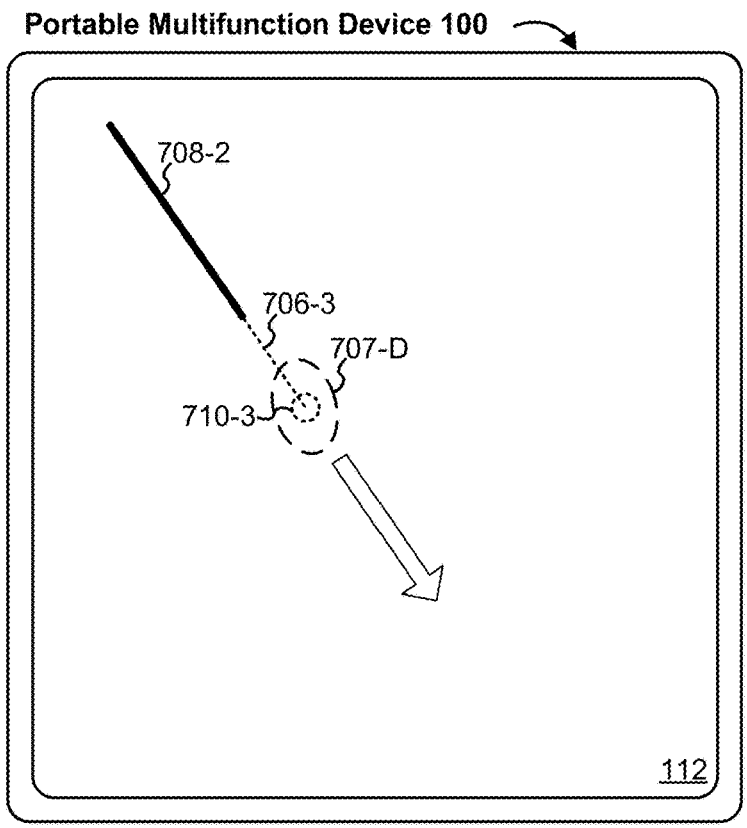
Figure 7Y:
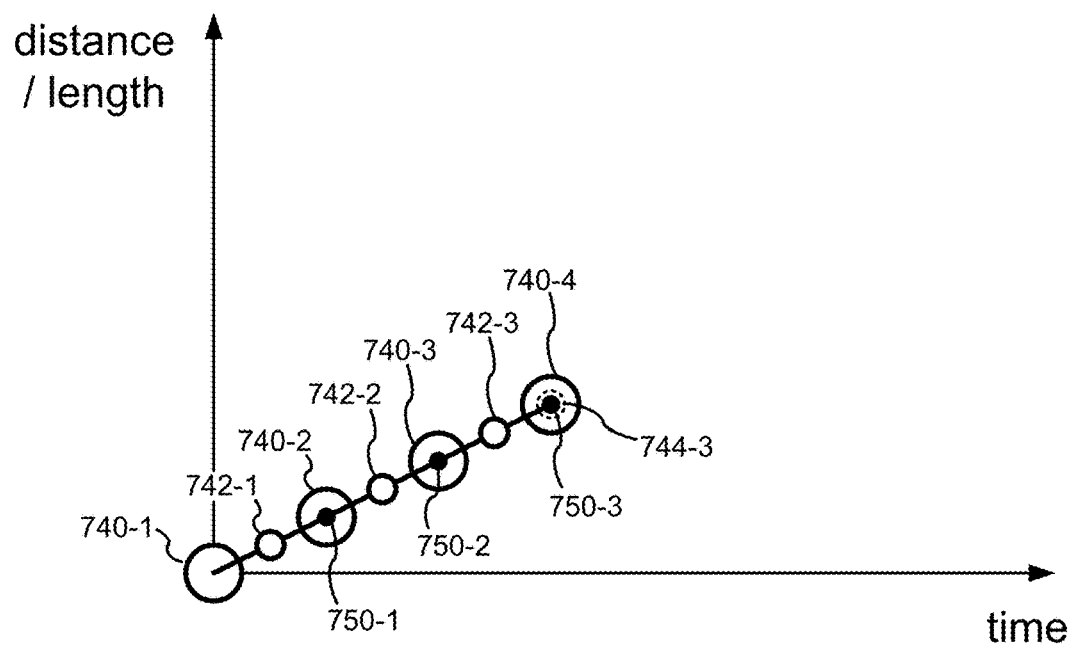

Similarly, FIG. 7Y-7BB illustrate visual distinctions of user interface objects or portions thereof, to indicate that such user interface objects (or portions) are based on one or more predicted touch locations.

Although FIGS. 7Q-7BB illustrate embodiments, in which predicted locations match actual locations of touch inputs, predictions need not be perfectly accurate. For example, a predicted location positioned between the previous location of the touch input and the current location of the touch input (instead of being positioned precisely at the current location of the touch input) reduces the discrepancy between the current location of the touch input and the displayed user interface, thereby improving accuracy of the displayed user interface.

FIGS. 7CC-7FF illustrate user interfaces associated with predicted touch locations in accordance with some embodiments.

In FIG. 7CC, line 706-3 extends to predicted location 710-3 that corresponds to touch location 707-D of touch input 707. Subsequently, as shown in FIG. 7DD, line 706-4 extends to predicted location 710-4 and touch input 707 moves to location 707-G that does not correspond to predicted location 710-4.

FIG. 7EE illustrates that line 706-4 is removed (e.g., because predicted location 710-4 does not correspond to actual location 707-G of touch input 707 and, optionally, the distance between predicted location 710-4 and actual location 707-G is more than predefined threshold). Instead, line 708-6 that corresponds to actual location 707-G of touch input 707 is displayed.

FIG. 7EE also illustrates that line 706-6 that extends to predicted location 710-6 is displayed on touch screen 112. Touch input 707 moves to location 707-H that does not correspond to predicted location 710-6. In some embodiments, in accordance with a determination that the distance between predicted location 710-6 and actual location 707-H is less than the predefined threshold, line 706-6 is included in line 708-7 to indicate that predicted location 710-6 does not deviate from actual location 707-H by more than the predefined threshold, as shown in FIG. 7FF.

FIGS. 7GG and 7HH are similar to FIGS. 7DD and 7EE except that the user interfaces in FIGS. 7GG and 7HH do not include user interface objects (or portions thereof) that are visually distinguished to indicate that the user interface objects (or portions thereof) correspond to one or more predicted touch locations.

FIG. 7II illustrates that touch inputs (e.g., movement of a contact on touch screen 112) are detected at a plurality of locations on touch screen 112. The locations include detected touch locations (e.g., detected representative touch locations 712-1, 712-2, and 712-3, and detected interstitial touch locations 714-1 through 714-6) and predicted touch locations (e.g., predicted representative touch locations 716-1 and 716-2 and predicted interstitial touch locations 718-1 through 718-6).

In some embodiments, the device 100 includes one or more sensors to detect intensity applied by a contact on touch screen 112. FIG. 7II also illustrates that intensity of the contact is detected at multiple locations (e.g., 760) and, optionally, predicted intensity is determined (e.g., 762).

In some embodiments, the device 100 includes one or more sensors to detect a tilt and/or an orientation of a stylus associated with the device 100. FIG. 7II illustrates that a tilt and/or an orientation of the stylus is obtained (e.g., 770) and, optionally, predicted tilt and/or orientation is determined (e.g., 772).

In some embodiments, detecting intensity applied by a contact on touch screen 112, detecting a tilt of a stylus, and/or detecting an orientation of the stylus take a different amount of time than detecting a location of a touch input. In some embodiments, one or more sensors used for detecting intensity applied by a contact on touch screen 112, detecting a tilt of a stylus, and/or detecting an orientation of the stylus have a longer latency than one or more sensors used for detecting a location of a touch input. Thus, in some embodiments, predicted intensity, predicted tilt, and/or predicted orientation are used even for "known" (e.g., detected and processed) touch locations.

FIG. 7JJ illustrates that a number of predicted locations is determined at least in part based on a confidence level associated with the predicted touches. For example, differences between predicted locations and detected locations (e.g., difference between predicted location 718-1 and detected location 714-7 and/or difference between predicted location 718-2 and detected location 714-8) are used to determine the number of predicted locations. When the difference increases, the number of predicted locations is reduced (e.g., because the prediction is less reliable), and when the difference decreases, the number of predicted location is increased (e.g., because the prediction is more reliable).

FIG. 7KK illustrates that the number of predicted locations is determined at least in part based on a confidence level associated with detected touches. For example, increased variation in the detected touches (e.g., deviations from a reference line as shown in FIG. 7KK) reduces the number of predicted touches, and decreased variation in the detected touches increases the number of predicted touches.

FIG. 7LL illustrates that the number of predicted locations is determined at least in part based on a speed of the touch input. For example, when the speed of the touch input decreases, the number of predicted touches decreases (e.g., because there can be more jitter at a lower speed), and when the speed of the touch input increases, the number of predicted touches increases (e.g., because the touch input, such as a finger or stylus, is less likely to suddenly change direction). Typically, a fast-moving touch input has a smaller difference or error between the predicted touches and the actual touches than a slow-moving touch input. In addition, as explained above with respect to FIGS. 7B-7E, when coalesced touches or predicted touches are not used, a fast-moving touch input suffers more from a large discrepancy between actual touches and displayed user interfaces than a slow-moving touch input. Such large discrepancy can be reduced or eliminated by use of predicted touches, which are typically more accurate with fast-moving touch inputs than with slow-moving touch inputs. Therefore, it is especially advantageous to use predicted touches for fast-moving touch inputs, thereby significantly reducing or eliminating the discrepancy between detected touches and displayed user interfaces.

Although FIGS. 7II-7LL illustrate predicted locations arranged in a straight line, predicted locations are not limited to straight lines. FIG. 7MM illustrates that detected locations 712-12 and 712-13 and 714-19 through 714-22 define a curve, and predicted locations on the curve (e.g., 718-11 through 718-13 and 716-5) are determined.

FIGS. 7NN-7OO illustrate drawing a line with a touch input in some embodiments. In FIGS. 7NN-7OO, a width of a respective portion of the line is based on intensity applied by the touch input at a location that corresponds to the respective portion of the line. For example, moving a touch input at a high intensity initiates drawing a wide line, and moving a touch input at a low intensity initiates drawing a thin line.

FIG. 7NN illustrates that touch input 709 moves across touch screen 112 and a corresponding line is displayed on touch screen 112. Movement of touch input 709 includes first portion 780 and second portion 782. In FIG. 7NN, touch screen 112 displays portion 784 of the line that corresponds to first portion 780 of the movement of touch input 709 and portion 786 of the line that corresponds to a predicted movement of touch input 709 (e.g., portion 786 is based on predicted location and predicted intensity). For example, while touch input 709 has followed path 780 and path 782, movement of touch input 709 along path 780 is detected and processed so that portion 784 that corresponds to first portion 780 of the actual movement of touch input 709 is displayed. Movement of touch input 709 along path 782 is not reflected in the user interface and instead portion 786 of the line that is based on predicted touch information (e.g., predicted location and intensity) is shown.

FIG. 7OO illustrates that, subsequent to displaying the user interface shown in FIG. 7NN, the user interface is updated so that portion 786 of the line is replaced with portion 788 of line based on detected movement of touch input 709 (e.g., portion 788 is based on detected movement 782 of touch input 709 including the detected location and the detected intensity of touch input 709). The changes to the width in portion 788 of the line indicates actual changes to the intensity of touch input 709 while the touch input 709 was following path 782. In some embodiments, portion 786 of the line is replaced with portion 788 of line with a smooth transition (e.g., sub-portions of portion 786 are replaced sequentially with sub-portions of portion 788), instead of suddenly replacing portion 786 with portion 788 all at once.

Although FIGS. 7A-7OO illustrate processing finger inputs, a person having ordinary skill in the art would understand that the methods and the user interfaces illustrated in FIGS. 7A-7OO can be applied to processing stylus inputs and/or mouse inputs, in an analogous manner. For brevity, such details are not repeated herein.

FIGS. 8A-8B illustrate a flow diagram of method 800 of updating a user interface based on coalesced touch locations in accordance with some embodiments. Method 800 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides a way to update a user interface based on coalesced touch locations. The method reduces discrepancies between detected touch inputs and displayed user interfaces, thereby reducing the cognitive burden on a user when interacting with a touch screen. In addition, this creates a more efficient human-machine interface. For battery-operated electronic devices, enabling a user to interact with the user interface more accurately reduces errors and unnecessary corrections, thereby conserving power and increasing the time between battery charges.

The device displays (802) a user interface at a first display rate (e.g., FIG. 7P).

While displaying the user interface, the device detects (804), at a first detection rate that is greater than the first display rate, movement of a touch input at a sequence of locations on the touch-sensitive surface. For example, in FIG. 7H, the detection rate is four times the display (update) rate. In some embodiments, the first detection rate is an integer multiple of the first display rate (e.g., the first display rate is 60 Hz and the first detection rate is 240 Hz, which is four times 60 Hz). The touch input may be monitored at a rate (e.g., 240 Hz or 250 Hz) that is lower than a maximum scan rate (e.g., 500 Hz) of the touch-sensitive surface. For example, in FIG. 7I, instead of monitoring the touch input at four times the display rate, the touch input is monitored twice the display rate.

At each of a sequence of update times, the device updates (806) the user interface from a respective current state to a respective next state in accordance with a selected subset of the sequence of locations of the touch input, each selected subset of the sequence of locations comprising a plurality of locations of the touch input. For example, as shown in FIG. 7J, the user interface is updated at each of a sequence of update times (e.g., at 730-1, 730-2, 730-3, and 730-4). In some embodiments, the respective next state of the user interface is distinct from the respective current state of the user interface (e.g., the user interface changes over time so that the respective next state of the user interface appears differently from the respective current state of the user interface). In some embodiments, the user interface may updated one or more frames after the frame that immediately follows the detection of the last location in the first set of sequential locations, depending on the processing time. In some embodiments, the sequence of update times is determined in accordance with the first display rate. For example, for the user interface displayed at 60 Hz, the user interface is updated approximately every 16.67 ms ($\approx 1/(60$ Hz)).

In some embodiments, the device sends (808) to a first software application a message having information that includes the selected subset of the sequence of locations, and the first software application updates the user interface in accordance with the information in the message. For example, in FIG. 7J, set 724-1 of touch inputs is sent to the first software application (e.g., a drawing application) at 730-2, and the first software application updates the user interface at 730-3 in accordance with the information in set 724-1.

In some embodiments, the message also includes (810) information identifying one or more of: intensity of the touch input at the selected subset of the sequence of locations (e.g., intensity 252 in FIG. 1D); and a type of the touch input detected at the selected subset of the sequence of locations (e.g., whether the touch input is made with a finger or a stylus, such as touch type 258 in FIG. 1D). In some embodiments, the message also includes information identifying timing of the touch input at the selected subset of the sequence of locations (e.g., timestamp 256 in FIG. 1D).

In some embodiments, a last detected location in each selected subset is detected (812) at least a predefined time interval (e.g., processing margin time) prior to a next update time (e.g., FIG. 7L). In such embodiments, the last detected location in each selected subset is processed and used for updating the user interface at the next update time.

In some embodiments, the device updates (814) the user interface from a first state to a second state in accordance with a first subset of the sequence of locations of the touch input. In some embodiments, the second state of the user interface is distinct from the first state of the user interface. Subsequent to updating the user interface from the first state to the second state, the device updates the user interface from the second state to a third state in accordance with a second subset of the sequence of locations of the touch input. In some embodiments, the third state of the user interface is distinct from the second state of the user interface. For example, FIG. 7P illustrates a series of changes to the user interface (represented by an increased length of the displayed line over time in accordance with the touch input). In some embodiments, the second subset of the sequence of locations of the touch input is distinct from the first subset of the sequence of locations of the touch input. In some embodiments, the second subset of the sequence of locations of the touch input does not overlap with the first subset of the sequence of locations of the touch input. For example, the first subset of the sequence of locations of the touch input and the second subset of the sequence of locations of the touch input do not include a common location of the touch input. In some embodiments, the first subset of the sequence of locations of the touch input and the second subset of the sequence of locations of the touch input include distinct numbers of locations.

In some embodiments, the device selects (816, FIG. 8B) a respective touch location in the selected subset of the sequence of locations of the touch input as a representative touch location (e.g., representative touch 722-6 in FIG. 7N).

In some embodiments, the respective touch location is selected (818) as the representative touch location in accordance with touch-processing criteria for the first application that indicate an amount of time needed by the first application to update the user interface (e.g., as described in greater detail below with reference to FIGS. 9A-9D). In some embodiments, the amount of time needed by the first application is checked upon launching the first application. In some embodiments, checking the amount of time needed by the first application is repeated (e.g., at a predefined interval). In some embodiments, the amount of time needed by the first application changes over time. In some embodiments, a longest amount of time needed by the first application from the repeated checking of the amount of time needed by the first application is used.

In some embodiments, updating the user interface by the first application includes (820) transmitting the selected subset of the sequence of locations of the touch input to the first application along with an indication of which location is the representative touch location (e.g., identifiers 214 of representative touches in FIG. 1D). For example, by identifying the representative touch location within the multiple locations, applications that are not expecting to receive multiple touch locations can simply use the representative touch location while applications that know to expect multiple touch locations can use the representative touch location and the other (interstitial) touch locations to provide a more accurate and responsive user interface.

In some embodiments, the selected subset of the sequence of locations includes (822) one or more interstitial locations that correspond to touch locations between a prior representative touch location and the representative touch location (e.g., interstitial touches 722-3, 722-4, and 722-5 in FIG. 7N).

In some embodiments, for each update time in the sequence of update times, the device selects (824) a plurality of locations of the touch input to use for updating the user interface. The selected locations are locations of the touch input detected after a last selection of locations to use for updating the user interface (e.g., in FIG. 7M, touches in set 724-8 are detected after selecting touches in set 724-7).

In some embodiments, the selected plurality of locations of the touch input includes (826) one or more predicted interstitial locations (e.g., predicted interstitial touches 722-7, 722-8, and 722-9 in FIG. 7O, and as described in greater detail below with reference to FIGS. 10A-10C).

In some embodiments, for each update time in the sequence of update times, the device selects (828) a plurality of locations of the touch input to use for updating the user interface. The selected locations are locations of the touch input detected after detecting locations of the touch input last selected for updating the user interface (e.g., in FIG. 7M, touches in set 724-8 are detected after touches in set 724-7 are detected). Alternatively, the selected locations are locations of the touch input, in the sequence of locations, after locations of the touch input last selected for updating the user interface.

In some embodiments, the selected locations include (830) all of the locations of the touch input detected after detecting locations of the touch input last selected for updating the user interface. Alternatively, the selected locations include all of the locations of the touch input detected no later than the update time and that comprise locations of the touch input, in the sequence of locations, after locations of the touch input last selected for updating the user interface.

In some embodiments, the selected locations include (832) only one of the locations of the touch input detected after detecting locations of the touch input last selected for updating the user interface (e.g., only a single representative touch location is used). In some embodiments, the selected locations include two or more sequential locations. In some embodiments, only one location is a most recently detected location. In some embodiments, the selected locations include a most recently detected location and an immediately previous location.

In some embodiments, locations of the touch input that have not been selected are discarded. In some embodiments, locations of the touch input that have not been selected are included in a subsequent selected subset.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, and 1100 are also applicable in an analogous manner to method 800 described above with respect to FIGS. 8A-8B. For example, the touch information, predicted touch locations, representative touch locations, interstitial touch locations, and information sending operations described above with reference to method 800 optionally have one or more of the characteristics of the touch information, predicted touch locations, representative touch locations, interstitial touch locations, and information sending operations described herein with reference to other methods described herein (e.g., methods 900, 1000, and 1100). For brevity, these details are not repeated here.

FIGS. 9A-9D illustrate a flow diagram of method 900 of processing a touch input with a touch processing module in accordance with some embodiments. Method 900 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, method 900 provides a way to process a touch input using a touch processing module. The method provides an application-independent touch processing module configured to process a touch input and send processed touch information to an application. Thus, the application does not need its own instructions to process raw touch inputs, and software applications that utilize representative touch locations can be developed faster and more efficiently.

The device displays (902) a user interface of a first software application (e.g., the user interface of a drawing application as shown in FIG. 7P) that is updated at a first display rate (e.g., a display-update rate). While displaying a first frame of the user interface in accordance with the first display rate, the device detects (904) respective movement of a touch input across the touch-sensitive surface (e.g., detect movement of the contact at a first set of multiple sequential locations on the touch-sensitive surface as the touch moves across the touch-sensitive surface).

The device, at an application-independent touch processing module (e.g., using the application-independent touch processing module, such as touch processing module 220 in FIG. 1C), performs the following operations (e.g., operations 906-912, 916-920, and 922-934). In some embodiments, the touch processing module is distinct from a portion of the first software application that is unique to the first software application (e.g., application core 1 (230-1) in FIG. 1C). For example, the touch processing module is part of an application development framework that is provided to the application developer either as a drop-in module that is integrated with the first application and enables the first application to interact with touch input information provided by the operating system on which the first application is running, or the touch processing module is part of the operating system that provides touch input information to the first application according to an application programming interface (API) that specifies a consistent format for the touch input information. In some embodiments, multiple different third-party applications running on the device include independent instances of the touch processing module. In some embodiments, multiple different applications on the device include code for interfacing with a touch processing module that communicates with all of the third-party applications. In some embodiments, the touch processing module is separate from the first software application.

The device selects (906) a respective touch location of the touch input that was detected during the respective movement to identify as a representative touch location for the respective movement based on touch-processing criteria for the first software application (e.g., touch 722-6 is selected as a representative touch in FIG. 7N). In some embodiments, the touch-processing criteria for the first software application corresponds to processing capabilities of the first software application (e.g., selecting one or more locations of the first set of multiple sequential locations to send to the first software application based on how quickly the first software application can process the touch input and generate an updated user interface for display on the display).

In some embodiments, selecting the respective touch location as the representative touch location includes (916, FIG. 9B) detecting a first touch location of the touch input during the touch-detection frame, and in response to detecting the first location: in accordance with a determination that the first touch location meets the touch-processing criteria (e.g., a criterion that a next touch location for the touch input will be detected less than a minimum amount of time before the first application needs to process the touch input to generate an updated user interface based on movement of the contact in time for display during the respective display frame) for the first application, selecting the first touch location as the representative touch location for the respective movement of the touch input (and, optionally, sending the first touch location to the first application); and, in accordance with a determination that the first touch location does not meet the touch-processing criteria for the first application, forgoing selecting the first touch location as the representative touch location for the respective movement of the touch input (e.g., forgoing sending the first touch location to the first application, or waiting to send the first touch location to the first application). For example, in FIG. 7N, touch 722-7 is not selected for update at 730-3, because the amount of time between touch 722-7 and update time 730-3 is less than the minimum amount of time Δt.

In some embodiments, selecting the respective touch location as the representative touch location includes (918) detecting a second touch location of the touch input during the touch-detection frame, and, in response to detecting the second location, in accordance with a determination that the second touch location meets the touch-processing criteria (e.g., a criterion that a next touch location for the touch input will be detected less than a minimum amount of time before the first application needs to process the touch input to generate an updated user interface based on movement of the contact in time for display during the respective display frame) for the first application, selecting the second touch location as the representative touch location for the respective movement of the touch input (and, optionally, sending the second touch location to the first application). For example, in FIG. 7N, touch 722-6 is selected for update at 730-3, because the amount of time between touch 722-6 and update time 730-3 is more than the minimum amount of time Δt.

In some embodiments, the method includes (920), in accordance with a determination that the second touch location does not meet touch-processing criteria for the first application, forgoing selecting the second touch location as the representative touch location for the respective movement of the touch input (e.g., forgoing sending the first touch location to the first application, or waiting to send the first touch location to the first application). In some embodiments, the device detects 3, 4, or more touch locations during the touch-detection frame and determines whether or not to identify any of the touch locations as the representative touch location based on the touch-processing criteria for the first application. In some embodiments, different applications have different touch-processing criteria (e.g., some applications generate updated user interfaces more quickly and thus can receive later touches and still generate updated user interfaces in time, while other applications generate updated user interfaces more slowly and thus need to receive earlier touches to generated updated user interfaces in time). In some embodiments, the same application can have different touch-processing criteria at different times (e.g., depending on an amount of CPU or GPU processing bandwidth available to the first application, a complexity of the user interface of the first application, and/or the resources allocated by the first application to other tasks).

The device sends (908, FIG. 9A) to an application-specific portion of the first software application, which is distinct from the touch processing module (e.g., the portion of the first software application that is distinct from the touch processing module does not include the touch processing module), touch location information for the touch input that identifies the respective touch location as the representative touch location for the respective movement. For example, in FIG. 1C, touch location information is sent from touch processing module 220 to application core 1 (230-1).

In some embodiments, the device, at the application-independent touch processing module (e.g., using the application-independent touch processing module), determines (910) a timing of sending the one or more selected locations to the first software application; and sends the one or more selected locations to the first software application in accordance with the determined timing (e.g., the timing requirement changes over time as shown in FIG. 7M, and the device determines a timing of sending the one or more selected locations based on the changed timing requirement).

In some embodiments, the device (e.g., using the application-independent touch processing module) monitors (912) status of the first software application (e.g., by monitoring a runloop). The timing is determined in accordance with the status of the first software application (e.g., send early if the first software application is busy (because the first software application cannot respond fast), send late if the first software application is not busy (because the first software application can respond fast)).

In some embodiments, the device determines (922, FIG. 9C) a processing margin time. In some embodiments, the device selects a default processing margin time that is used for all applications executed by the device. In some embodiments, a respective application is associated with a respective processing margin time (e.g., a computationally intensive application has a long processing margin time and a computationally light application has a short processing margin time). At each of a sequence of communication times, each of which precedes a display update time in a sequence of display update times by at least the determined processing margin time, the device sends, from the touch processing module to the first software application, a set of locations that includes one or more selected locations of the touch input during a preceding time period; and, at the first software application (e.g., using the first software application), updates the first user interface in time for display at the sequence of display update times in accordance with the set of locations sent by the touch processing module at the sequence of communication times. For example, set 724-5 of touches (FIG. 7L) that precede update time 730-3 by the processing margin time is used for updating the user interface at update time 730-3, and set 724-6 of touches that precede update time 730-4 by the processing margin time is used for updating the user interface at update time 730-4.

In some embodiments, determining the processing margin time includes (924) setting the processing margin time to an initial value and then determining an updated processing margin time in accordance with one or more measurements of performance of the first software application (e.g., the processing margin time changes over time as shown in FIG. 7M). In some embodiments, the initial value is determined by determining the performance of the first software application upon initiating the first software application. In some embodiments, the updated processing margin time is determined at a predefined time interval. In some embodiments, the updated processing margin time is in response to detecting each separate touch input on the touch-sensitive surface.

In some embodiments, the processing margin time is determined (926) in accordance with a longest processing time by the first software application while processing each of a plurality of sets of touch input locations (e.g., if the processing time oscillates or varies, pick a worst case or conservative margin time). In some embodiments, the processing margin time is selected from a plurality of candidate margin times in accordance with confidence values associated with respective candidate margin times.

In some embodiments, the locations of the touch input included in the set of locations sent at each communication time correspond (928) to a plurality of detected locations of the touch input between successive communication times in the sequence of communication times (e.g., FIG. 7L).

In some embodiments, the device sends (930) to the first software application predicted touch location information for the touch input that identifies one or more predicted touch locations for the respective movement (e.g., predicted touches 244 in FIG. 1D). In some embodiments, the predicted touch location information is sent concurrently with the touch location information (e.g., event object 194 in FIG. 1D includes both predicted touch location information and detected touch location information). In some embodiments, an application independent sub-module of the first software application (e.g., touch processing module 220 in FIG. 1C) identifies one or more predicted touch locations for the respective movement in accordance with a predefined prediction model.

In some embodiments, the device sends (932) the touch location information for the touch input to a plurality of software applications, including the first software application. For example, in FIG. 1C, touch location information is sent to both application 1 (136-1) and application 2 (136-2).

In some embodiments, the device sends (934) to the first software application the touch location information for the touch input in accordance with a determination that the first software application is configured to receive the touch location information; and sends to a second software application that is distinct from the first software application subsequent touch location information for the touch input in accordance with a determination that the second software application is configured to receive the subsequent touch location information. For example, in FIG. 1C, touch location information is sent to both application 1 (136-1) and application 2 (136-2). In some implementations, when the displayed user interface concurrently includes a user interface of application 1 (136-1) and a user interface of application 2 (136-2), touch location information for touches that correspond to the user interface of application 1 (136-1) is sent to application 1 (136-1) and touch location information for touches that correspond to the user interface of application 2 (136-2) is sent to application 2 (136-2).

The device, at the first software application (e.g., using the first software application), updates (914, FIG. 9A) the user interface in accordance with the touch location information (e.g., the one or more locations selected by the touch processing module). For example, in FIGS. 7Q-7V, the user interface is updated in accordance with changes to the touch input (and the corresponding touch information). In some embodiments, the touch processing module (e.g., touch processing module 220 in FIG. 1C) sends to the portion of the first software application that is unique to the first software application (e.g., application core 1 (230-1) in FIG. 1C) the location information for a prior representative touch prior to the next representative touch is detected, in order to give the first software application time to process the prior representative touch.

In some embodiments, the device sends (936, FIG. 9D) the touch location information with a first portion of the first software application, comprising an application-independent sub-module (e.g., the application-independent touch processing module, such as touch processing module 220 in FIG. 1C), and updates the user interface with a second portion of the software application that comprises an application-specific sub-module (e.g., application core 1 (230-1) in FIG. 1C). In some embodiments, the touch processing module is an application-independent module in communication with the application-independent sub-module. In some embodiments, a second application executed by the electronic device also includes the application-independent sub-module and, when executed, receives touch location information from the touch processing module using the application-independent sub-module and updates a respective user interface of the second application with a second portion of the second software application that comprises an application-specific sub-module distinct from the application-specific sub-module of the first software application.

In some embodiments, the movement of the touch input is detected (938) during a respective touch-detection frame (e.g., touch-detection frame 724-1 in FIG. 7J). An updated user interface of the first application, based on the movement of the touch input, is generated during a respective touch-processing frame (e.g., touch-processing frame 732-2 in FIG. 7J). In some embodiments, the respective touch-detection frame partially overlaps the respective touch-processing frame. In some embodiments, the respective touch-detection frame is concurrent with the respective touch-processing frame. The updated user interface is displayed on the display for the duration of a respective display frame (e.g., display frame 734-2 in FIG. 7J) that occurs after the respective touch-processing frame.

In some embodiments, during the respective touch-processing frame (e.g., for the entire duration of the respective touch-processing frame), the device displays (940) a user interface for the first application that was generated during a prior touch-processing frame (e.g., during a prior display frame that occurs concurrently with the respective touch-processing frame). For example, in FIG. 7J, during touch-processing frame 732-3, a user interface that was generated during touch-processing frame 732-2 is displayed.

In some embodiments, during the respective display frame (e.g., for the entire duration of the respective display frame), the device detects (942) subsequent movement of the touch input across the touch-sensitive surface and sends to (the application-specific portion of) the first software application touch location information for the subsequent movement of the touch input (e.g., during a subsequent touch-detection frame that occurs concurrently with the respective display frame). For example, during display frame 734-2, the device detects touches in touch detection frame 724-2.

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 1000, and 1100) are also applicable in an analogous manner to method 900 described above with respect to FIGS. 9A-9D. For example, the touch information, representative touch locations, timing, and information sending operations described above with reference to method 900 optionally have one or more of the characteristics of the touch information, representative touch locations, timing, and information sending operations described herein with reference to other methods described herein (e.g., methods 800, 1000, and 1100). For brevity, these details are not repeated here.

FIGS. 10A-10C illustrate a flow diagram of method 1000 of updating a user interface based on predicted touch locations in accordance with some embodiments. Method 1000 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, method 1000 provides a way to update a user interface based on predicted touch locations. The method reduces discrepancies between detected touch inputs and displayed user interfaces, thereby reducing the cognitive burden on a user when interacting with a touch screen. In addition, this creates a more efficient human-machine interface. For battery-operated electronic devices, enabling a user to interact with the user interface more accurately reduces errors and unnecessary corrections, thereby conserving power and increasing the time between battery charges.

The device displays (1002) a user interface at a first display rate (e.g., the user interface of a drawing application in FIG. 7Q).

While displaying the user interface in accordance with the first display rate, the device detects (1004) movement of a touch input, including detecting the touch input at a first set of sequential locations on the touch-sensitive surface. The first set of sequential locations includes a plurality of locations on the touch-sensitive surface. For example, in FIG. 7H, a plurality of touches (e.g., touches 722-2 through 722-5) is detected between display update times 730-1 and 730-2.

In some embodiments, the movement of the touch input is detected (1006) at a first detection rate that is higher than the first display rate (e.g., in FIG. 7H, the detection rate is four times the display rate).

The device predicts (1008) for the touch input a first set of one or more predicted locations on the touch-sensitive surface based on multiple locations in the first set of sequential locations. For example, in FIG. 7O, touches 722-3 through 722-6 are used to predict touch locations 722-7 through 722-13. In some embodiments, the first set of one or more predicted locations is predicted based on derivatives (e.g., first derivatives and/or second derivatives) of the multiple locations in the first set of sequential locations. In some embodiments, the first set of one or more predicted locations is predicted based on a linear fit (e.g., as illustrated in FIG. 7KK).

In some embodiments, each of the one or more predicted locations is (1010) a predicted representative touch location (e.g., predicted representative touch location 722-10 in FIG. 7O).

In some embodiments, the one or more predicted locations include (1012) one or more predicted interstitial touch locations of the touch input on the touch-sensitive surface (e.g., predicted interstitial touch locations 722-7 through 722-9 in FIG. 7O).

In some embodiments, the one or more predicted locations of the touch input on the touch-sensitive surface are predicted (1014, FIG. 10B) based at least in part on multiple representative touch locations of the touch input on the touch-sensitive surface (see discussion of the representative touch locations above with respect to FIGS. 8A-8B). For example, the predicted locations are based on representative touch locations 722-2 and 722-6 in FIG. 7O. In some embodiments, each display frame has a single representative touch location.

In some embodiments, the one or more predicted locations of the touch input on the touch-sensitive surface are predicted (1016) based on multiple representative touch locations of the touch input on the touch-sensitive surface and one or more interstitial locations of the touch input on the touch-sensitive surface (see discussion of the interstitial touch locations above with respect to FIGS. 8A-8B). For example, the predicted locations are based on representative touch locations 722-2 and 722-6 and interstitial touch locations 722-3 through 722-5 in FIG. 7O. In some embodiments, each display frame has one or more interstitial touch locations that are distinct from the representative touch location.

In some embodiments, a number of predicted locations in the first set of one or more predicted locations of the touch input is determined (1018) in accordance with one or more confidence values associated with the one or more predicted locations. For example, as shown in FIG. 7JJ, the confidence values are determined based on whether the predicted touch locations subsequently match the detected (actual) touch locations. Thus, when the predicted touch locations match the detected touch locations, the confidence values increase (and, in turn, the number of predicted locations increases). When the predicted touch locations do not match the detected touch locations (or the predicted touch locations deviate from the detected touch locations by more than predefined error margin), the confidence values decrease (and, in turn, the number of predicted locations decreases). In some embodiments, the touch processing module (e.g., touch processing module 220 in FIG. 1C) predicts touch locations. In some embodiments, the touch processing module determines a confidence value associated with each touch location. In some embodiments, only touch locations that have associated confidence values that satisfy confidence value criteria (e.g., are above a predefined confidence value threshold) are included in the first set of one or more predicted locations.

In some embodiments, a number of predicted locations in the first set of one or more predicted locations of the touch input is determined (1020) in accordance with one or more confidence values associated with the multiple locations in the first set of sequential locations. For example, as shown in FIG. 7KK, the confidence values are determined based on whether the detected touch locations match a prediction model. For example, when the prediction is based on a line fit, the device determines whether the detected touch locations fit onto a fit line. Deviations of the detected touch locations from the line decrease the confidence values (and, in turn, the number of predicted locations decreases). When the detected touch locations fit well to the line, the confidence values increase (and, in turn, the number of predicted locations increases). In some embodiments, the touch processing module determines a confidence value for the multiple locations in the first set of sequential locations. The number of predicted locations is determined based on the confidence value for the multiple locations in the first set of sequential locations (e.g., more predicted locations for a high confidence value and fewer predicted locations for a lower confidence value).

In some embodiments, the number of predicted locations in the first set of one or more predicted locations of the touch input equals a number of locations in the first set of sequential locations. In some embodiments, the number of predicted locations in the first set of one or more predicted locations of the touch input is more than a number of locations in the first set of sequential locations. In some embodiments, the number of predicted locations in the first set of one or more predicted locations of the touch input is an integer multiple of locations in the first set of sequential locations.

In some embodiments, the one or more confidence values associated with the multiple locations in the first set of sequential locations are based (1022) at least in part on errors in fitting the multiple locations in the first set of sequential locations to a predefined constraint (e.g., errors in fitting detected touch locations to a reference line as shown in FIG. 7KK). In some embodiments, the predefined constraint is a linear fit to the multiple locations in the first set of sequential locations. In some embodiments, the predefined constraint is a polynomial fit to the multiple locations in the first set of sequential locations. In some embodiments, the predefined constraint is a circular fit to the multiple locations in the first set of sequential locations. In some embodiments, the one or more confidence values associated with the first set of sequential locations are based at least in part on historical errors (e.g., errors in fitting prior sets of sequential locations). In some embodiments, the one or more confidence values associated with the multiple locations in the first set of sequential locations are based at least in part on historical confidence values (e.g., confidence values for prior sets of sequential locations). In some embodiments, the one or more confidence values associated with the multiple locations in the first set of sequential locations are based at least in part on an orientation of the touch input.

In some embodiments, the one or more confidence values associated with the multiple locations in the first set of sequential locations are based (1024) at least in part on speed of the movement of the touch input. For example, a touch input with a high speed has a higher confidence value (because the touch input is less likely to suddenly change in direction), and a touch input with a low speed has a lower confidence value. For example, in FIG. 7LL, the speed of touch input is low and the confidence values are also low. As a result, the number of predicted locations is reduced to two.

In some embodiments, the device includes (1026) one or more sensors to detect intensity of touch inputs on the touch-sensitive surface. The device predicts intensity of the touch input at a plurality of locations on the touch-sensitive surface. For example, FIG. 7II illustrates that intensity of the touch input is predicted at multiple locations. FIG. 7NN illustrates a line drawn based on predicted intensity of the touch input. In some embodiments, the plurality of locations on the touch-sensitive surface corresponds to a subset of the first set of one or more predicted locations on the touch-sensitive surface. In some embodiments, the plurality of locations on the touch-sensitive surface corresponds to the first set of one or more predicted locations on the touch-sensitive surface. The device updates the user interface in accordance with the predicted intensity of the touch input. In some embodiments, the intensity prediction occurs at a different rate than the location prediction (e.g., because intensity prediction includes additional inputs from intensity sensors on a stylus or measurements of contact size that take additional processing time), and the location estimate for one or more touch inputs are updated before the intensity estimates for those touch inputs are updated. As such, the predicted location of a touch can be updated in one frame, while the predicted intensity of the touch is updated in a subsequent frame. Additionally, in some embodiments, the predicted intensity of a touch is updated in multiple subsequent frames, as predicted values for the intensity of the touch become increasingly accurate.

In some embodiments, the device predicts (1028) tilt and/or orientation of the touch input at a plurality of locations on the touch-sensitive surface. For example, FIG. 7II illustrates that tilt and/or orientation of the touch input (e.g., a stylus) are predicted at multiple locations. In some embodiments, the plurality of locations on the touch-sensitive surface corresponds to a subset of the first set of one or more predicted locations on the touch-sensitive surface. In some embodiments, the plurality of locations on the touch-sensitive surface corresponds to the first set of one or more predicted locations on the touch-sensitive surface. The device updates the user interface in accordance with the predicted tilt and/or orientation of the touch input. In some embodiments, the tilt and/or orientation prediction occurs at a different rate than the location prediction (e.g., because tilt and/or orientation prediction includes additional inputs from force sensors on a stylus or measurements of contact shape that take additional processing time), and the location estimate for one or more touch inputs are updated before the tilt and/or orientation estimates for those touch inputs are updated. Additionally, in some embodiments, the predicted tilt and/or orientation of a touch is updated in multiple subsequent frames, as predicted values for the tilt and/or orientation of the touch become increasingly accurate.

The device updates (1030, FIG. 10C) the user interface in accordance with the first set of one or more predicted locations of the touch input on the touch-sensitive surface. For example, as shown in FIGS. 7Q-7V, the user interface is updated to display an extension of a line based on predicted touch locations.

In some embodiments, the movement of the touch input is detected (1032) during a respective touch-detection frame (e.g., touch-detection frame 724-1 in FIG. 7J). An updated user interface, based on the movement of the touch input, is generated during a respective touch-processing frame (e.g., touch-processing frame 732-2). In some embodiments, the respective touch-detection frame partially overlaps the respective touch-processing frame (e.g., touch-processing frame 732 overlaps touch-detection frame 724-1). In some embodiments, the respective touch-detection frame is concurrent with the respective touch-processing frame (e.g., touch-detection frame 724-1 is concurrent with touch-processing frame 732). The updated user interface is displayed on the display for the duration of a respective display frame (e.g., display frame 734-2) that occurs after the respective touch-processing frame.

In some embodiments, the multiple locations need not be detected during the same display frame. Updating the user interface can be at the next fame time after a representative location of the touch input in the first set is detected, or it can be at a later time frame, depending on the required processing time (e.g., a user interface updated based on touches detected during touch-processing frame 732-2 is displayed during display frame 734-3 or 734-4).

In some embodiments, the device, at an application-independent touch processing module (e.g., using the application-independent touch processing module), predicts (1034) for the touch input the first set of one or more predicted locations on the touch-sensitive surface; and sends to an application-specific portion of the first software application the first set of one or more predicted locations of the touch input on the touch-sensitive surface. For example, in FIG. 1C, predicted touch locations are sent from touch processing module 220 to application core 1 (230-1). In some embodiments, the first set of one or more predicted locations of the touch input on the touch-sensitive surface is sent to multiple software applications. In some embodiments, the first set of one or more predicted locations of the touch input on the touch-sensitive surface is posted, and the posted first set of one or more predicted locations of the touch input is retrieved by one or more software applications. In some embodiments, the first set of one or more predicted locations of the touch input on the touch-sensitive surface is sent from the touch processing module to the first software application in response to a request from the first software application for the first set of one or more predicted locations of the touch input on the touch-sensitive surface.

The device, at the first software application (e.g., using the first software application), updates the user interface in accordance with the first set of one or more predicted locations of the touch input on the touch-sensitive surface.

In some embodiments, the device, subsequent to detecting the touch input at the first set of sequential locations on the touch-sensitive surface, detects (1036) the touch input at a second set of sequential locations on the touch-sensitive surface; and compares the second set of sequential locations of the touch input on the touch-sensitive surface with the first set of one or more predicted locations of the touch input on the touch-sensitive surface. For example, as shown in FIGS. 7CC-7EE, if the difference between the first set of one or more predicted locations and the detected locations exceeds predefined criteria, the user interface is updated to remove a user interface object displayed based on the erroneous prediction. In some embodiments, each touch location in the first set of one or more predicted locations of the touch input on the touch-sensitive surface corresponds to a respective touch location in the second set of sequential locations of the touch input on the touch-sensitive surface. In some embodiments, each touch location in the first set of one or more predicted locations of the touch input on the touch-sensitive surface is associated with a respective timestamp, and is compared with a corresponding touch location, in the second set of sequential locations of the touch input on the touch-sensitive surface, that is associated with the respective timestamp. For example, predicted locations correspond to particular time, such as display update time, which provides illusion of immediate processing of touch inputs. In some embodiments, each touch location in the first set of one or more predicted locations of the touch input on the touch-sensitive surface is associated with a respective identifier, and is compared with a corresponding touch location, in the second set of sequential locations of the touch input on the touch-sensitive surface, that is associated with the respective identifier. In some embodiments, the second set of sequential locations of the touch input on the touch-sensitive surface is compared with the first set of one or more predicted locations of the touch input on the touch-sensitive surface by the first software application. In accordance with a determination that a difference between the first set of one or more predicted locations of the touch input on the touch-sensitive surface and the second set of sequential locations of the touch input on the touch-sensitive surface satisfies predefined criteria, the device updates the user interface in accordance with the second set of sequential locations of the touch input on the touch-sensitive surface.

Figure 7Z:
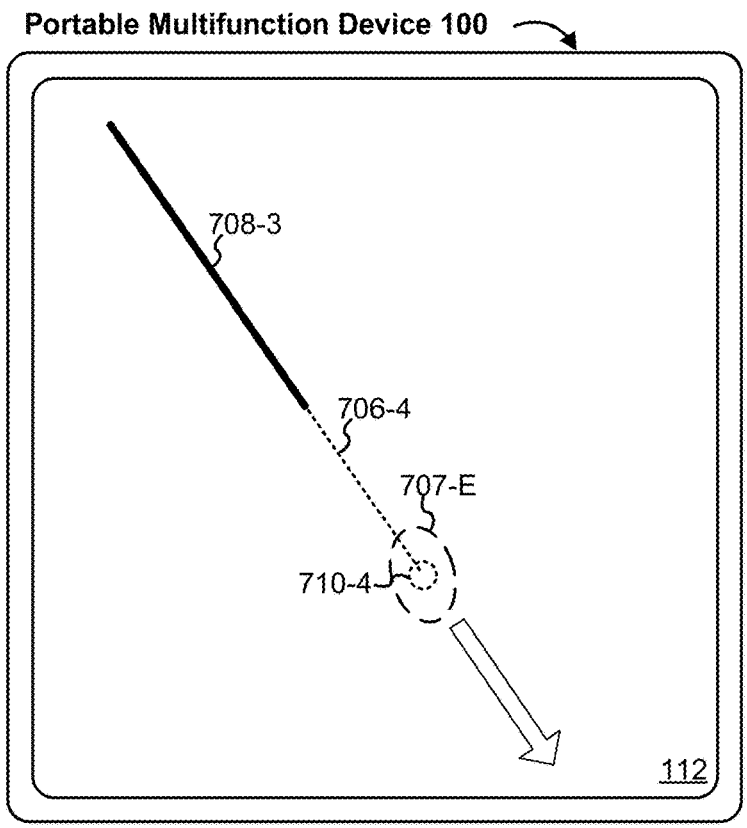
Figure 7Z:
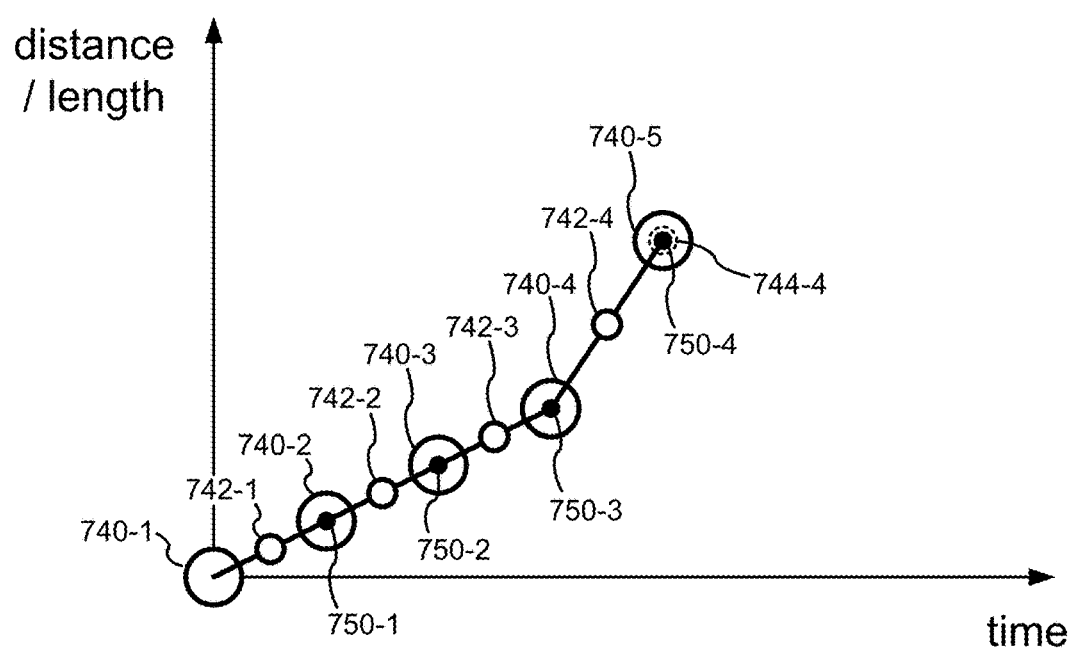
Figure 7A:
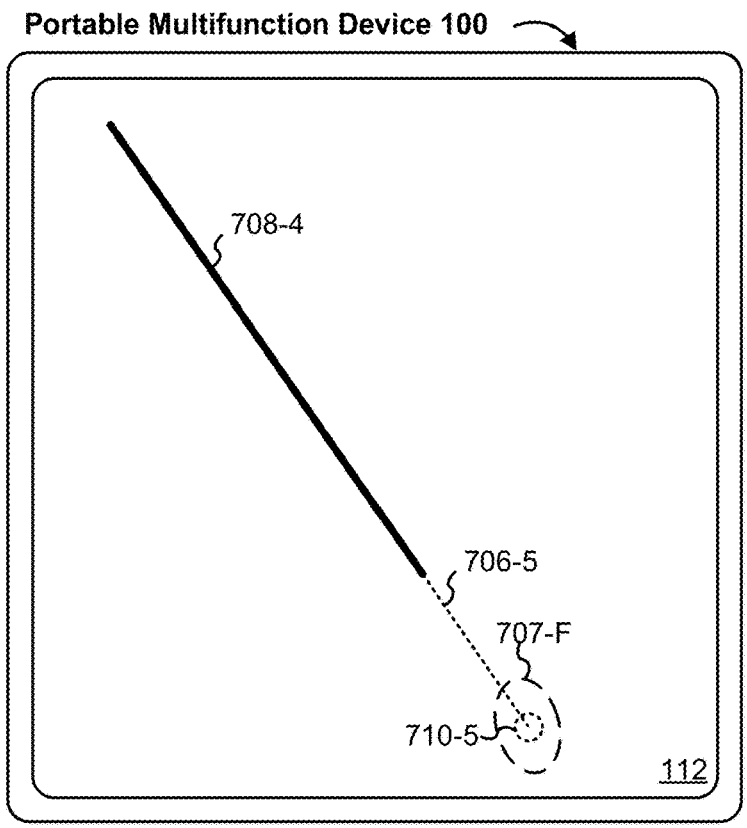
Figure 7A:
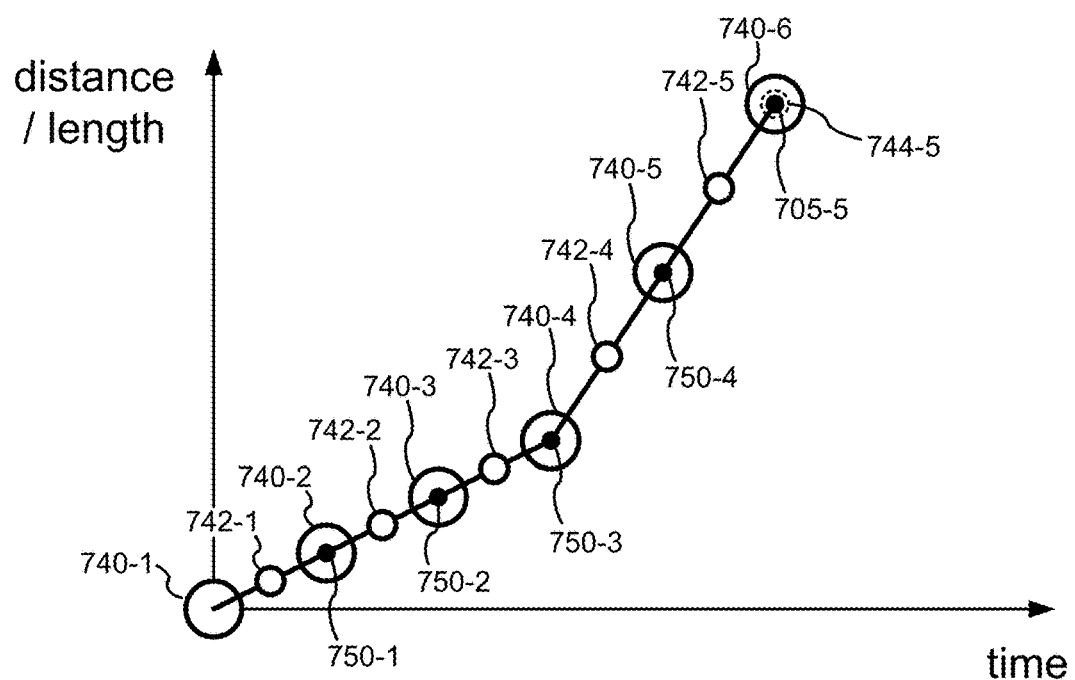
Figure 7B:
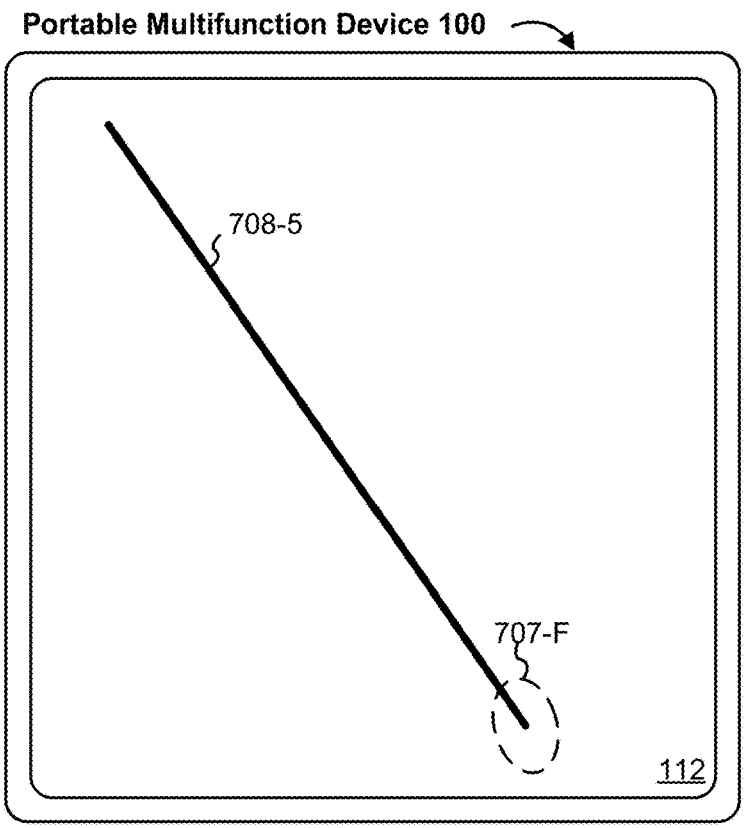
Figure 7B:
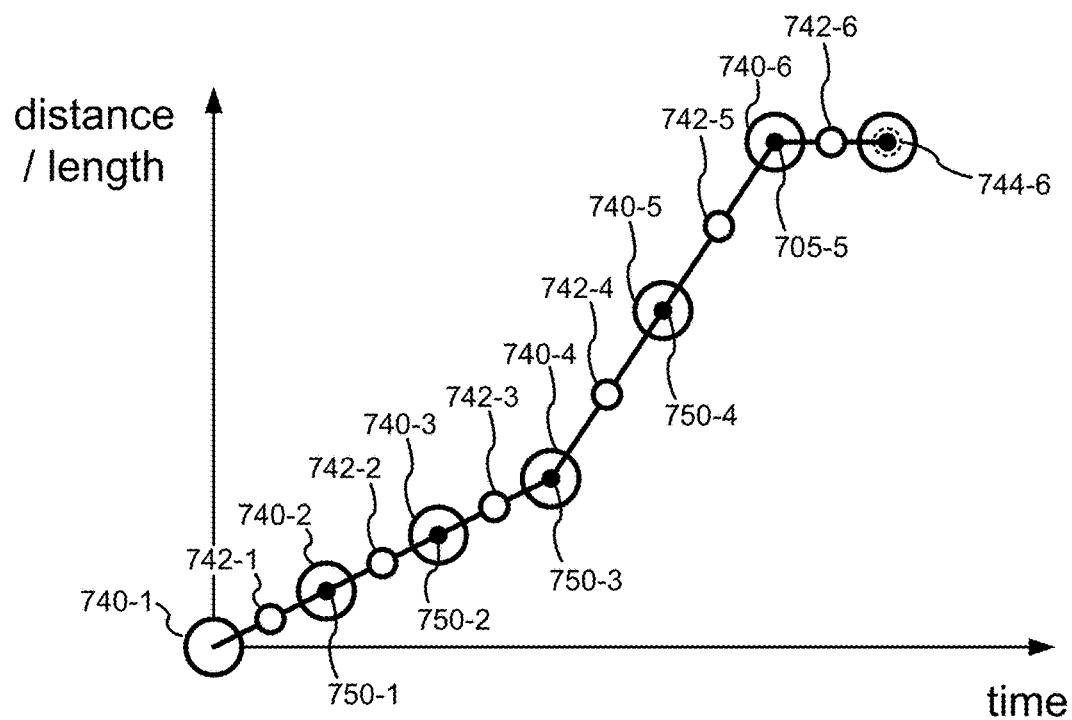
Figure 7C:
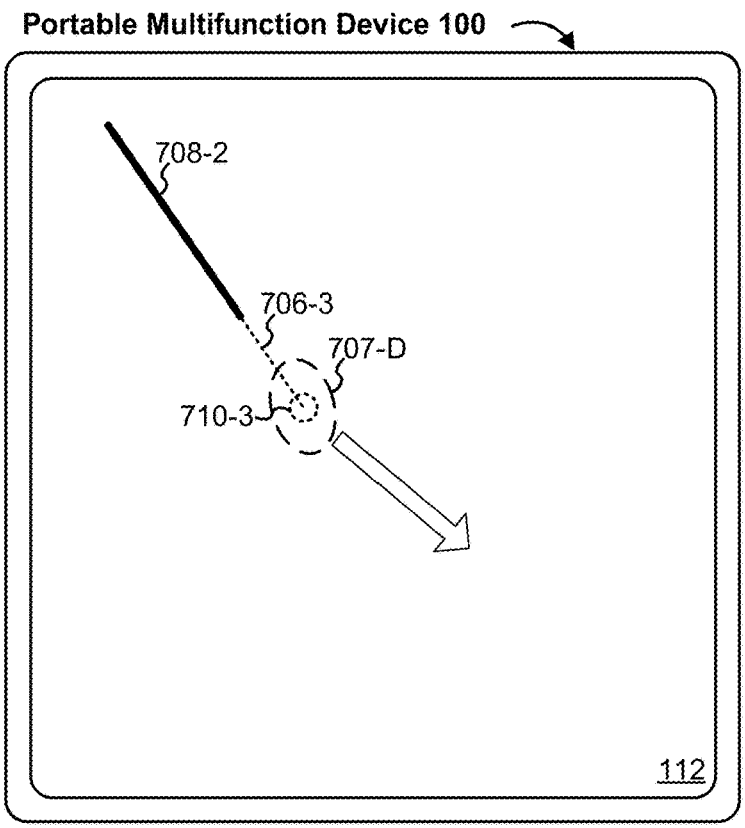
Figure 7C:
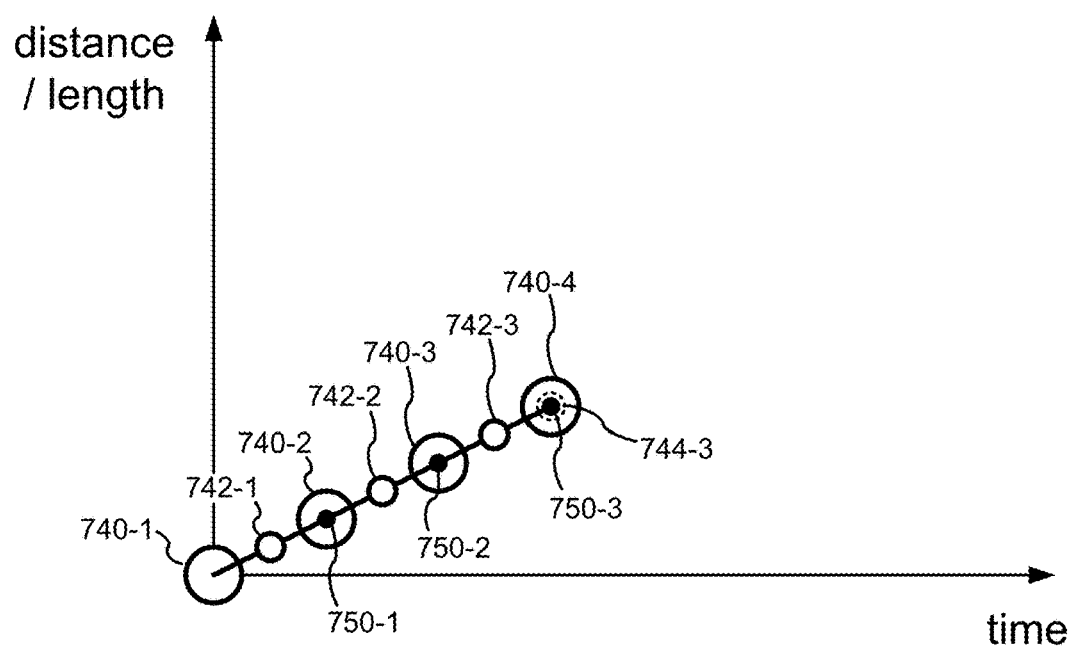
Figure 7D:
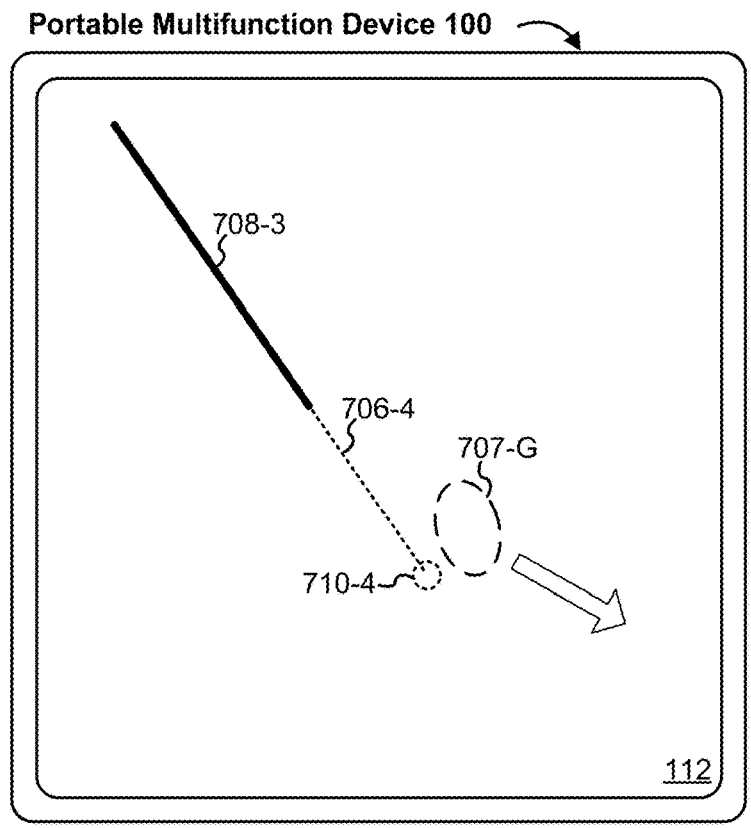
Figure 7D:
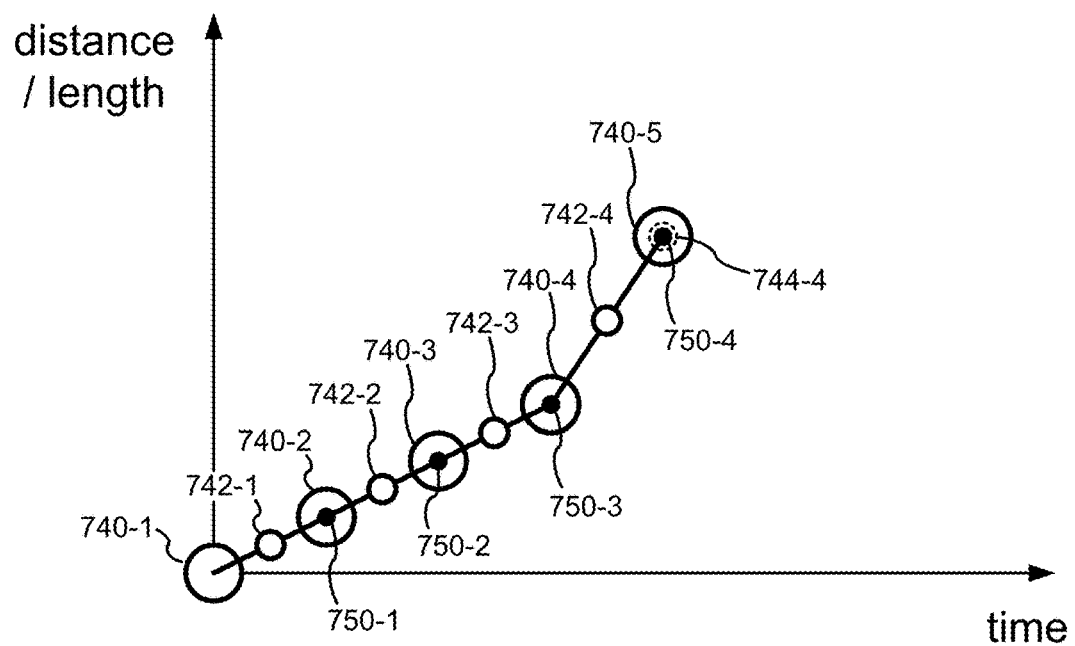
Figure 7E:
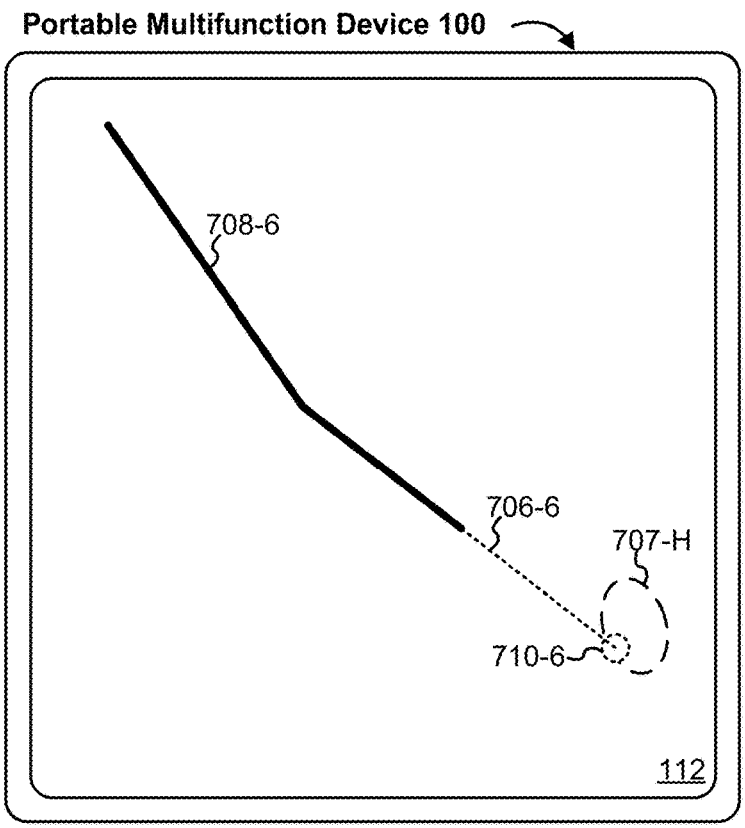
Figure 7E:
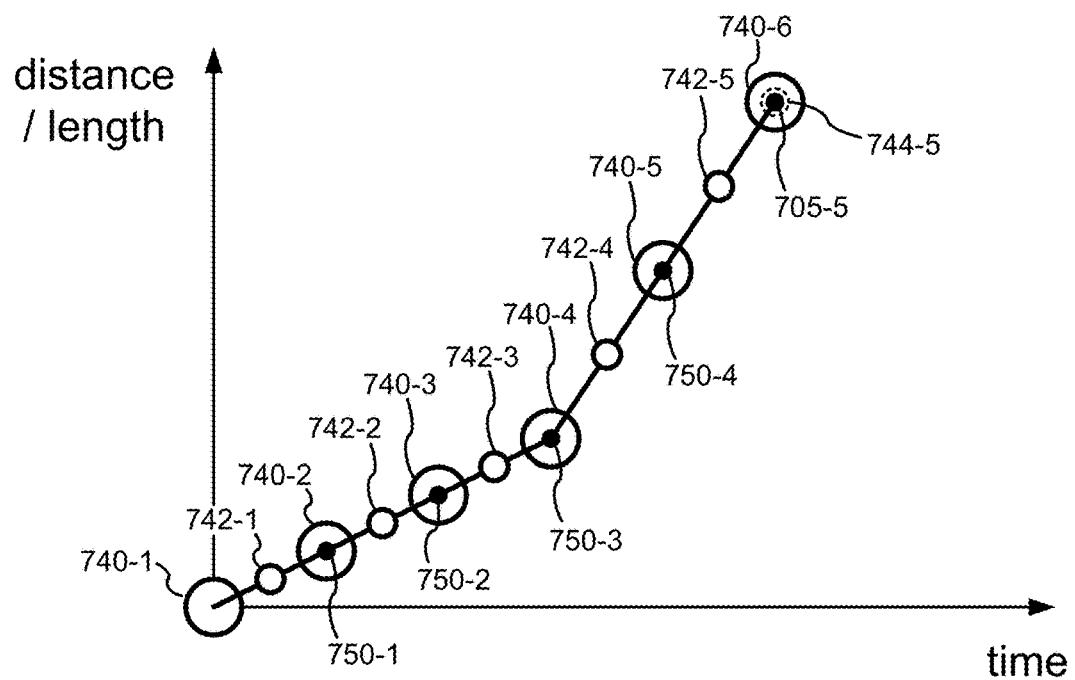
Figure 7F:
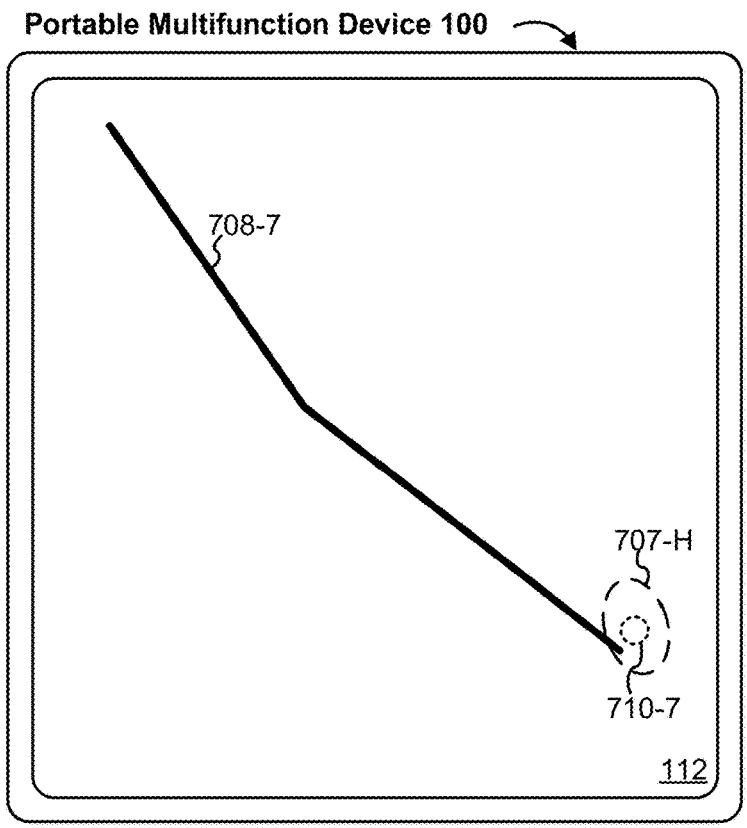
Figure 7F:
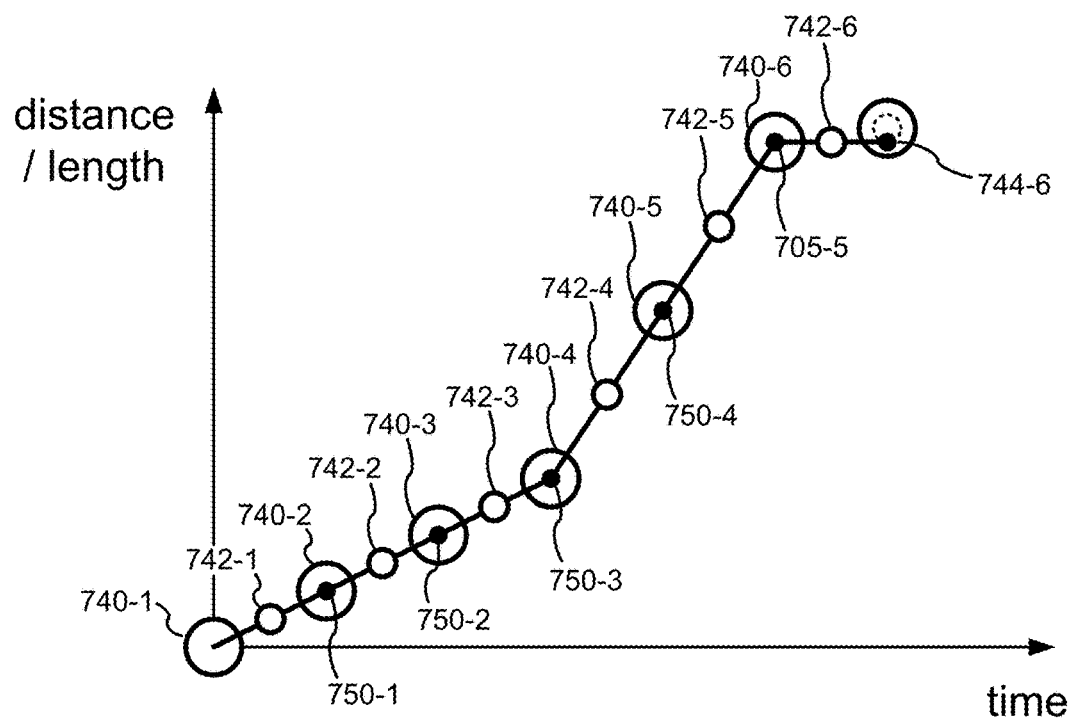
Figure 7G:
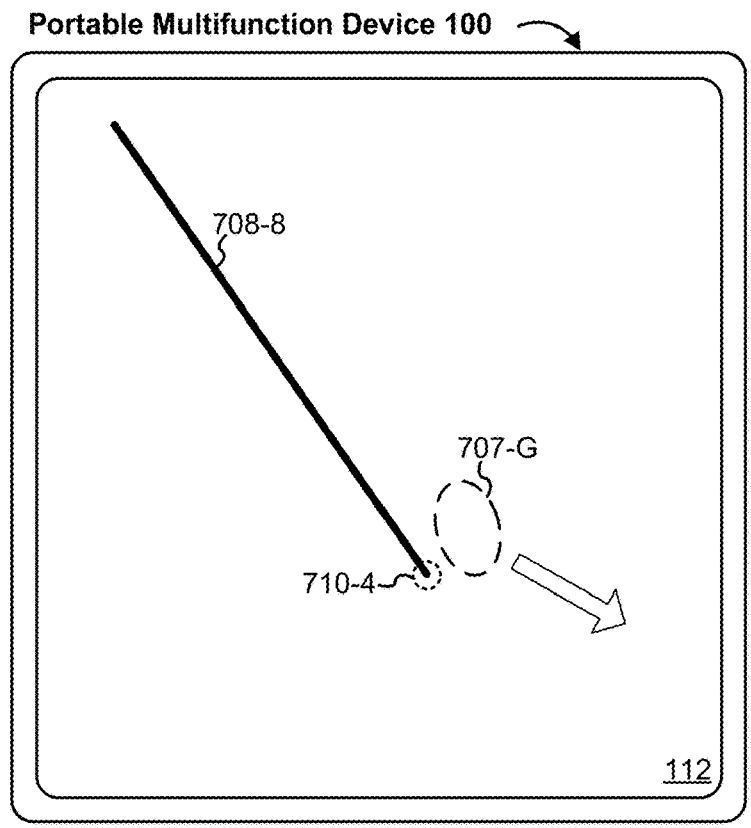
Figure 7G:
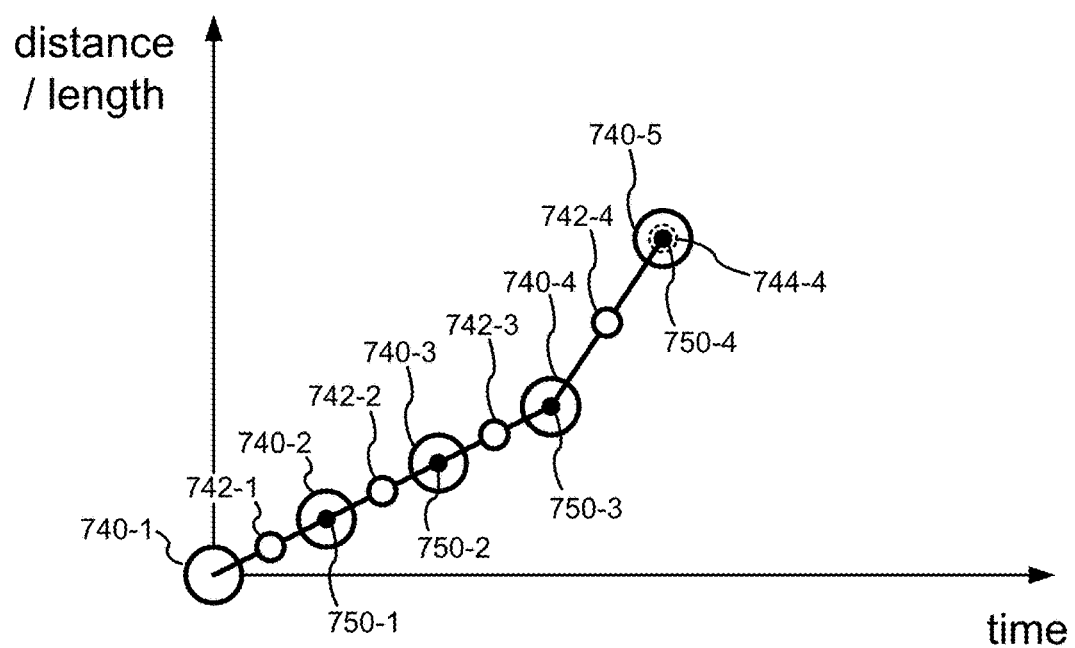
Figure 7H:
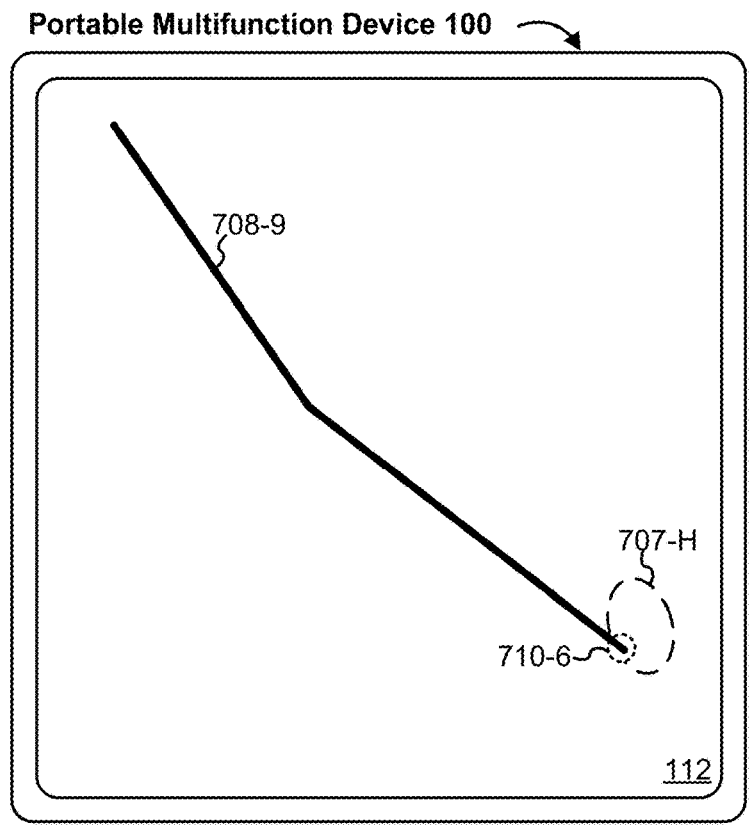
Figure 7H:
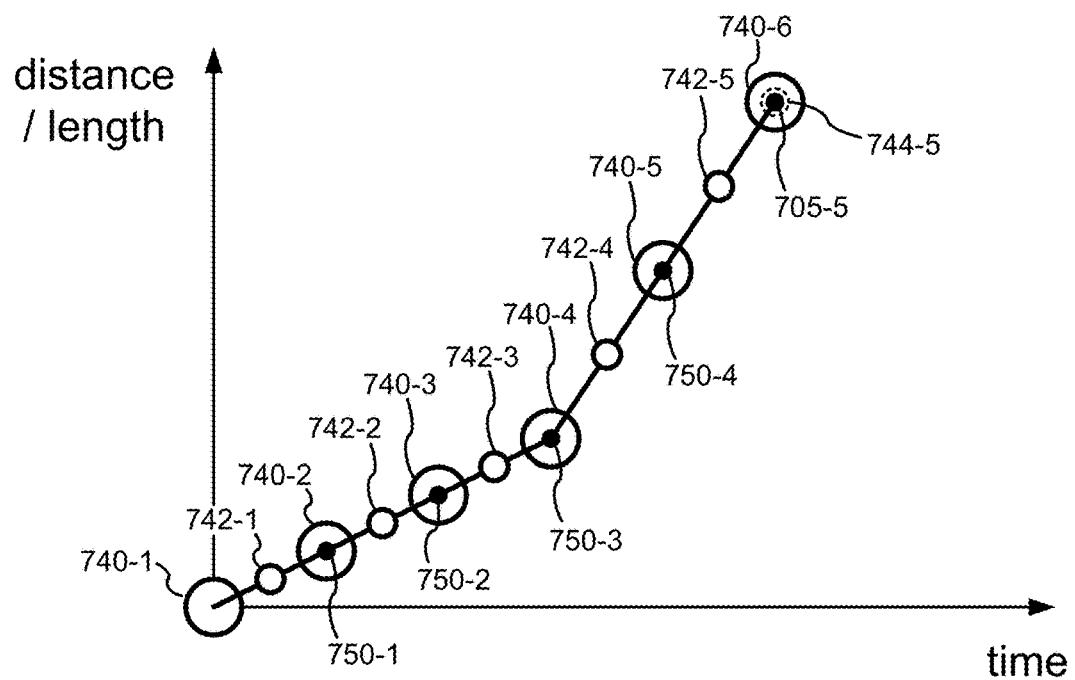
Figure 7I:
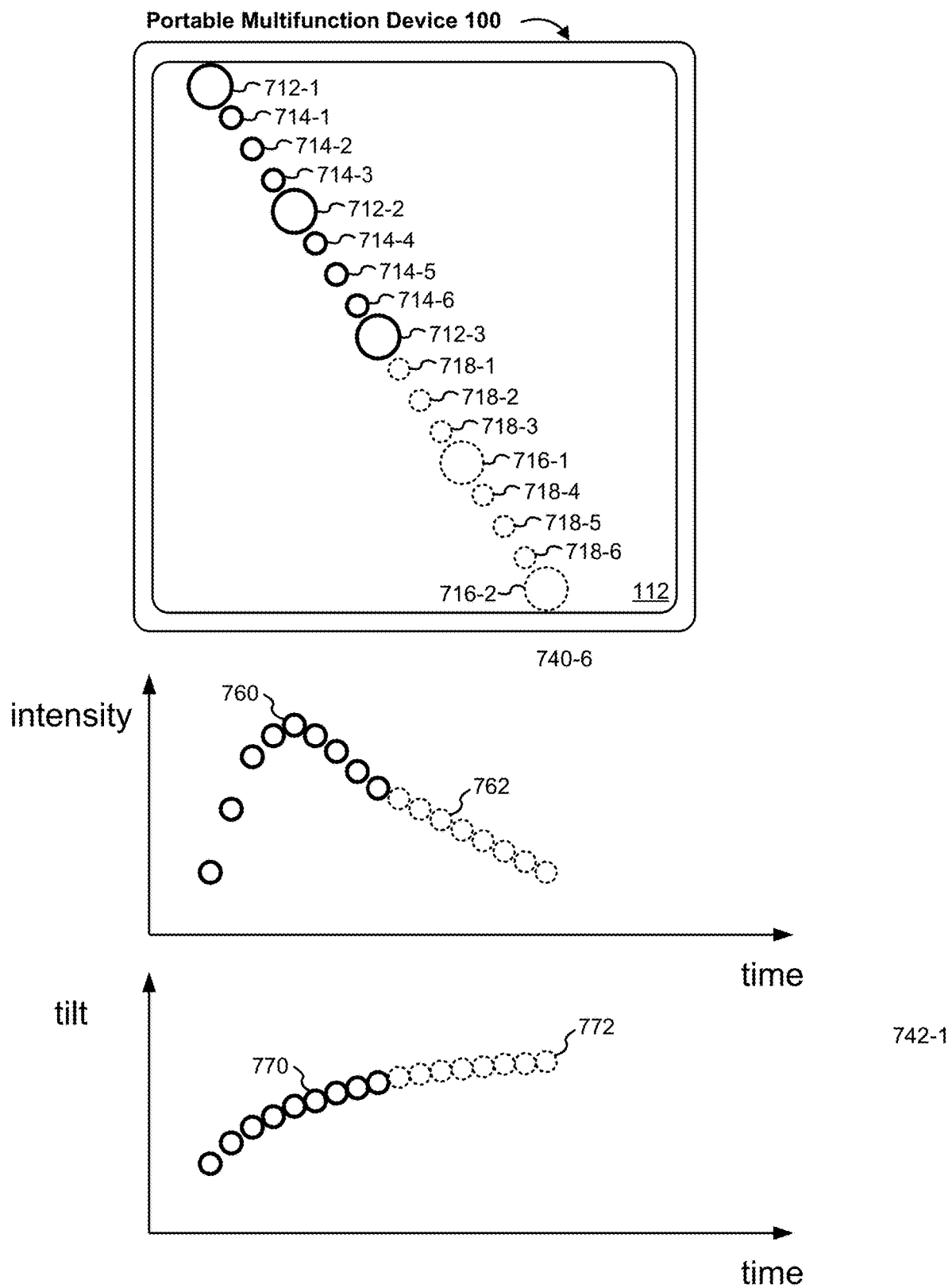
Figure 7J:
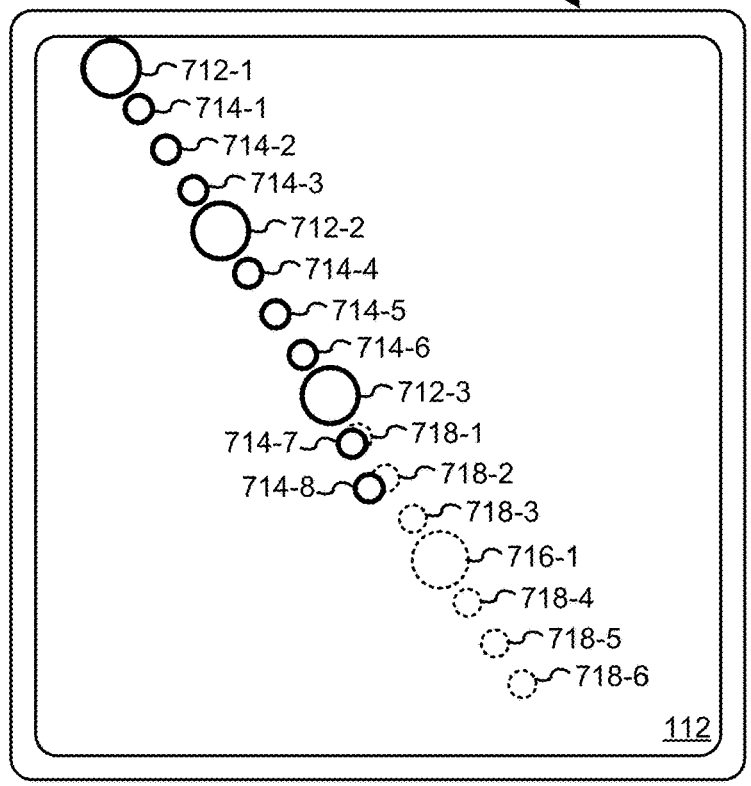
Figure 7K:
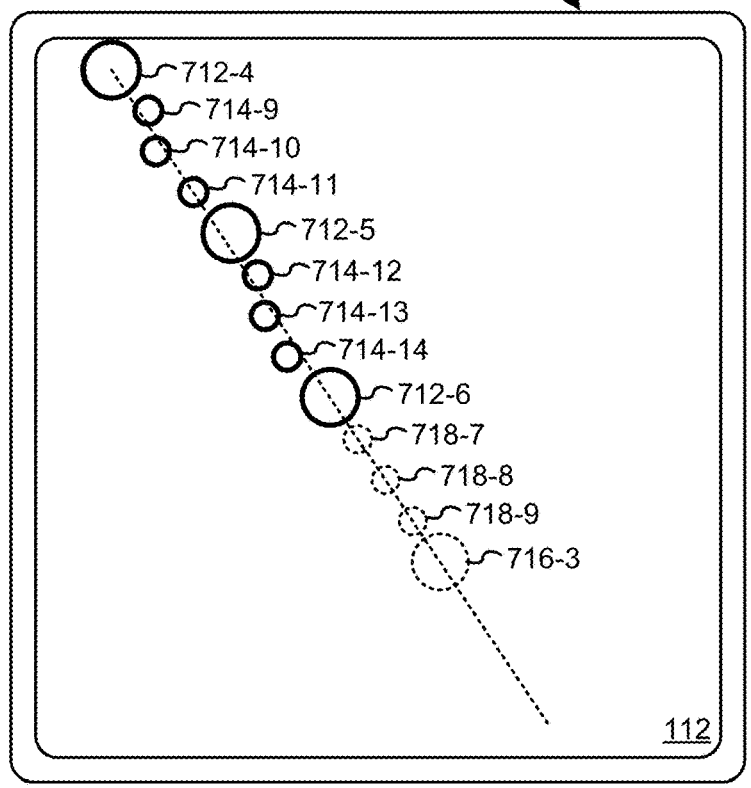
Figure 7L:
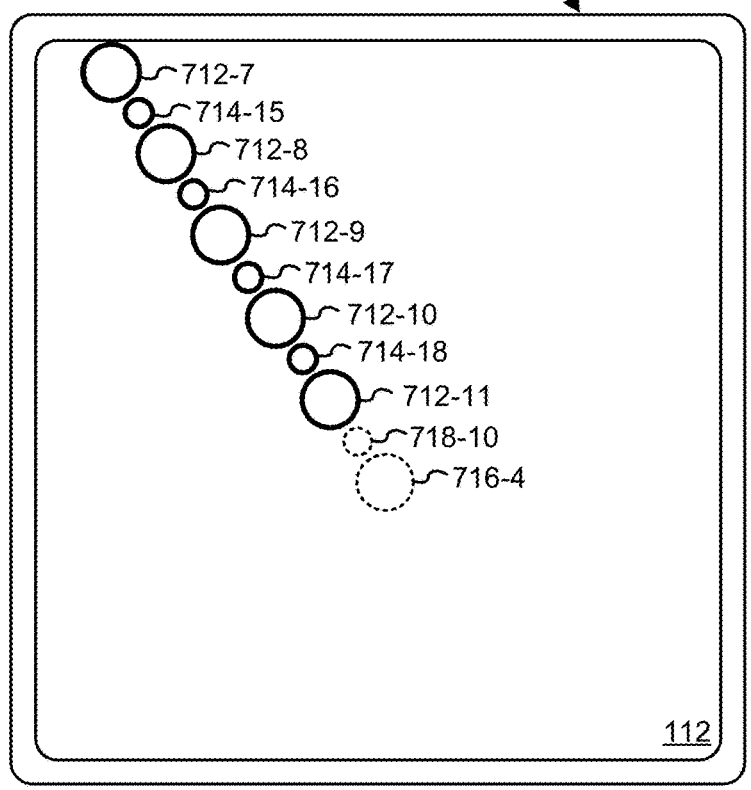
Figure 7M:
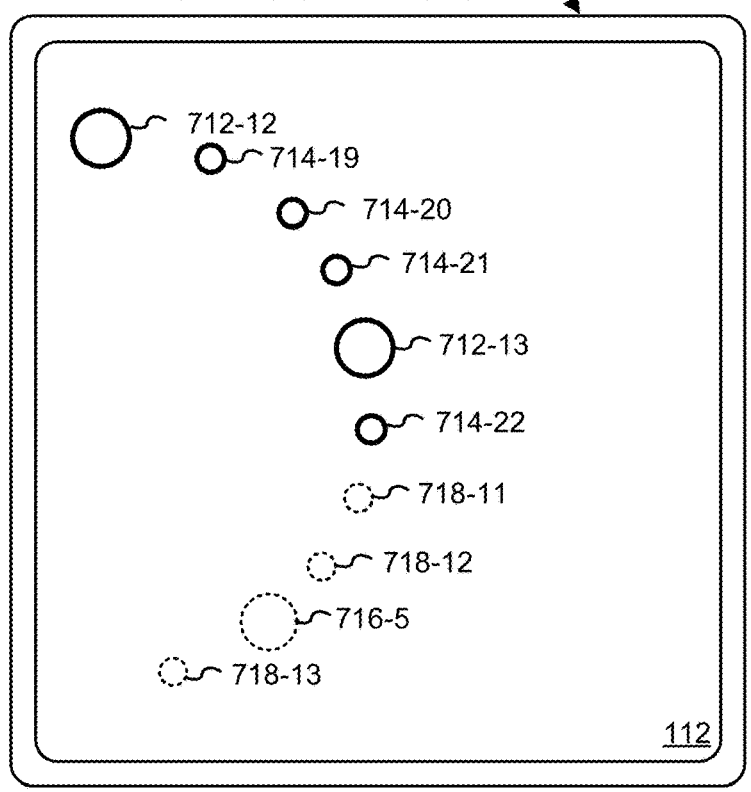
Figure 7N:
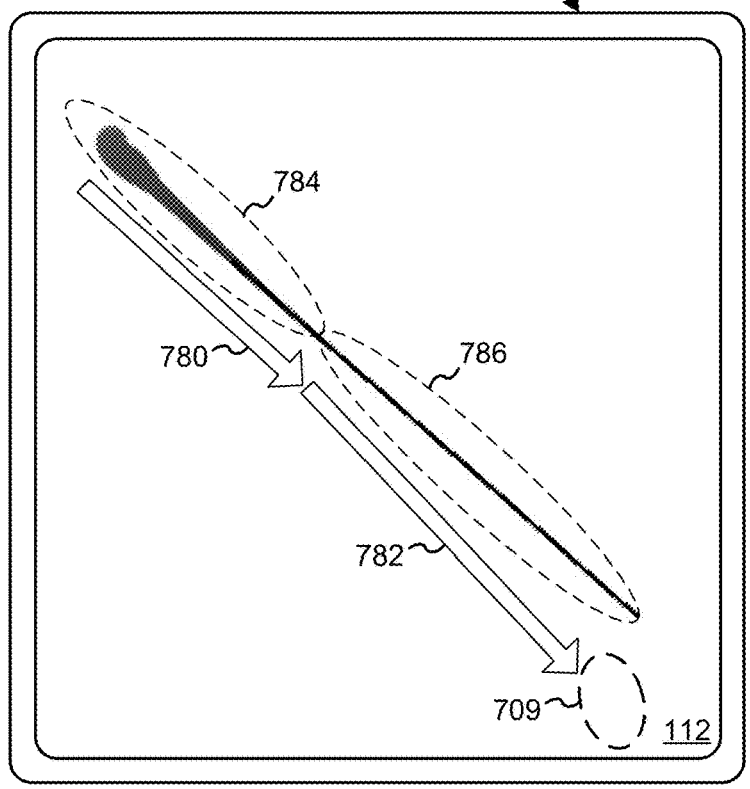
Figure 7O:
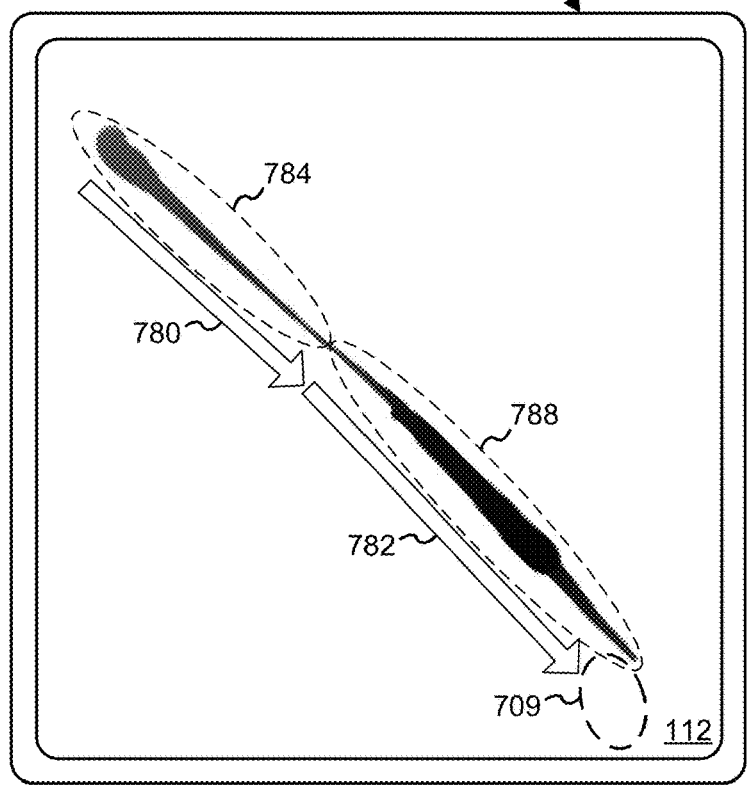

In some embodiments, the device predicts (1038) for the touch input a second set of one or more locations on the touch-sensitive surface (e.g., based on multiple locations in the second set of sequential locations and/or the first set of sequential locations), and updates the user interface in accordance with the second set of sequential locations on the touch-sensitive surface and the second set of one or more predicted locations of the touch input on the touch-sensitive surface. For example, in FIGS. 7Z-7AA, both detected touch locations and predicted touch locations are used for updating the user interface.

In some embodiments, a portion of the user interface that is updated (1040) in accordance with one or more predicted locations is visually distinguished from a portion of the user interface that is updated in accordance with one or more detected locations (e.g., a path based on the predicted locations is drawn with a dashed line and a path based on the measured locations is drawn with a continuous line as illustrated in FIGS. 7W-7BB).

It should be understood that the particular order in which the operations in FIGS. 10A-10C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, and 1100) are also applicable in an analogous manner to method 1000 described above with respect to FIGS. 10A-10C. For example, the application programming interface, predicted touch locations, representative touch locations, and interstitial touch locations described above with reference to method 1000 optionally have one or more of the characteristics of the application programming interface, predicted touch locations, representative touch locations, and interstitial touch locations described herein with reference to other methods described herein (e.g., methods 800, 900, and 1100). For brevity, these details are not repeated here.

FIG. 11 illustrates a flow diagram of method 1100 of transferring predicted touch information in accordance with some embodiments. Method 1100 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

As described below, method 1100 provides a way to transfer predicted touch information. Use of predicted touch information reduces discrepancies between detected touch inputs and displayed user interfaces, thereby reducing the cognitive burden on a user when interacting with a touch screen. In addition, this creates a more efficient human-machine interface. For battery-operated electronic devices, enabling a user to interact with the user interface more accurately reduces errors and unnecessary corrections, thereby conserving power and increasing the time between battery charges.

The device displays (1102) a user interface of a first software application that is updated at a first display rate (e.g., the user interface of a drawing application in FIG. 7Q).

The device detects (1104) respective movement of a touch input across the touch-sensitive surface at a first detection rate that is higher than the first display rate (e.g., in FIG. 7H, the detection rate is higher than the display rate).

The device, at an application-independent touch processing module (e.g., using the application-independent touch processing module, such as touch processing module 220 in FIG. 1C), sends (1106) to an application-specific portion of the first software application touch location information for the touch input that identifies: one or more predicted locations of the touch input on the touch-sensitive surface (e.g., location 250 in predicted touches 244, FIG. 1D); and one or more predicted intensity values of the touch input at one or more intensity locations of the touch input on the touch-sensitive surface (e.g., intensity 252 in predicted touches 244, FIG. 1D), the one or more intensity locations comprising at least a subset of the one or more predicted locations.

In some embodiments, location 250 of predicted touches 244 in FIG. 1D includes one or more predicted locations of the touch input and/or one or more predicted intensity locations (e.g., one or more locations for which intensity is predicted). In some embodiments, a respective intensity value corresponds to a force or pressure applied by the touch input on the touch-sensitive surface. In some embodiments, the one or more intensity locations are the one or more predicted locations on the touch-sensitive surface. In some embodiments, the one or more intensity locations are distinct from the one or more predicted locations on the touch-sensitive surface.

The device, at the first software application (e.g., using the first software application), processes (1122) the touch location information (e.g., application 1 (136-1) in FIG. 1C is used to process the touch location information). In some embodiments, processing the touch location information includes updating a user interface in accordance with the touch location information.

In some embodiments, the touch location information includes (1108) a respective touch identifier (e.g., a number or a string that identifies the touch associated with each predicted location) for each predicted location in the one or more predicted locations of the touch input on the touch-sensitive surface (e.g., touch identifiers 246 in predicted touches 244 in FIG. 1D).

In some embodiments, the touch location information also identifies (1110): a plurality of detected locations of the touch input on the touch-sensitive surface (e.g., location 250 in detected touches 242 in FIG. 1D); and a plurality of intensity values of the touch input at a plurality of intensity locations on the touch-sensitive surface (e.g., intensity 252 in detected touches 242 in FIG. 1D).

In some embodiments, the plurality of intensity locations on the touch-sensitive surface is (1112) the plurality of detected locations (e.g., intensity is detected by one or more intensity sensors at same locations that correspond to locations detected by a touch-sensitive surface). In some embodiments, the plurality of intensity locations is distinct from the plurality of detected locations. In some embodiments, the plurality of intensity locations is a subset of the plurality of detected locations. In some embodiments, the plurality of detected locations is a subset of the plurality of intensity locations.

In some embodiments, the touch location information includes (1114) one or more touch identifiers for the plurality of detected locations (e.g., touch identifiers 246 in detected touches 242 in FIG. 1D). In some embodiments, the one or more identifiers for the plurality of detected locations do not include the respective identifier for the one or more predicted locations in the touch location information.

In some embodiments, the touch location information also identifies (1116) predicted tilt and/or orientation of the touch input (e.g., tilt/orientation 254 in predicted touches 244 in FIG. 1D).

In some embodiments, the touch location information also identifies (1118) a type of the touch input (e.g., whether the touch input is made with a finger or a stylus as indicated by touch type 258 in FIG. 1D).

In some embodiments, sending to the application-specific portion of the first software application touch location information for the touch input includes (1120) posting the touch location information for the touch input. For example, event object 194 as illustrated in FIG. 1D is posted in queue 218-1 in FIG. 1C.

It should be understood that the particular order in which the operations in FIG. 11 has been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, and 1000) are also applicable in an analogous manner to method 1100 described above with respect to FIG. 11. For example, the touch information, the predicted touch locations, predicted intensity, information sending operations described above with reference to method 1100 optionally have one or more of the characteristics of the touch information, the predicted touch locations, predicted intensity, information sending operations described herein with reference to other methods described herein (e.g., methods 800, 900, and 1000). For brevity, these details are not repeated here.

Figure 12:
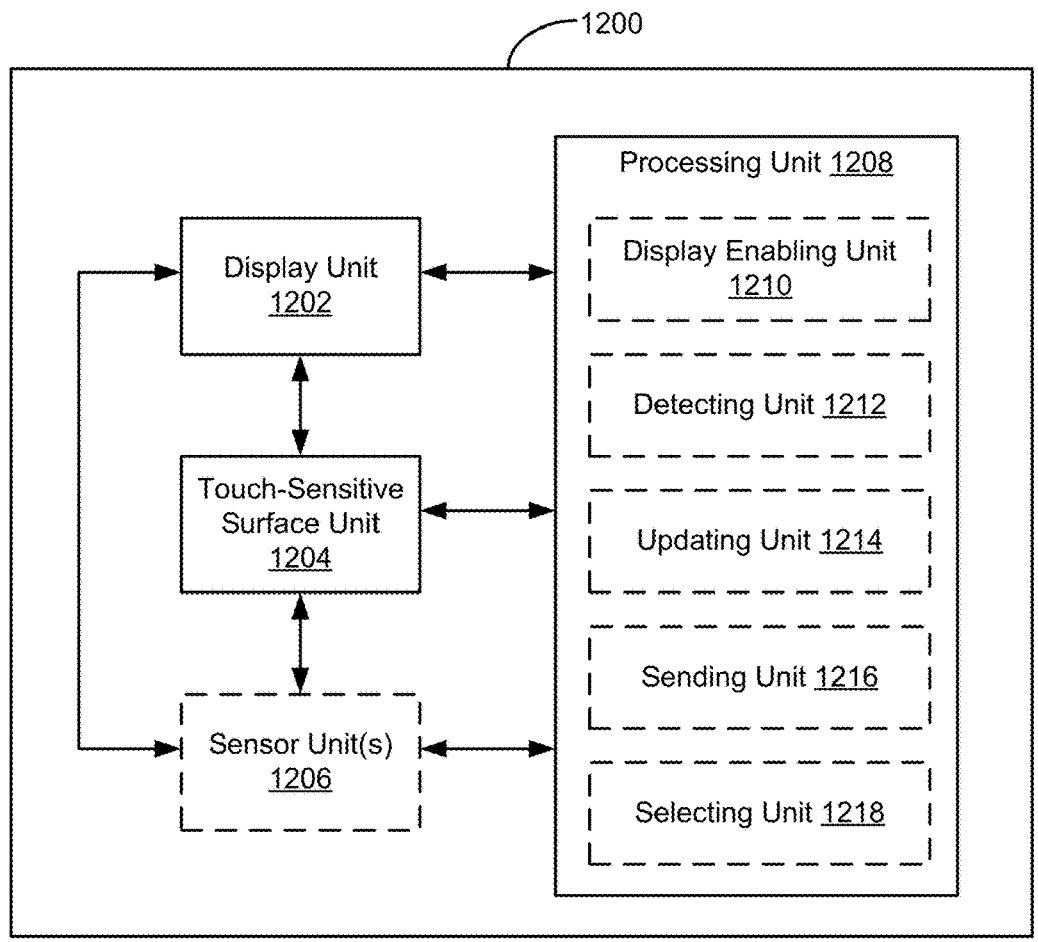
FIGS. 12-15 are functional block diagrams of an electronic device in accordance with some embodiments.

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, the electronic device 1200 includes a display unit 1202 configured to display a user interface, a touch-sensitive surface unit 1204 configured to receive contacts, and a processing unit 1208 coupled with the display unit 1202 and the touch-sensitive surface unit 1204. In some embodiments, the electronic device includes one or more sensor units 1206 configured to detect inputs, and the processing unit 1208 is also coupled with the one or more sensor units 1206. In some embodiments, the one or more sensor units 1206 include one or more sensors configured to detect intensity of contacts with the touch-sensitive surface unit 1204. In some embodiments, the one or more sensor units 1206 include one or more sensors configured to detect signals from a stylus associated with the electronic device 1200. In some embodiments, the processing unit 1208 includes: a display enabling unit 1210, a detecting unit 1212, an updating unit 1214, a sending unit 1216, and/or a selecting unit 1218.

The processing unit 1208 is configured to enable display of a user interface at a first display rate (e.g., with display enabling unit 1210).

The processing unit 1208 is also configured to, while the user interface is displayed, detect, at a first detection rate that is greater than the first display rate, movement of a touch input at a sequence of locations on the touch-sensitive surface unit 1204 (e.g., with detecting unit 1212).

The processing unit 1208 is further configured to, at each of a sequence of update times, update the user interface from a respective current state to a respective next state in accordance with a selected subset of the sequence of locations of the touch input (e.g., with updating unit 1214), each selected subset of the sequence of locations comprising a plurality of locations of the touch input.

In some embodiments, the processing unit 1208 is configured to send to a first software application a message having information that includes the selected subset of the sequence of locations (e.g., with sending unit 1216), and the first software application updates the user interface in accordance with the information in the message.

In some embodiments, the message also includes information identifying one or more of: intensity of the touch input at the selected subset of the sequence of locations; and a type of the touch input detected at the selected subset of the sequence of locations.

In some embodiments, a last detected location in each selected subset is detected at least a predefined time interval prior to a next update time.

In some embodiments, the processing unit 1208 is configured to select a respective touch location in the selected subset of the sequence of locations of the touch input as a representative touch location (e.g., with selecting unit 1218).

In some embodiments, the respective touch location is selected as the representative touch location in accordance with touch-processing criteria for the first application that indicate an amount of time needed by the first application to update the user interface.

In some embodiments, updating the user interface by the first application includes transmitting the selected subset of the sequence of locations of the touch input to the first application along with an indication of which location is the representative touch location.

In some embodiments, the selected subset of the sequence of locations includes one or more interstitial locations that correspond to touch locations between a prior representative touch location and the representative touch location.

In some embodiments, the processing unit 1208 is configured to, for each update time in the sequence of update times, select a plurality of locations of the touch input to use for updating the user interface (e.g., with selecting unit 1218), wherein the selected locations are locations of the touch input detected after a last selection of locations to use for updating the user interface.

In some embodiments, the selected plurality of locations of the touch input includes one or more predicted interstitial locations.

In some embodiments, the processing unit 1208 is configured to, for each update time in the sequence of update times, select a plurality of locations of the touch input to use for updating the user interface (e.g., with selecting unit 1218), wherein the selected locations are locations of the touch input detected after detecting locations of the touch input last selected for updating the user interface.

In some embodiments, the selected locations include all of the locations of the touch input detected after detecting locations of the touch input last selected for updating the user interface.

In some embodiments, the selected locations include only one of the locations of the touch input detected after detecting locations of the touch input last selected for updating the user interface.

In some embodiments, the processing unit 1208 is configured to update the user interface from a first state to a second state in accordance with a first subset of the sequence of locations of the touch input (e.g., with updating unit 1214); and, subsequent to updating the user interface from the first state to the second state, update the user interface from the second state to a third state in accordance with a second subset of the sequence of locations of the touch input.

Figure 13:
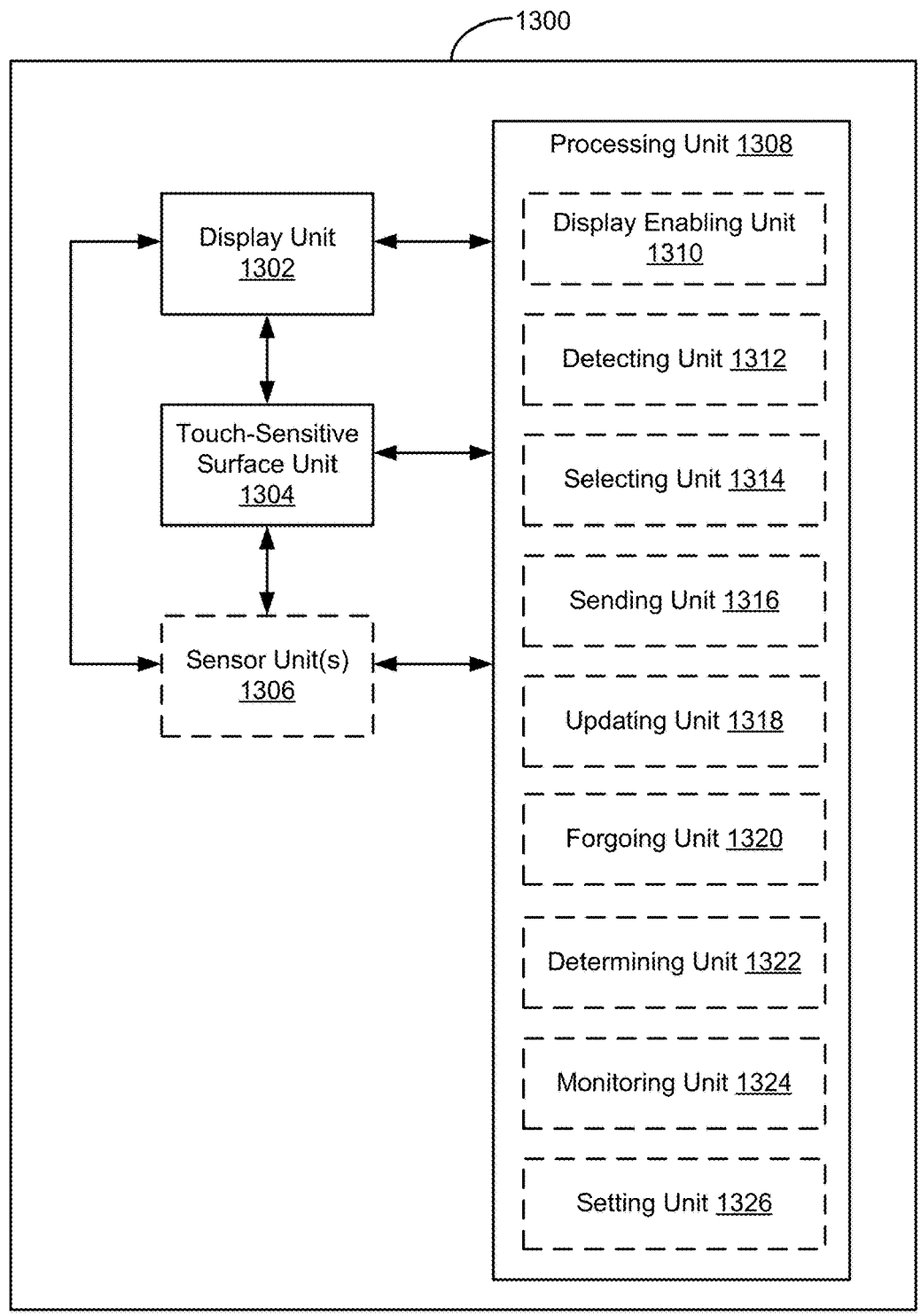

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, the electronic device 1300 includes a display unit 1302 configured to display a user interface, a touch-sensitive surface unit 1304 configured to receive contacts, and a processing unit 1308 coupled with the display unit 1302 and the touch-sensitive surface unit 1304. In some embodiments, the electronic device includes one or more sensor units 1306 configured to detect inputs, and the processing unit 1308 is also coupled with the one or more sensor units 1306. In some embodiments, the one or more sensor units 1306 include one or more sensors configured to detect intensity of contacts with the touch-sensitive surface unit 1304. In some embodiments, the one or more sensor units 1306 include one or more sensors configured to detect signals from a stylus associated with the electronic device 1300. In some embodiments, the processing unit 1308 includes: a display enabling unit 1310, a detecting unit 1312, a selecting unit 1314, a sending unit 1316, an updating unit 1318, a forgoing unit 1320, a determining unit 1322, a monitoring unit 1324, and/or a setting unit 1326.

The processing unit 1308 is configured to enable display of a user interface of a first software application that is updated at a first display rate (e.g., with display enabling unit 1310).

The processing unit 1308 is also configured to, while a first frame of the user interface in accordance with the first display rate is displayed: detect respective movement of a touch input across the touch-sensitive surface unit 1304 (e.g., with detecting unit 1312); and, at an application-independent touch processing module: select a respective touch location of the touch input that was detected during the respective movement to identify as a representative touch location for the respective movement based on touch-processing criteria for the first software application (e.g., with selecting unit 1314); and send to an application-specific portion of the first software application, which is distinct from the touch processing module, touch location information for the touch input that identifies the respective touch location as the representative touch location for the respective movement (e.g., with sending unit 1316).

The processing unit 1308 is further configured to, at the first software application, update the user interface in accordance with the touch location information (e.g., with updating unit 1318).

In some embodiments, the processing unit 1308 is configured to send (e.g., with sending unit 1316) the touch location information with a first portion of the first software application, comprising an application-independent sub-module, and update the user interface with a second portion of the software application that comprises an application-specific sub-module (e.g., with updating unit 1318).

In some embodiments, the movement of the touch input is detected during a respective touch-detection frame; an updated user interface of the first application, based on the movement of the touch input, is generated during a respective touch-processing frame; and the updated user interface is displayed on the display for the duration of a respective display frame that occurs after the respective touch-processing frame.

In some embodiments, the processing unit 1308 is configured to, during the respective touch-processing frame, enable display of a user interface for the first application that was generated during a prior touch-processing frame (e.g., with display enabling unit 1310).

In some embodiments, the processing unit 1308 is configured to, during the respective display frame, detect subsequent movement of the touch input across the touch-sensitive surface unit 1304 and send to the first software application touch location information for the subsequent movement of the touch input (e.g., with detecting unit 1312).

In some embodiments, selecting the respective touch location as the representative touch location includes: detecting a first touch location of the touch input during the touch-detection frame, and in response to detecting the first location: in accordance with a determination that the first touch location meets the touch-processing criteria for the first application, selecting the first touch location as the representative touch location for the respective movement of the touch input; and, in accordance with a determination that the first touch location does not meet the touch-processing criteria for the first application, forgoing selecting the first touch location as the representative touch location for the respective movement of the touch input.

In some embodiments, selecting the respective touch location as the representative touch location includes: detecting a second touch location of the touch input during the touch-detection frame, and in response to detecting the second location, in accordance with a determination that the second touch location meets the touch-processing criteria for the first application, selecting the second touch location as the representative touch location for the respective movement of the touch input.

In some embodiments, the processing unit 1308 is configured to, in accordance with a determination that the second touch location does not meet touch-processing criteria for the first application, forgo (e.g., with forgoing unit 1320) selecting the second touch location as the representative touch location for the respective movement of the touch input.

In some embodiments, the processing unit 1308 is configured to, at the application-independent touch processing module: determine (e.g., with determining unit 1322) a timing of sending the one or more selected locations to the first software application; and send (e.g., with sending unit 1316) the one or more selected locations to the first software application in accordance with the determined timing.

In some embodiments, the processing unit 1308 is configured to monitor status of the first software application (e.g., with monitoring unit 1324), wherein the timing is determined in accordance with the status of the first software application.

In some embodiments, the processing unit 1308 is configured to: determine (e.g., with determining unit 1322) a processing margin time; at each of a sequence of communication times, each of which precedes a display update time in a sequence of display update times by at least the determined processing margin time, send (e.g., with sending unit 1316), from the touch processing module to the first software application, a set of locations that includes one or more selected locations of the touch input during a preceding time period; and, at the first software application, update (e.g., with updating unit 1318) the first user interface in time for display at the sequence of display update times in accordance with the set of locations sent by the touch processing module at the sequence of communication times.

In some embodiments, determining the processing margin time includes setting (e.g., with setting unit 1326) the processing margin time to an initial value and then determining an updated processing margin time in accordance with one or more measurements of performance of the first software application.

In some embodiments, the processing margin time is determined in accordance with a longest processing time by the first software application while processing each of a plurality of sets of touch input locations.

In some embodiments, the locations of the touch input included in the set of locations sent at each communication time correspond to a plurality of detected locations of the touch input between successive communication times in the sequence of communication times.

In some embodiments, the processing unit 1308 is configured to send (e.g., with sending unit 1316) to the first software application predicted touch location information for the touch input that identifies one or more predicted touch locations for the respective movement.

In some embodiments, the processing unit 1308 is configured to send (e.g., with sending unit 1316) the touch location information for the touch input to a plurality of software applications, including the first software application.

In some embodiments, the processing unit 1308 is configured to: send (e.g., with sending unit 1316) to the first software application the touch location information for the touch input in accordance with a determination that the first software application is configured to receive the touch location information; and send (e.g., with sending unit 1316) to a second software application that is distinct from the first software application subsequent touch location information for the touch input in accordance with a determination that the second software application is configured to receive the subsequent touch location information.

Figure 14:
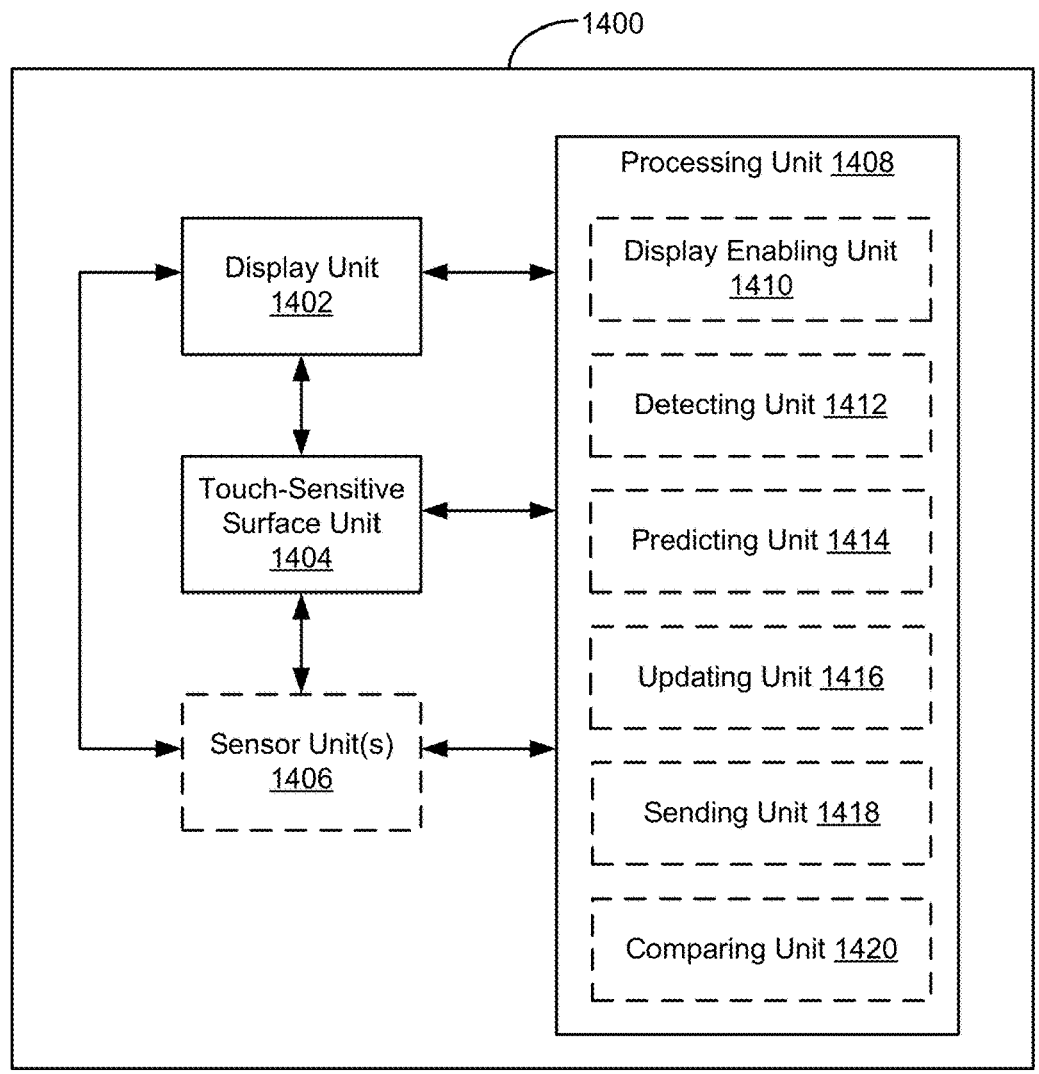

In accordance with some embodiments, FIG. 14 shows a functional block diagram of an electronic device 1400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, the electronic device 1400 includes a display unit 1402 configured to display a user interface, a touch-sensitive surface unit 1404 configured to receive contacts, and a processing unit 1408 coupled with the display unit 1402 and the touch-sensitive surface unit 1404. In some embodiments, the electronic device includes one or more sensor units 1406 configured to detect inputs, and the processing unit 1408 is also coupled with the one or more sensor units 1406. In some embodiments, the one or more sensor units 1406 include one or more sensors configured to detect intensity of contacts with the touch-sensitive surface unit 1404. In some embodiments, the one or more sensor units 1406 include one or more sensors configured to detect signals from a stylus associated with the electronic device 1400. In some embodiments, the processing unit 1408 includes: a display enabling unit 1410, a detecting unit 1412, a predicting unit 1414, an updating unit 1416, a sending unit 1418, and/or a comparing unit 1420.

The processing unit 1408 is configured to enable display of a user interface at a first display rate (e.g., with display enabling unit 1410).

The processing unit 1408 is also configured to, while displaying the user interface in accordance with the first display rate: detect (e.g., with detecting unit 1412) movement of a touch input, including detecting the touch input at a first set of sequential locations on the touch-sensitive surface unit, wherein the first set of sequential locations includes a plurality of locations on the touch-sensitive surface unit; and predict (e.g., with predicting unit 1412) for the touch input a first set of one or more predicted locations on the touch-sensitive surface unit based on multiple locations in the first set of sequential locations.

The processing unit 1408 is further configured to update (e.g., with updating unit 1416) the user interface in accordance with the first set of one or more predicted locations of the touch input on the touch-sensitive surface unit.

In some embodiments, the movement of the touch input is detected at a first detection rate that is higher than the first display rate.

In some embodiments, the processing unit 1408 is configured to, at an application-independent touch processing module: predict (e.g., with predicting unit 1414) for the touch input the first set of one or more predicted locations on the touch-sensitive surface unit 1404; and send (e.g., with sending unit 1418) to an application-specific portion of the first software application the first set of one or more predicted locations of the touch input on the touch-sensitive surface unit 1404. The processing unit 1408 is also configured to, at the first software application, update (e.g., with updating unit 1416) the user interface in accordance with the first set of one or more predicted locations of the touch input on the touch-sensitive surface unit 1404.

In some embodiments, the processing unit 1408 is configured to, subsequent to detecting the touch input at the first set of sequential locations on the touch-sensitive surface unit 1404: detect (e.g., with detecting unit 1412) the touch input at a second set of sequential locations on the touch-sensitive surface unit 1404; compare (e.g., with comparing unit 1420) the second set of sequential locations of the touch input on the touch-sensitive surface unit 1404 with the first set of one or more predicted locations of the touch input on the touch-sensitive surface unit 1404; and, in accordance with a determination that a difference between the first set of one or more predicted locations of the touch input on the touch-sensitive surface unit 1404 and the second set of sequential locations of the touch input on the touch-sensitive surface unit 1404 satisfies predefined criteria, update (e.g., with updating unit 1416) the user interface in accordance with the second set of sequential locations of the touch input on the touch-sensitive surface unit 1404.

In some embodiments, the processing unit 1408 is configured to: predict (e.g., with predicting unit 1414) for the touch input a second set of one or more locations on the touch-sensitive surface unit 1404; and update (e.g., with updating unit 1416) the user interface in accordance with the second set of sequential locations on the touch-sensitive surface unit 1404 and the second set of one or more predicted locations of the touch input on the touch-sensitive surface unit 1404.

In some embodiments, a portion of the user interface that is updated in accordance with one or more predicted locations is visually distinguished from a portion of the user interface that is updated in accordance with one or more detected locations.

In some embodiments, the movement of the touch input is detected during a respective touch-detection frame; an updated user interface, based on the movement of the touch input, is generated during a respective touch-processing frame; and the updated user interface is displayed on the display for the duration of a respective display frame that occurs after the respective touch-processing frame.

In some embodiments, the one or more predicted locations of the touch input on the touch-sensitive surface unit 1404 are predicted based at least in part on multiple representative touch locations of the touch input on the touch-sensitive surface unit 1404.

In some embodiments, the one or more predicted locations of the touch input on the touch-sensitive surface unit 1404 are predicted based on multiple representative touch locations of the touch input on the touch-sensitive surface unit 1404 and one or more interstitial locations of the touch input on the touch-sensitive surface unit 1404.

In some embodiments, each of the one or more predicted locations is a predicted representative touch location.

In some embodiments, the one or more predicted locations include one or more predicted interstitial touch locations of the touch input on the touch-sensitive surface unit 1404.

In some embodiments, a number of predicted locations in the first set of one or more predicted locations of the touch input is determined in accordance with one or more confidence values associated with the one or more predicted locations.

In some embodiments, a number of predicted locations in the first set of one or more predicted locations of the touch input is determined in accordance with one or more confidence values associated with the multiple locations in the first set of sequential locations.

In some embodiments, the one or more confidence values associated with the multiple locations in the first set of sequential locations are based at least in part on errors in fitting the multiple locations in the first set of sequential locations to a predefined constraint.

In some embodiments, the one or more confidence values associated with the multiple locations in the first set of sequential locations are based at least in part on speed of the movement of the touch input.

In some embodiments, the electronic device includes one or more sensors to detect intensity of touch inputs on the touch-sensitive surface unit 1404. The processing unit 1408 is configured to: predict (e.g., with predicting unit 1414) intensity of the touch input at a plurality of locations on the touch-sensitive surface unit 1404; and update (e.g., with updating unit 1416) the user interface in accordance with the predicted intensity of the touch input.

In some embodiments, the processing unit 1408 is configured to: predict (e.g., with predicting unit 1414) tilt and/or orientation of the touch input at a plurality of locations on the touch-sensitive surface unit 1404; and update (e.g., with updating unit 1416) the user interface in accordance with the predicted tilt and/or orientation of the touch input.

Figure 15:
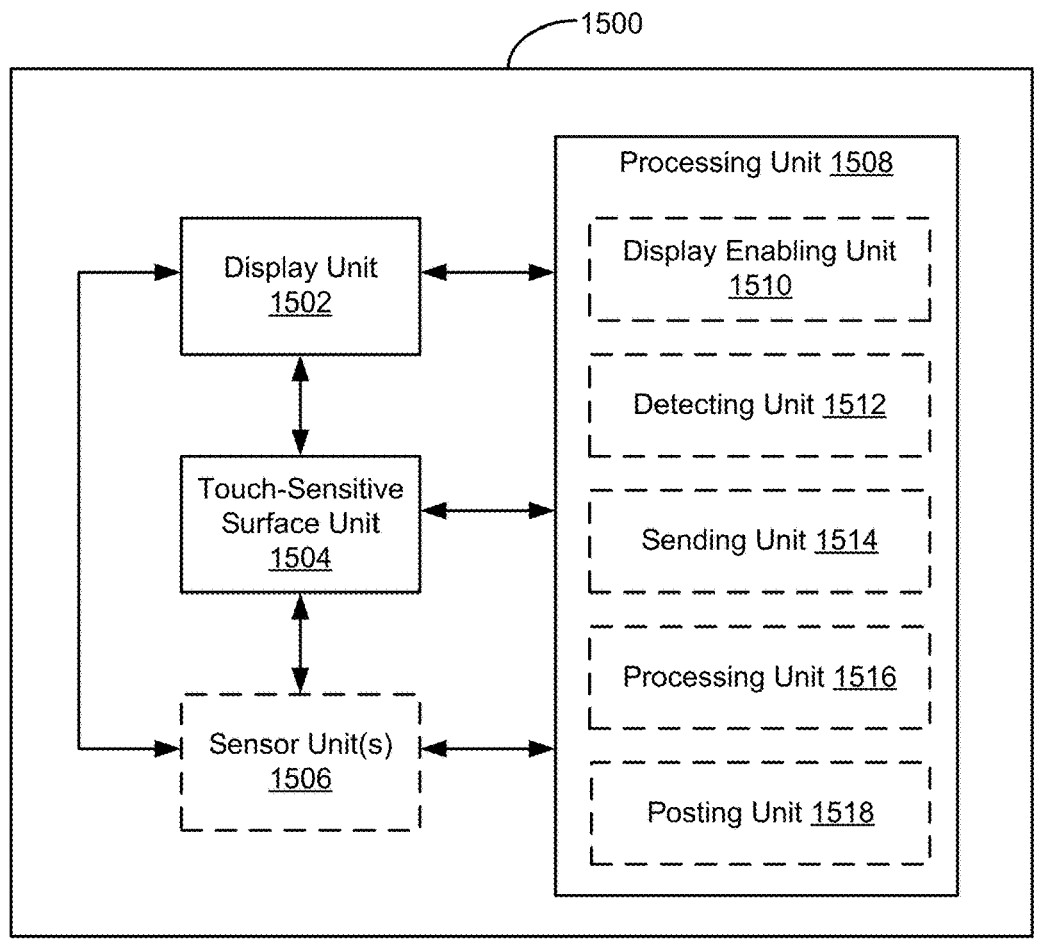

In accordance with some embodiments, FIG. 15 shows a functional block diagram of an electronic device 1500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, the electronic device 1500 includes a display unit 1502 configured to display a user interface, a touch-sensitive surface unit 1504 configured to receive contacts, and a processing unit 1510 coupled with the display unit 1502 and the touch-sensitive surface unit 1504. In some embodiments, the electronic device includes one or more sensor units 1506 configured to detect inputs, and the processing unit 1510 is also coupled with the one or more sensor units 1506. In some embodiments, the one or more sensor units 1506 include one or more sensors configured to detect intensity of contacts with the touch-sensitive surface unit 1504. In some embodiments, the one or more sensor units 1506 include one or more sensors configured to detect signals from a stylus associated with the electronic device 1500. In some embodiments, the processing unit 1508 includes: a display enabling unit 1510, a detecting unit 1512, a sending unit 1514, a processing unit 1516, and/or a posting unit 1518.

The processing unit 1508 is configured to enable display of a user interface of a first software application that is updated at a first display rate (e.g., with display enabling unit 1510); and detect (e.g., with detecting unit 1512) respective movement of a touch input across the touch-sensitive surface unit 1504 at a first detection rate that is higher than the first display rate.

The processing unit 1508 is also configured to, at an application-independent touch processing module, send (e.g., with sending unit 1514) to an application-specific portion of the first software application touch location information for the touch input that identifies: one or more predicted locations of the touch input on the touch-sensitive surface unit 1504; and one or more predicted intensity values of the touch input at one or more intensity locations of the touch input on the touch-sensitive surface unit 1504, the one or more intensity locations comprising at least a subset of the one or more predicted locations.

The processing unit 1508 is further configured to, at the first software application, process (e.g., with processing unit 1516) the touch location information.

In some embodiments, the touch location information includes a respective touch identifier for each predicted location in the one or more predicted locations of the touch input on the touch-sensitive surface unit 1504.

In some embodiments, the touch location information also identifies: a plurality of detected locations of the touch input on the touch-sensitive surface unit 1504; and a plurality of intensity values of the touch input at a plurality of intensity locations on the touch-sensitive surface unit 1504.

In some embodiments, the plurality of intensity locations on the touch-sensitive surface unit 1504 is the plurality of detected locations.

In some embodiments, the touch location information includes one or more touch identifiers for the plurality of detected locations.

In some embodiments, the touch location information also identifies predicted tilt and/or orientation of the touch input.

In some embodiments, the touch location information also identifies a type of the touch input.

In some embodiments, sending to the application-specific portion of the first software application touch location information for the touch input includes posting (e.g., with posting unit 1518) the touch location information for the touch input.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8B, 9A-9D, 10A-10C, and 11 are, optionally, implemented by components depicted in FIGS. 1A-1B or FIGS. 12-15. For example, detection operation 804, message sending operation 808, and updating operation 814 are, optionally, implemented by event sorter 170, event recognizer 180, and event handler 190. Event monitor 171 in event sorter 170 detects a contact on touch-sensitive display 112, and event dispatcher module 174 delivers the event information to application 146-1. A respective event recognizer 180 of application 146-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a touch-sensitive surface, one or more intensity sensors for detecting intensity of contacts, on the touch-sensitive surface, in a range of values that includes at least four distinct values, and a display:
   displaying a user interface of a first software application that is updated at a first display rate;
   detecting respective movement of a touch input across the touch-sensitive surface at a first detection rate that is higher than the first display rate;
   at an application-independent touch processing module, sending to an application-specific portion of the first software application touch location information for the touch input that identifies:
   one or more predicted locations of the touch input on the touch-sensitive surface; and
   one or more predicted intensity values of the touch input at one or more intensity locations of the touch input on the touch-sensitive surface, the one or more intensity locations comprising at least a subset of the one or more predicted locations, wherein the one or more predicted intensity values are based at least in part on intensity values, identified using the one or more intensity sensors, at a plurality of detected locations on the touch-sensitive surface; and, at the first software application, processing the touch location information.

2. The method of claim 1, wherein the touch location information includes a respective touch identifier for each predicted location in the one or more predicted locations of the touch input on the touch-sensitive surface.

3. The method of claim 1, wherein the touch location information also identifies:

a plurality of detected locations of the touch input on the touch-sensitive surface; and a plurality of intensity values of the touch input at a plurality of intensity locations on the touch-sensitive surface, wherein the identified intensity values fall in a range of values that includes at least four distinct values.

4. The method of claim 3, wherein the plurality of intensity locations on the touch-sensitive surface are the plurality of detected locations.

5. The method of claim 3, wherein the touch location information includes one or more touch identifiers for the plurality of detected locations.

6. The method of claim 1, wherein the touch location information also identifies predicted tilt and/or orientation of the touch input.

7. The method of claim 1, wherein the touch location information also identifies a type of the touch input as one of a finger input or stylus input.

8. The method of claim 1, wherein sending to the application-specific portion of the first software application touch location information for the touch input includes posting the touch location information for the touch input.

9. The method of claim 1, wherein the touch location information identifies a plurality of predicted intensity values of the touch input at a plurality of predicted locations of the touch input on the touch-sensitive surface.

10. The method of claim 1, including updating the user interface of the first application in accordance with the one or more predicted intensity values.

11. The method of claim 1, including displaying a line, wherein a first portion of the line corresponds to the respective moment of the touch input and a second portion of the line corresponds to predicted movement of the touch input, wherein the second portion of the line is based at least in part on the one or more predicted locations and one or more predicted intensity values.

12. An electronic device, comprising:
a display;
a touch-sensitive surface;
one or more intensity sensors for detecting intensity of contacts, on the touch-sensitive surface, in a range of values that includes at least four distinct values;
one or more processors;
memory; and
one or more programs, wherein the one or more programs are stored in the memory and configured to be executed by the one or more processors, the one or more programs including instructions for:
displaying a user interface of a first software application that is updated at a first display rate;
detecting respective movement of a touch input across the touch-sensitive surface at a first detection rate that is higher than the first display rate;
at an application-independent touch processing module, sending to an application-specific portion of the first software application touch location information for the touch input that identifies:
one or more predicted locations of the touch input on the touch-sensitive surface; and
one or more predicted intensity values of the touch input at one or more intensity locations of the touch input on the touch-sensitive surface, the one or more intensity locations comprising at least a subset of the one or more predicted locations, wherein the one or more predicted intensity values are based at least in part on intensity values, identified using the one or more intensity sensors, at a plurality of detected locations on the touch-sensitive surface; and,
at the first software application, processing the touch location information.

13. The electronic device of claim 12, wherein the touch location information includes a respective touch identifier for each predicted location in the one or more predicted locations of the touch input on the touch-sensitive surface.

14. The electronic device of claim 12, wherein the touch location information also identifies:

a plurality of detected locations of the touch input on the touch-sensitive surface; and a plurality of intensity values of the touch input at a plurality of intensity locations on the touch-sensitive surface, wherein the identified intensity values fall in a range of values that includes at least four distinct values.

15. The electronic device of claim 14, wherein the plurality of intensity locations on the touch-sensitive surface are the plurality of detected locations.

16. The electronic device of claim 14, wherein the touch location information includes one or more touch identifiers for the plurality of detected locations.

17. The electronic device of claim 12, wherein the touch location information also identifies predicted tilt and/or orientation of the touch input.

18. The electronic device of claim 12, wherein the touch location information also identifies a type of the touch input as one of a finger input or stylus input.

19. The electronic device of claim 12, wherein sending to the application-specific portion of the first software application touch location information for the touch input includes posting the touch location information for the touch input.

20. The electronic device of claim 12, wherein the touch location information identifies a plurality of predicted intensity values of the touch input at a plurality of predicted locations of the touch input on the touch-sensitive surface.

21. The electronic device of claim 12, wherein the one or more programs further include instructions for updating the user interface of the first application in accordance with the one or more predicted intensity values.

22. The electronic device of claim 12, wherein the one or more programs further include instructions for displaying a line, wherein a first portion of the line corresponds to the respective moment of the touch input and a second portion of the line corresponds to predicted movement of the touch input, wherein the second portion of the line is based at least in part on the one or more predicted locations and one or more predicted intensity values.

23. A computer readable storage medium storing one or more programs, the one or more programs comprising instructions, which, when executed by an electronic device with a display, one or more intensity sensors for detecting intensity of contacts, on the touch-sensitive surface, in a range of values that includes at least four distinct values, and a touch-sensitive surface cause the device to:
- display a user interface of a first software application that is updated at a first display rate;
- detect respective movement of a touch input across the touch-sensitive surface at a first detection rate that is higher than the first display rate;
- at an application-independent touch processing module, send to an application-specific portion of the first software application touch location information for the touch input that identifies:
  - one or more predicted locations of the touch input on the touch-sensitive surface; and
  - one or more predicted intensity values of the touch input at one or more intensity locations of the touch input on the touch-sensitive surface, the one or more intensity locations comprising at least a subset of the one or more predicted locations, wherein the one or more predicted intensity values are based at least in part on intensity values, identified using the one or more intensity sensors, at a plurality of detected locations on the touch-sensitive surface; and,
- at the first software application, process the touch location information.

24. The computer readable storage medium of claim 23, wherein the touch location information includes a respective touch identifier for each predicted location in the one or more predicted locations of the touch input on the touch-sensitive surface.

25. The computer readable storage medium of claim 23, wherein the touch location information also identifies:
- a plurality of detected locations of the touch input on the touch-sensitive surface; and
- a plurality of intensity values of the touch input at a plurality of intensity locations on the touch-sensitive surface, wherein the identified intensity values fall in a range of values that includes at least four distinct values.

26. The computer readable storage medium of claim 25, wherein the plurality of intensity locations on the touch-sensitive surface are the plurality of detected locations.

27. The computer readable storage medium of claim 25, wherein the touch location information includes one or more touch identifiers for the plurality of detected locations.

28. The computer readable storage medium of claim 23, wherein the touch location information also identifies predicted tilt and/or orientation of the touch input.

29. The computer readable storage medium of claim 23, wherein the touch location information also identifies a type of the touch input as one of a finger input or stylus input.

30. The computer readable storage medium of claim 23, wherein sending to the application-specific portion of the first software application touch location information for the touch input includes posting the touch location information for the touch input.

31. The computer readable storage medium of claim 23, wherein the touch location information identifies a plurality of predicted intensity values of the touch input at a plurality of predicted locations of the touch input on the touch-sensitive surface.

32. The computer readable storage medium of claim 23, wherein the one or more programs further include instructions, which, when executed by the electronic device, cause the device to:
- update the user interface of the first application in accordance with the one or more predicted intensity values.

33. The computer readable storage medium of claim 23, wherein the one or more programs further include instructions, which, when executed by the electronic device, cause the device to:
- display a line, wherein a first portion of the line corresponds to the respective moment of the touch input and a second portion of the line corresponds to predicted movement of the touch input, wherein the second portion of the line is based at least in part on the one or more predicted locations and one or more predicted intensity values.

* * * * *